US008615354B2

(12) United States Patent
Barker et al.

(10) Patent No.: US 8,615,354 B2
(45) Date of Patent: Dec. 24, 2013

(54) DISPLAYING ROAD TRAFFIC CONDITION INFORMATION AND USER CONTROLS

(75) Inventors: Alec Barker, Woodinville, WA (US); Todd Asher, Sammamish, WA (US); Mitchel A. Burns, Heber City, UT (US); Oliver B. Downs, Redmond, WA (US); Craig H. Chapman, Redmond, WA (US); Robert C. Cahn, Federal Way, WA (US)

(73) Assignee: Inrix, Inc., Kirkland, WA (US)

( * ) Notice: Subject to any disclaimer, the term of this patent is extended or adjusted under 35 U.S.C. 154(b) by 456 days.

(21) Appl. No.: 12/856,423

(22) Filed: Aug. 13, 2010

(65) Prior Publication Data

US 2011/0035141 A1 Feb. 10, 2011

Related U.S. Application Data

(60) Division of application No. 11/556,670, filed on Nov. 3, 2006, now abandoned, which is a continuation-in-part of application No. 11/367,463, filed on Mar. 3, 2006, now Pat. No. 7,813,870.

(60) Provisional application No. 60/778,946, filed on Mar. 3, 2006.

(51) Int. Cl.

| | |
|---|---|
| ***G08G 1/137*** | (2006.01) |
| ***G08G 1/123*** | (2006.01) |
| ***G08G 1/09*** | (2006.01) |
| *G08G 1/01* | (2006.01) |
| *G01C 21/36* | (2006.01) |
| *G08G 1/056* | (2006.01) |

(52) U.S. Cl.

USPC ........... 701/117; 701/118; 701/119; 701/414; 701/423

(58) Field of Classification Search

USPC .................. 701/117–119, 414, 423; 340/905, 340/995.13; 342/456

See application file for complete search history.

(56) References Cited

U.S. PATENT DOCUMENTS

| | | | | |
|---|---|---|---|---|
| 3,582,620 | A | 6/1971 | Noetinger | 235/150.24 |
| 3,626,413 | A | 12/1971 | Zachmann | 343/8 |

(Continued)

FOREIGN PATENT DOCUMENTS

| | | |
|---|---|---|
| DE | 10063763 | 7/2002 |
| DE | 102004015880 | 11/2004 |

(Continued)

OTHER PUBLICATIONS

"About LandSonar, Inc.," retrieved Apr. 27, 2006, from http://www.landsonar.com/?page_id=2, 2 pages.

(Continued)

*Primary Examiner* — Khoi Tran
*Assistant Examiner* — Dale Moyer
(74) *Attorney, Agent, or Firm* — Seed IP Law Group PLLC

(57) ABSTRACT

Techniques are described for displaying or otherwise providing information to users regarding various types of road traffic condition information in various ways. The information may be provided, for example, as part of a user interface (or "UI"), which may in some situations further include one or more types of user-selectable controls to allow a user to manipulate in various ways what road traffic condition information is displayed and/or how the information is displayed. A variety of types of road traffic condition information may be presented to users in various manners, including by presenting information on graphically displayed maps for geographic areas to indicate various information about road conditions in the geographic area. In addition, provided controls may allow users to select particular times, select particular routes, indicate to perform animation of various types of changing traffic conditions over a sequence of multiple successive times, etc.

32 Claims, 40 Drawing Sheets

(56) References Cited

U.S. PATENT DOCUMENTS

| | | | | |
|---|---|---|---|---|
| 4,866,438 | A | 9/1989 | Knisch | 340/936 |
| 4,985,705 | A | 1/1991 | Stammler | 342/69 |
| 5,289,183 | A | 2/1994 | Hassett et al. | 340/905 |
| 5,337,082 | A | 8/1994 | Fredericks | 342/69 |
| 5,465,289 | A | 11/1995 | Kennedy, Jr. | 379/59 |
| 5,610,821 | A | 3/1997 | Gazis et al. | 364/444.2 |
| 5,663,720 | A | 9/1997 | Weissman | 340/934 |
| 5,673,039 | A | 9/1997 | Pietzsch et al. | |
| 5,696,502 | A | 12/1997 | Busch et al. | 340/905 |
| 5,745,865 | A | 4/1998 | Rostoker et al. | 701/117 |
| 5,801,943 | A | 9/1998 | Nasburg | |
| 5,827,712 | A | 10/1998 | Yokoyama et al. | 435/193 |
| 6,011,515 | A | 1/2000 | Radcliffe et al. | 342/453 |
| 6,119,013 | A | 9/2000 | Maloney et al. | 455/456 |
| 6,150,961 | A | 11/2000 | Alewine et al. | 340/995 |
| 6,292,742 | B1 | 9/2001 | Heimann et al. | 707/117 |
| 6,317,686 | B1 * | 11/2001 | Ran | 701/533 |
| 6,317,868 | B1 | 11/2001 | Grimm et al. | |
| 6,401,027 | B1 | 6/2002 | Xu et al. | 701/117 |
| 6,463,382 | B1 | 10/2002 | Bullock | 701/117 |
| 6,480,783 | B1 | 11/2002 | Myr | 701/117 |
| 6,490,519 | B1 | 12/2002 | Lapidot et al. | 701/117 |
| 6,496,773 | B1 | 12/2002 | Olsson | 701/117 |
| 6,505,114 | B2 | 1/2003 | Luciani | 701/117 |
| 6,574,548 | B2 | 6/2003 | DeKock et al. | 701/117 |
| 6,594,576 | B2 | 7/2003 | Fan et al. | 701/117 |
| 6,633,812 | B1 | 10/2003 | Martin et al. | |
| 6,650,948 | B1 | 11/2003 | Atkinson et al. | 700/66 |
| 6,664,922 | B1 | 12/2003 | Fan | 342/357.1 |
| 6,728,628 | B2 | 4/2004 | Peterson | 701/117 |
| 6,781,523 | B2 | 8/2004 | Matsui et al. | 340/910 |
| 6,832,140 | B2 | 12/2004 | Fan et al. | 701/33 |
| 6,862,524 | B1 | 3/2005 | Nagda et al. | 701/209 |
| 6,882,313 | B1 | 4/2005 | Fan et al. | 342/457 |
| 6,922,566 | B2 | 7/2005 | Puranik et al. | 455/456.2 |
| 6,973,319 | B2 | 12/2005 | Ormson | 455/456.1 |
| 6,989,765 | B2 | 1/2006 | Gueziec | 340/905 |
| 7,026,958 | B2 | 4/2006 | Wainfan et al. | 340/995.13 |
| 7,027,915 | B2 | 4/2006 | Craine | 701/117 |
| 7,069,143 | B2 | 6/2006 | Peterson | 701/117 |
| 7,096,115 | B1 | 8/2006 | Groth et al. | 701/117 |
| 7,116,326 | B2 | 10/2006 | Soulchin et al. | 345/440 |
| 7,161,497 | B2 | 1/2007 | Gueziec | 340/905 |
| 7,221,287 | B2 | 5/2007 | Gueziec et al. | 340/905 |
| 7,289,039 | B2 | 10/2007 | Kato et al. | |
| 7,375,649 | B2 | 5/2008 | Gueziec | 340/905 |
| 7,508,321 | B2 | 3/2009 | Gueziec et al. | 340/905 |
| 7,519,564 | B2 | 4/2009 | Horvitz | 706/12 |
| 7,557,730 | B2 | 7/2009 | Gueziec | 340/905 |
| 7,609,176 | B2 | 10/2009 | Yamane et al. | 340/994 |
| 7,610,145 | B2 | 10/2009 | Kantarjiev et al. | 701/204 |
| 7,693,657 | B2 | 4/2010 | Endo et al. | |
| 7,860,639 | B2 * | 12/2010 | Yang | 701/117 |
| 2001/0029425 | A1 | 10/2001 | Myr | |
| 2001/0047241 | A1 | 11/2001 | Khavakh et al. | |
| 2002/0051464 | A1 | 5/2002 | Sin et al. | 370/466 |
| 2003/0028319 | A1 | 2/2003 | Khavakh et al. | |
| 2003/0069683 | A1 | 4/2003 | Lapidot et al. | 701/117 |
| 2003/0135304 | A1 | 7/2003 | Sroub et al. | 701/1 |
| 2004/0039520 | A1 | 2/2004 | Khavakh et al. | |
| 2004/0073361 | A1 | 4/2004 | Tzamaloukas et al. | |
| 2004/0225437 | A1 | 11/2004 | Endo et al. | |
| 2004/0249568 | A1 | 12/2004 | Endo et al. | 701/209 |
| 2004/0267440 | A1 | 12/2004 | DeKock et al. | |
| 2005/0027436 | A1 | 2/2005 | Yoshikawa et al. | |
| 2005/0090974 | A1 * | 4/2005 | Hirose | 701/208 |
| 2005/0093720 | A1 | 5/2005 | Yamane et al. | |
| 2005/0096839 | A1 | 5/2005 | Nakano et al. | 701/200 |
| 2005/0140525 | A1 | 6/2005 | Tomita et al. | |
| 2005/0171649 | A1 | 8/2005 | Adachi | |
| 2006/0004511 | A1 | 1/2006 | Yoshikawa et al. | |
| 2006/0041927 | A1 | 2/2006 | Stark et al. | |
| 2006/0074551 | A1 | 4/2006 | Zaitsu et al. | 701/209 |
| 2006/0082472 | A1 * | 4/2006 | Adachi et al. | 340/995.13 |
| 2006/0103674 | A1 | 5/2006 | Horvitz et al. | 345/629 |
| 2006/0106530 | A1 | 5/2006 | Horvitz et al. | 701/117 |
| 2006/0106599 | A1 | 5/2006 | Horvitz | 704/219 |
| 2006/0106743 | A1 | 5/2006 | Horvitz | 706/21 |
| 2006/0122846 | A1 | 6/2006 | Burr et al. | 705/1 |
| 2006/0149461 | A1 | 7/2006 | Rowley et al. | 701/202 |
| 2006/0155464 | A1 | 7/2006 | Smartt | 701/208 |
| 2006/0224797 | A1 | 10/2006 | Parish et al. | 710/62 |
| 2006/0229802 | A1 | 10/2006 | Vertelney et al. | 701/200 |
| 2006/0241987 | A1 * | 10/2006 | Pallotto et al. | 705/7 |
| 2006/0287818 | A1 | 12/2006 | Okude et al. | |
| 2007/0005419 | A1 | 1/2007 | Horvitz et al. | 705/14 |
| 2007/0073477 | A1 | 3/2007 | Krumm et al. | 701/209 |
| 2007/0159355 | A1 * | 7/2007 | Kelly et al. | 340/905 |
| 2007/0199050 | A1 | 8/2007 | Meier | 726/4 |
| 2007/0208492 | A1 | 9/2007 | Downs et al. | 701/117 |
| 2007/0208494 | A1 | 9/2007 | Chapman et al. | 701/117 |
| 2007/0208495 | A1 | 9/2007 | Chapman et al. | 701/177 |
| 2007/0208496 | A1 | 9/2007 | Downs et al. | 701/117 |
| 2007/0208497 | A1 | 9/2007 | Downs et al. | 701/117 |
| 2007/0208498 | A1 | 9/2007 | Barker et al. | 701/117 |
| 2007/0208501 | A1 | 9/2007 | Downs et al. | |
| 2008/0021791 | A1 | 1/2008 | Steelberg et al. | 705/26 |
| 2008/0059115 | A1 | 3/2008 | Wilkinson | 702/179 |
| 2008/0071465 | A1 | 3/2008 | Chapman et al. | 701/117 |
| 2008/0071466 | A1 | 3/2008 | Downs et al. | 701/117 |
| 2008/0133517 | A1 | 6/2008 | Kapoor et al. | 707/6 |
| 2008/0275309 | A1 | 11/2008 | Stivoric et al. | 600/300 |
| 2008/0278328 | A1 | 11/2008 | Chand et al. | 340/572.1 |
| 2009/0118996 | A1 | 5/2009 | Kantarjiev et al. | 701/119 |

FOREIGN PATENT DOCUMENTS

| | | | |
|---|---|---|---|
| JP | 11-316126 | A | 11/1999 |
| JP | 2001-227977 | A | 8/2001 |
| JP | 2003-151079 | A | 5/2003 |
| JP | 2004-347448 | A | 12/2004 |
| JP | 2006-017607 | A | 1/2006 |
| JP | 2006090872 | | 4/2006 |
| WO | 2004/021305 | | 3/2004 |
| WO | 2004/021306 | | 3/2004 |
| WO | 2006/005906 | | 1/2006 |

OTHER PUBLICATIONS

"Award Abstract—#0349460—SBIR Phase II: Animated Real-Time Road Traffic Visualization for Broadcast and the Internet," National Science Foundation, retrieved Jul. 31, 2006, from http://www.nsf.gov/awardsearch/showAward.do?AwardNumber=0349460, 2 pages.

U.S. Appl. No. 60/628,267, filed Nov. 16, 2004, Horvitz.

BeatTheTraffic.com: The Right Traffic at the Right Time™, Homepage, retrieved Jan. 20, 2006, from http://www.beatthetraffic.com/, 1 page.

"Dash Express Automotive Navigation System," retrieved Aug. 3, 2007, from http://www.dash.net/product.php, 1 page.

"Dash Navigation Unveils First Internet-Connected Auto Navigation Device," Sep. 26, 2006, Dash Navigation™, Inc., retrieved Aug. 3, 2007, from http://www.dash.net/news_pr-060925.php, 1 page.

"Global Positioning Systems > Tracking Systems in the Yahoo! Directory," Yahoo!®, Small Business Directory, retrieved Feb. 8, 2006, from http://dir.yahoo.com/Business_and_Economy/Business_to_Business/Navigation/Global_Positioning_Systems/Tracking_Systems, 8 pages.

"Inrix Historical Traffic Improves Consumer Navigation Experience," Jul. 18, 2007, Inrix, Inc., retrieved Jul. 19, 2007, from http://www.inrix.com/news_NAS_18July2007.asp, 2 pages.

"Inrix Advances Navigation with 'Nationwide Average Speeds'," Aug. 7, 2006, Inrix, Inc., retrieved Jul. 19, 2007, from http://www.inrix.com/news_NationwideAverageSpeeds_07Aug2006.asp, 1 page.

"LandSonar, Inc. Announces First-Ever Nationwide Traffic-Prediction Product," Jan. 22, 2006, LandSonar, Inc., retrieved Jul. 20, 2007, from http://www.landsonar.com/?p=55, 3 pages.

(56) References Cited

OTHER PUBLICATIONS

"NAVTEQ Launches NAVTEQ Traffic Patterns™ Database: *Historic Traffic Data is the Basis for Predicting Traffic Behavior and Enhancing Routes*," Jan. 5, 2007, NAVTEQ, retrieved Jul. 19, 2007, from http://www.navteq.com/webapps/NewsUserServlet?action=NewsDetail&newsId=479, 2 pages.
"Powerful Tool Crunches Commutes," Mar. 8, 2005, National Science Foundation, retrieved Jan. 20, 2006, from http://www.beatthetraffic.com/aboutus/nsf20050308.htm, 2 pages.
"Seattle Area Traffic—Central Puget Sound Travel Times," Washington State Department of Transportation, retrieved Jan. 20, 2006, from http://www.wsdot.wa.gov/traffic/seattle/traveltimes/, 3 pages.
"Technology Overview," retrieved Apr. 27, 2006, from http://www.landsonar.com/?page_id=20, 3 pages.
"TrafficCast International and LandSonar Introduce LPS Plus," Mar. 1, 2007, LandSonar, Inc., retrieved Jul. 19, 2007, from http://www.landsonar.com/?p=117, 2 pages.
Graham-Rowe, D., "Smart Traffic Forecast Offers Seven-Day Predictions," Jun. 29, 2005, NewScientist.com, retrieved Jan. 20, 2006, from http://www.newscientist.com/article.ns?id=dn7605&print=true, 2 pages.
Green, D., "Navigating by Phone," Apr. 28, 2004, Palo Alto Weekly Online Edition, retrieved Jul. 27, 2006, from http://www.paloaltoonline.com/weekly/morgue/2004/2004_04_28.zipdash28ja.shtml, 3 pages.
Slawski, W., "Ending Gridlock with Google Driving Assistance (Zipdash Re-Emerges)," Jul. 6, 2006, retrieved Jul. 27, 2006, from http://www.seobythesea.com/?p=240, 3 pages.
Smith, B. "OmniTRACS Keeps on Trucking," Dec. 1, 2005, WirelessWeek.com, retrieved Feb. 7, 2006, from http://www.wirelessweek.com/index.asp?layout=articlePrint&articleID=CA6287997, 2 pages.
Utter, D., "Google Mobilizes Traffic Data," Jul. 25, 2006, webpronews.com, retrieved Jul. 27, 2006, from http://www.webpronews.com/topnews/topnews/wpn-60-20060725GoogleMobilizesTrafficData.html, 3 pages.

* cited by examiner

210

| | 212a | 212b |
|---|---|---|
| | **Variable** | **Possible Values** |
| 214a | IsSchoolDay | true, false |
| 214b | Precipitation | none, low, medium, high |
| 214c | StadiumXEvtType | none, football, concert, soccer, other |
| 214d | PercentBlackSegmentX-Y | [0, 1.0] |
| 214e | BlackStartSegmentX | notblack, 0, 5, 10, 15, …, 30 |
| 214f | SegmentXColorY | green, yellow, red, black |
| 214g | … | … |

Fig. 2B

220

Input Variables (222a–222e) / Output Variables (222f–222j)

| | 222a | 222b | 222c | 222d | 222e | 222f | 222g | 222h | 222i | 222j |
|---|---|---|---|---|---|---|---|---|---|---|
| | **IsSchool Day** | **Precip-itation** | **StadiumX EvtType** | **PercentBlack SegmentX-Y** | **…** | **BlackStart SegmentN** | **Segment1 Color15** | **Segment1 Color30** | **…** | **SegmentN Color180** |
| 224a | true | none | soccer | 0.22 | | 0 | red | black | | yellow |
| 224b | true | none | football | 0.05 | | notblack | green | red | | green |
| 224c | false | low | none | 0.13 | | 15 | green | black | | black |
| 224d | false | medium | concert | 0.07 | | 10 | yellow | yellow | | red |
| 224e | false | high | other | 0.11 | | 5 | green | green | | yellow |
| 224f | | | | | | | | | | |
| 224g | true | none | none | 0.16 | | notblack | green | green | | black |

Fig. 2C

Example Decision Tree for Segment1 at Future Time 15

Detailed View Leaf Node of Example Decision Tree for Segment1 at Future Time 15

Example Decision Tree for Segment1 at Future Time 30

Example Decision Tree for Segment1 at Future Time 60

Example Decision Tree for Segment2 at Future Time 30

DISPLAYING ROAD TRAFFIC CONDITION INFORMATION AND USER CONTROLS

CROSS REFERENCE TO RELATED APPLICATIONS

This application is a division of and claims the benefit under 35 U.S.C. 121 of co-pending U.S. patent application Ser. No. 11/556,670, filed Nov. 3, 2006 and entitled "Displaying Road Traffic Condition Information And User Controls." which is hereby incorporated by reference in its entirety. U.S. patent application Ser. No. 11/556,670 is a continuation-in-part of U.S. patent application Ser. No. 11/367,463, filed Mar. 3, 2006 and entitled "Dynamic Time Series Prediction Of Future Traffic Conditions," which is hereby incorporated by reference in its entirety.

U.S. patent application Ser. No. 11/556,670 also claims the benefit of provisional U.S. Patent Application No. 60/778,946, filed Mar. 3, 2006 and entitled "Obtaining Road Traffic Condition Information From Mobile Data Sources," which is hereby incorporated by reference in its entirety.

TECHNICAL FIELD

The following disclosure relates generally to techniques for displaying road traffic condition information and associated user controls, such as by providing a user interface that displays various types of information about current and predicted traffic conditions to facilitate travel over roads in one or more geographic areas.

BACKGROUND

As road traffic has continued to increase at rates greater than increases in road capacity, the effects of increasing traffic congestion have had growing deleterious effects on business and government operations and on personal well-being. Accordingly, efforts have been made to combat the increasing traffic congestion in various ways, such as by obtaining and providing information about current traffic conditions to individuals and organizations. One source for obtaining information about current traffic conditions in some larger metropolitan areas is networks of traffic sensors capable of measuring traffic flow for various roads in the area (e.g., via sensors embedded in the road pavement), and such current traffic condition information may be provided to interested parties in various ways (e.g., via frequent radio broadcasts, an Internet Web site that displays a map of a geographical area with color-coded information about current traffic congestion on some major roads in the geographical area, information sent to cellular telephones and other portable consumer devices, etc.).

However, while such current traffic information provides some benefits in particular situations, it is often difficult to display and otherwise provide information about traffic conditions to users in such a manner as to allow the user to effectively understand the traffic conditions.

Accordingly, it would be beneficial to provide improved techniques for displaying and otherwise providing information about traffic conditions to users, as well as to provide additional related capabilities.

BRIEF DESCRIPTION OF THE DRAWINGS

FIGS. 2A-2J illustrate various graphical representations of predictive models for representing knowledge about traffic conditions in a given geographic area.

DETAILED DESCRIPTION

Figure 1A:
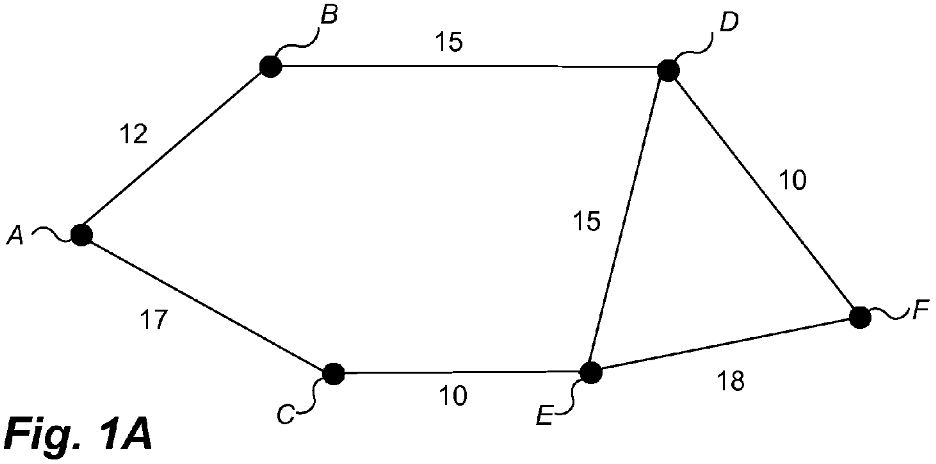
FIGS. 1A-1F illustrate examples of travel route selection based on predicted future traffic conditions.

Techniques are described for displaying or otherwise providing information to users regarding various types of road traffic condition information in various ways. In at least some embodiments, information related to road traffic condition information is provided as part of a user interface (or "UI"), such as a graphical UI (or "GUI"). In addition, in some embodiments a provided UI may include one or more types of user-selectable controls to allow a user to manipulate in various ways what road traffic condition information is displayed and/or how the information is displayed. In at least some embodiments, at least some of the described techniques are automatically provided by a User Interface Manager system, as described in greater detail below.

As previously noted, in at least some embodiments road traffic condition information of interest is displayed or otherwise presented via one or more GUIs or other UIs. Such a UI may be generated and presented in various ways in various embodiments. For example, in some embodiments at least some of the UI and/or the information to be presented in the UI may be generated on a first computing system (e.g., a server computing system) and sent to one or more other client computing and/or communication devices (e.g., personal computers, PDAs, cellphones, vehicle-based navigation systems, etc.) on which to be presented or otherwise used. In other embodiments, at least some of the UI and/or the information to be presented in the UI may be generated and presented on a single computing device, such as by a client application executing on a client computing device to present information to a user of the client computing device (e.g., based at least in part on related information received from one or more remote server systems or other information sources). A particular UI may include, for example, one or more Web pages, one or more screens of information on a mobile device (e.g., a cellphone, PDA, mobile Internet access device, etc.), one or more groups of information displayed within the UI of a client application, etc. In addition, a particular UI and/or information within a UI may be presented or otherwise provided to many users in some embodiments, while in other embodiments may be provided to a single user (e.g., in a manner that is personalized to that user and/or to a particular device being used by that user).

A variety of types of road traffic condition information may be presented to users in various manners in various embodiments, as discussed in greater detail below, including by presenting information on graphically displayed maps for geographic areas to indicate various information about road conditions in the geographic area, such as networks of at least some roads in the geographic area, particular segments of at least some of those routes, particular routes over one or more roads, etc. For example, presented road traffic condition information may include information about current actual road traffic conditions, past actual road traffic conditions, predicted future road traffic conditions, and/or forecast future road traffic conditions. Traffic conditions information that is presented may further reflect one or more of various types of traffic flow measurements in various embodiments (e.g., average traffic speeds, average traffic volume over a period of time, average traffic occupancy that reflects the average percentage of time that vehicles are occupying a particular location, etc.). Such traffic conditions information may be obtained in various ways, including by obtaining current actual traffic conditions data from various types of sources (e.g., road-based traffic sensors and/or mobile data sources related to vehicles traveling on roads), including in some embodiments in a substantially realtime or near-realtime manner (e.g., within a few minutes or less of the corresponding traffic). Predicted and forecasted future traffic conditions data may similarly be generated or otherwise obtained for a road segment for a future time (e.g., a time one or more hours in the future) in various ways in various embodiments (e.g., from a predictive traffic information provider system). In addition, in some embodiments comparative road traffic condition information may be obtained and presented, such as to show anomalous comparative road traffic conditions in which a particular type of traffic flow data differs in one or more ways from expected traffic flow data of that type, such as to be abnormal, atypical, unusual, or otherwise sufficiently different (e.g., so as to exceed a predetermined or dynamically determined threshold). For such comparative road traffic condition information, the target traffic conditions data to be analyzed for anomalies may include various types of traffic information (e.g., past actual, current actual, future predicted and/or future forecasted), and the expected traffic conditions information that is used for the comparison may be generated or otherwise obtained in various ways. Additional details are included below related to the selection and generation of various types of traffic condition information.

In addition, in some embodiments a provided UI may include one or more types of user-selectable controls to allow a user to manipulate in various ways what road traffic condition information is displayed and/or how the information is displayed. As discussed in greater detail below, types of provided controls may allow users to, for example, select particular times, select particular routes, indicate to perform animation of various types of changing traffic conditions over a sequence of multiple successive times, etc. Additional details are included below related to manipulating the presentation of road traffic condition information.

As previously noted, in at least some embodiments, predictions of future traffic conditions at multiple future times are generated in various ways. In some embodiments, the predictions are generated using probabilistic techniques that incorporate various types of input data in order to repeatedly produce future time series predictions for each of numerous road segments, such as in a real-time manner based on changing current conditions for a network of roads in a given geographic area. Moreover, in at least some embodiments one or more predictive Bayesian or other models are automatically created for use in generating the future traffic condition predictions for each geographic area of interest, such as based on observed historical traffic conditions for those geographic areas. Predicted future traffic condition information may be used in a variety of ways to assist in travel and for other purposes, such as to plan optimal routes through a network of roads based on predictions about traffic conditions for the roads at multiple future times. In at least some embodiments, a predictive traffic information provider system uses the described techniques to generate such predictions, as described in greater detail below.

In some embodiments, the types of input data used to generate predictions of future traffic conditions may include a variety of current, past, and expected future conditions, and outputs from the prediction process include the generated predictions of the expected traffic conditions on each of multiple target road segments of interest for each of multiple future times (e.g., every 5, 15 or 60 minutes in the future) within a pre-determined time interval (e.g., three hours, or one day), as discussed in greater detail below. For example, types of input data may include the following: information about current and past amounts of traffic for various target road segments of interest in a geographic area, such as for a network of selected roads in the geographic area; information about current and recent traffic accidents; information about current, recent and future road work; information about current, past and expected future weather conditions (e.g., precipitation, temperature, wind direction, wind speed, etc.); information about at least some current, past and future scheduled events (e.g., type of event, expected start and end times of the event, and/or a venue or other location of the event, etc., such as for all events, events of indicated types, events that are sufficiently large, such as to have expected attendance above an indicated threshold (for example, 1000 or 5000 expected attendees), etc.); and information about school schedules (e.g., whether school is in session and/or the location of one or more schools). Moreover, current and predicted future traffic conditions may be measured and represented in one or more of a variety of ways, such as in absolute terms (e.g., average vehicle speed, volume of traffic for an indicated period of time; average occupancy time of one or more traffic sensors, such as to indicate the average percentage of time that a vehicle is over or otherwise activating the sensor; one of multiple enumerated levels of roadway congestion, such as measured based on one or more other traffic condition measures; etc.) and/or in relative terms (e.g., to represent a difference from typical or from maximum). In addition, while in some embodiments the multiple future times at which future traffic conditions are predicted are each points in time, in other embodiments such predictions may instead represent multiple time points (e.g., a period of time), such as by representing an average or other aggregate measure of the future traffic conditions during those multiple time points. Furthermore, some or all of the input data may be known and represented with varying degrees of certainty (e.g., expected weather), and additional information may be generated to represent degrees of confidence in and/or other metadata for the generated predictions. In addition, the prediction of future traffic conditions may be initiated for various reasons and at various times, such as in a periodic manner (e.g., every five minutes), when any or sufficient new input data is received, in response to a request from a user, etc.

Some of the same types of input data may be used to similarly generate longer-term forecasts of future traffic conditions (e.g., one week in the future, or one month in the future) in some embodiments, but such longer-term forecasts may not use some of the types of input data, such as information about current conditions at the time of the forecast generation (e.g., current traffic, weather, or other conditions). In addition, such longer-term forecasts may be generated less frequently than shorter-term predictions, and may be made so as to reflect different future time periods than for shorter-term predictions (e.g., for every hour rather than every 15 minutes).

The roads and/or road segments for which future traffic condition predictions and/or forecasts are generated may also be selected in various manners in various embodiments. In some embodiments, future traffic condition predictions and/or forecasts are generated for each of multiple geographic areas (e.g., metropolitan areas), with each geographic area having a network of multiple inter-connected roads—such geographic areas may be selected in various ways, such as based on areas in which current traffic condition information is readily available (e.g., based on networks of road sensors for at least some of the roads in the area) and/or in which traffic congestion is a significant problem. In some such embodiments, the roads for which future traffic condition predictions and/or forecasts are generated include those roads for which current traffic condition information is readily available, while in other embodiments the selection of such roads may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; etc.). In other embodiments, future traffic condition predictions and/or forecasts may be made for a single road, regardless of its size and/or inter-relationship with other roads. In addition, segments of roads for which future traffic condition predictions and/or forecasts are generated may be selected in various manners, such as to treat each road sensor as a distinct segment; to group multiple road sensors together for each road segment (e.g., to reduce the number of independent predictions and/or forecasts that are made, such as by grouping specified numbers of road sensors together); to select road segments so as to reflect logically related sections of a road in which traffic conditions are typically the same or sufficiently similar (e.g., strongly correlated), such as based on traffic condition information from traffic sensors and/or from other sources (e.g., data generated from vehicles and/or users that are traveling on the roads, as discussed in greater detail below); etc.

In addition, future traffic condition prediction and/or forecast information may be used in a variety of ways in various embodiments, as discussed in greater detail below, including to provide such information to users and/or organizations at various times (e.g., in response to requests, by periodically sending the information, etc.) and in various ways (e.g., by transmitting the information to cellular telephones and/or other portable consumer devices; by displaying information to users, such as via Web browsers and/or application programs; by providing the information to other organizations and/or entities that provide at least some of the information to users, such as third parties that perform the information providing after analyzing and/or modifying the information; etc.). For example, in some embodiments, the prediction and/or forecast information is used to determine suggested travel routes and/or times, such as an optimal route between a starting location and an ending location over a network of roads and/or an optimal time to perform indicated travel, with such determinations based on predicted and/or forecast information at each of multiple future times for one or more roads and/or road segments.

For illustrative purposes, some embodiments are described below in which specific types of predictions are generated in specific ways using specific types of input, and in which generated prediction information is used in various specific ways. However, it will be understood that such future traffic predictions may be generated in other manners and using other types of input data in other embodiments, that the described techniques can be used in a wide variety of other situations, that future traffic forecasts may similarly be generated and used in various ways, and that the invention is thus not limited to the exemplary details provided.

FIGS. 1A-1F illustrate examples of performing travel route selection based on predicted future traffic conditions. In particular, FIG. 1A illustrates multiple potential travel routes between a starting point A and a destination point F in the form of an undirected graph, with intermediate nodes labeled B-E—for example, listing nodes in order along a route, one potential route is ABDF, while other potential routes are ABDEF, ACEF and ACEDF. In addition, the edges between the nodes in FIG. 1A are each labeled with a predicted time to travel between the two nodes connected by the edge. For example, at a starting time T1 represented by the graph, the predicted time to travel between node A and node B is 12 minutes and the predicted time to travel between node A and node C is 17 minutes. Similarly, for someone departing node B at starting time T1 and heading toward node D along edge BD (with an edge being represented by the node labels at the two ends of the edge), the predicted time for travel is 15 minutes. In other embodiments, other types of predicted information may instead be used as part of such travel route selection, such as predicted traffic congestion or predicted average speed.

Figure 1B:
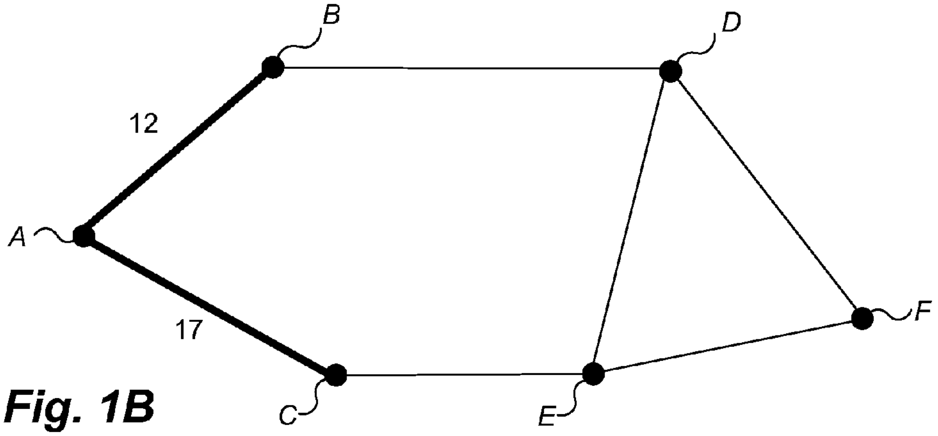
Figure 1C:
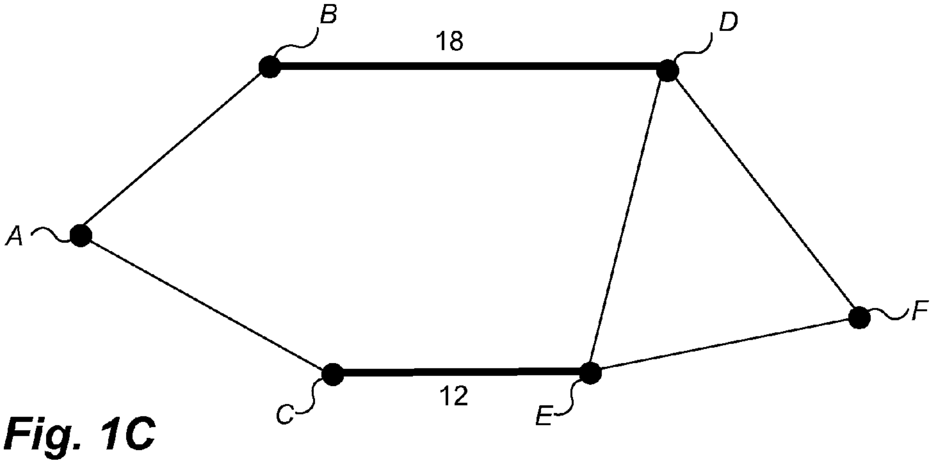
Figure 1D:
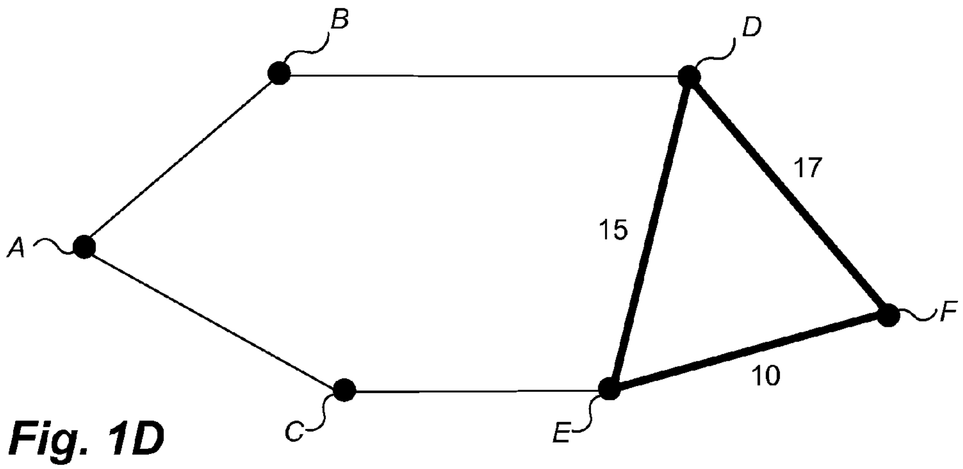

Thus, FIG. 1A illustrates the entire route graph at a single starting time T1 (e.g., 5 PM), such as for edges traveled by vehicles starting at any of the graph nodes at that starting time. Conversely, FIGS. 1B-1E illustrate various views showing predicted traffic condition information for multiple future times for use by the route selection process from node A to node F, with the intervals between each of the future times in this example being 15 minutes. For example, FIG. 1B illustrates a portion of the route graph based on predicted travel times for time T1 that are for use during a first time period beginning at starting time T1 and continuing until time T2, which in this example is a 15-minute time period from 5 PM until 5:15 PM, but shows only predicted time information that is relevant during that first time period for the route selection process, which in this example is for edges AB and AC. In particular, since edges beyond nodes B and C will not be reached in this example until the first time period is complete or substantially complete, the predicted traffic information at time T1 5 pm for edge CE (for example) is not of use since a vehicle would not reach that edge until a second time period of 5:15 pm-5:30 pm. Accordingly, FIG. 1C illustrates predicted travel information for the route graph during the second time period, such as based on predicted travel times for time T2 5:15 PM, with only predicted travel times for edges BD and CE shown since those edges correspond to road segments that would possibly be traveled by a vehicle that left node A at 5 pm. Similarly, FIG. 1D illustrates the route graph during a third time period between 5:30 and 5:45 PM, such as based on predicted travel times for time T3 5:30 PM, with the predicted travel times for edges DF, DE, and EF shown since those edges correspond to road segments that could be traveled by a vehicle that left node A at 5 pm. For purposes of simplification for this example, predicted travel times during a fourth time period between 5:45 PM and 6 PM (such as based on predicted travel times for time T4 5:45 PM) for edges DF, DE, and EF are the same as the predicted travel times for those edges during the third period, and the fourth time period times are not illustrated separately.

Figure 1E:
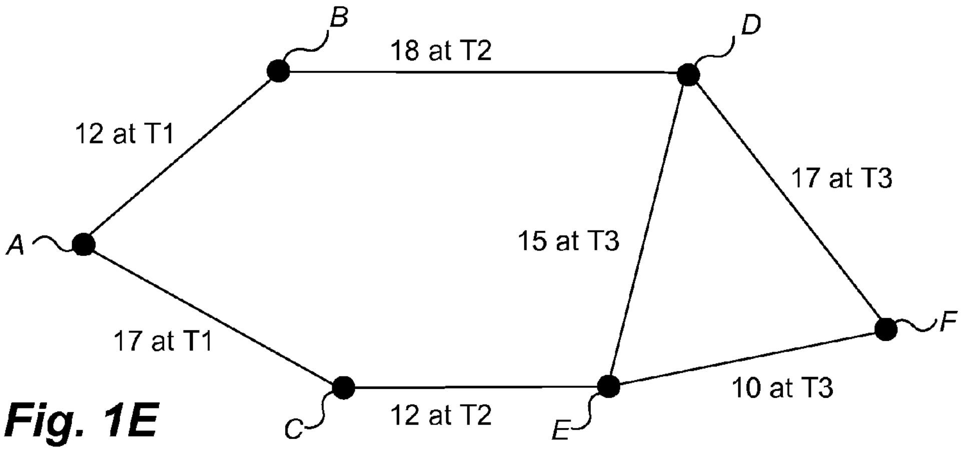

FIG. 1E illustrates a combined view of the information displayed in FIGS. 1B-1D, with predicted travel times for multiple future times being displayed. In particular, the edges are labeled with the predicted travel times that correspond to the time periods during which a vehicle traveling from source node A to destination node F would be expected to be traversing the route segments corresponding to the graph edges, with information displayed from left to right in the graph generally reflecting predictions relating to successively later time periods. Thus, the graph shows that the predicted travel time from A to B during the first time period is 12 minutes; from A to C during the first time period is 17 minutes; from B to D during the second time period is 18 minutes; from C to E during the second time period is 12 minutes; from D to E during the third time period is 15 minutes; from D to F during the third time period (and the fourth time period) is 17 minutes; and from E to F during the third time period (and the fourth time period) is 10 minutes.

Using the predicted travel times for these multiple time periods shown in FIG. 1E, it is possible to select the optimal route (in this example, the fastest route) from source node A to destination node F. In this simple example, total travel times for possible routes between the source and destination nodes are as follows (not counting routes in which a vehicle backtracks over a previously traveled edge): ABDF (total time=47); ABDEF (total time=55); ACEF (total time=39); and ACEDF (total time=61). Thus, based on the predictions made at the current time for the multiple future time periods, route ACEF will be the fastest route between source node A and destination node F, with an expected travel time of 39 minutes.

Returning to FIG. 1A, in which the predicted times for the entire route graph during the first time period are shown, this route group illustrates how a non-optimal route would be selected using this information since predicted travel times for future time periods are not considered. In particular, the predicted travel times for the same 4 routes using only the predicted first time period travel times are as follows: ABDF (travel time=37); ABDEF (travel time=60); ACEF (travel time=45); and ACEDF (travel time=52). Thus, this less-accurate information would have erroneously indicated that route ABDF would be the fastest route between source node A and destination node F with a time of 37 minutes, rather than the 47 minutes for that route that are indicated by using the predicted travel times indicated in FIG. 1E. Such inaccuracies may have arisen, for example, due to predicted increases in traffic congestion after the first time period, such as due to a scheduled event that causes traffic to significantly increase during the second and third time periods.

Figure 1F:
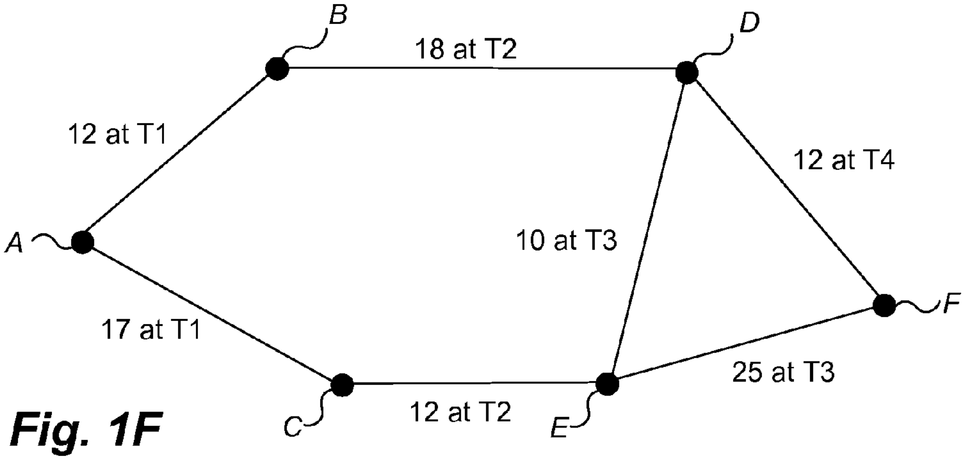

FIG. 1F shows a revised view of the information shown in FIG. 1E, and in particular shows updated predicted travel times for the third and fourth time periods with respect to edges DF, DE and EF. In this example, the updated predicted travel information is generated during the second time period based on new input information that became available at that time (e.g., an accident that occurred along a road corresponding to edge EF, thus significantly increasing predicted travel time for that edge), which may alter optimal routes between nodes in the graph. Such updated information may be particularly beneficial if it can be rapidly provided to users that are affected by changes in the predicted travel information. For example, a user who had begun traveling along route ACEF based on the predicted travel information shown in FIG. 1E would be traveling along a road corresponding to edge CE when the updated information becomes available, but the updated information indicates that traveling edge EF is no longer the optimal choice from node E—instead, traveling a revised route ED and DF is now predicted to take less time than the original edge EF route. If the user can be quickly notified while in transit, the user can thus dynamically adjust the route being taken to reflect the new predicted traffic information at multiple future time periods. Moreover, if the updated travel information had become available early in the first time period before a user had departed from node A, the user could be directed toward a new optimal route of ABDF.

Thus, FIGS. 1B-1F illustrate examples of using predicted future traffic conditions at multiple future times to provide benefits with respect to route planning.

FIGS. 2A-2F illustrate various graphical representations of example predictive models for representing knowledge about traffic conditions in a given geographic area. In some embodiments, such predictive models are automatically generated, maintained, and utilized to make predictions and/or forecasts regarding future traffic conditions at multiple future times, such as to predict future time series data for each road segment of interest. Such predictive models may include, but are not limited to, Bayesian or belief networks, decision trees, hidden Markov models, autoregressive trees, and neural networks. Some such predictive models may be probabilistic models, such as Bayesian network models, and such predictive models may be stored as part of one or more data structures on one or more computer-readable media.

FIGS. 2A-2D illustrate an example of the generation of a Bayesian network for representing probabilistic knowledge about traffic conditions. A Bayesian network is a directed acyclic graph ("DAG") consisting of nodes and edges. The nodes in the graph represent random variables, which may have discrete or continuous values that represent states in the domain being modeled. The edges in the graph represent dependence relationships between the variables. Nodes with no parents are root nodes. The probability distributions of root nodes are unconditional on any other nodes in the graph. A node with one or more parents has a probability distribution that is conditional on the probabilities of its parent nodes. By specifying the prior probabilities of the root nodes and the conditional probabilities of the non-root nodes, a Bayesian network graph can represent the joint probability distribution over all of the variables represented by nodes in the graph.

Figure 2A:
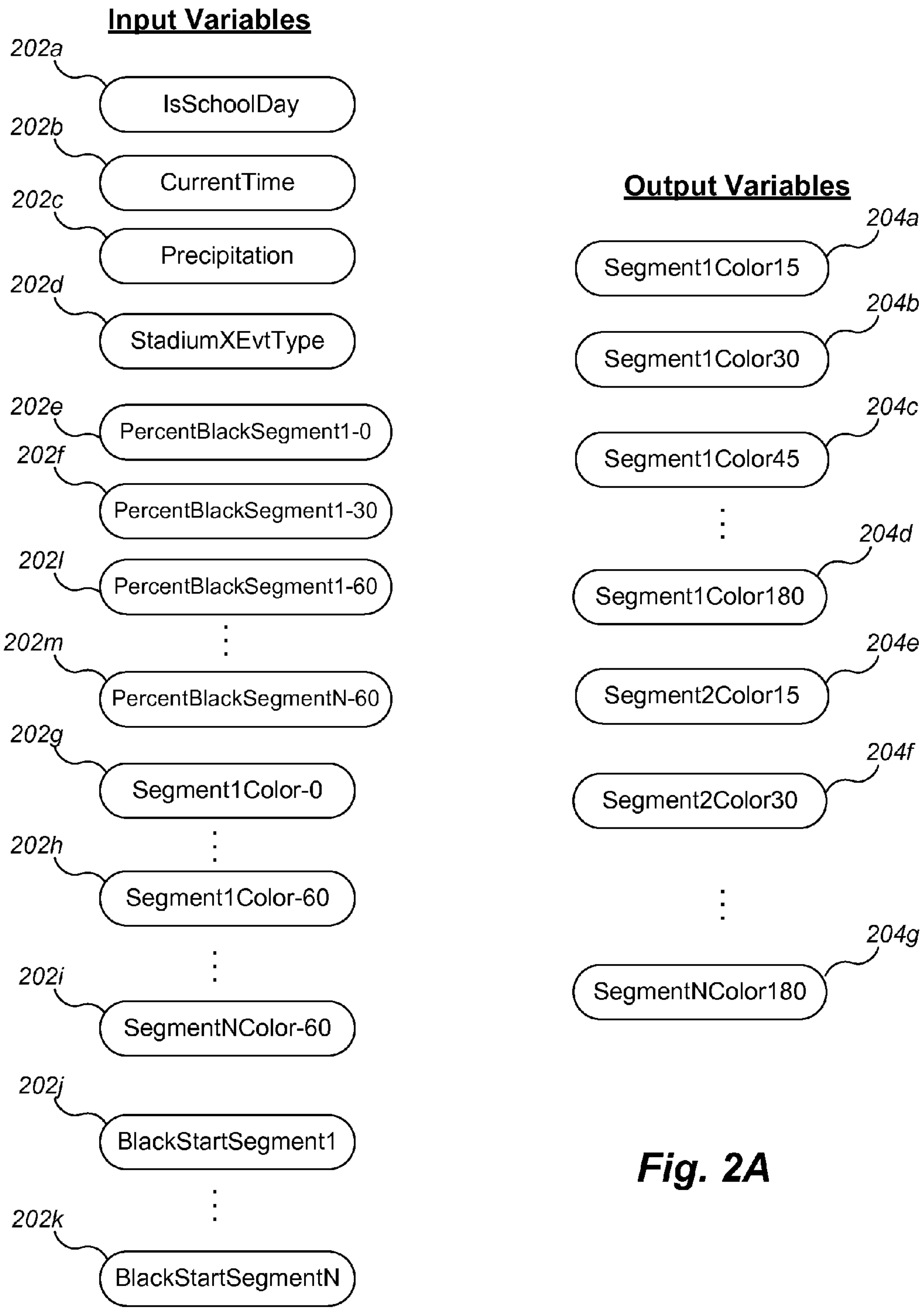

FIG. 2A illustrates an example collection of nodes that may be used to generate a Bayesian network predictive model for use in predicting traffic conditions. The illustrated nodes correspond to variables for which observed input data may be received, and to traffic conditions predictions that may be output with respect to a particular geographic area. In particular, nodes 202*a-m* represent various input variables for use in the predictive model, which in this example will correspond to root nodes in the Bayesian network that will be generated. The example input variables are as follows. Node 202*a* labeled IsSchoolDay may be used to represent whether school is in session on a particular day. Node 202*b* labeled CurrentTime may be used to represent the time of day. Node 202*c* labeled Precipitation may be used to represent an amount of precipitation over a particular time interval (e.g., the past 6 hours) or alternatively a current rate of precipitation. Node 202*d* labeled StadiumXEvtType may be used to represent the type of event (if any) that is scheduled for or currently taking place at stadium X. Nodes 202*e*, 202*f* and 202*l-m* may each be used to represent the traffic conditions on a particular road segment at the present time or at some time in the past, and in particular to represent the percentage of individual data sources (e.g., traffic sensors or other data sources) for that road segment that are reporting black (e.g., highly congested) traffic conditions at the time being represented—as previously noted, each road segment may be associated with one or more traffic sensors and/or with one or more other sources of traffic condition information for that road segment, as described in greater detail elsewhere. In some embodiments, traffic congestion level data for road segments is represented using colors (e.g., green, yellow, red, black) corresponding to enumerated increasing levels of traffic congestion, with green thus corresponding to the lowest level of traffic congestion and black corresponding to the highest level of traffic congestion. These nodes in this example are labeled PercentBlackSegmentX-Y, where X refers to a particular road segment and Y refers to a time in the past (e.g., in minutes, or other unit of time measurement) for which the percentage level of highly congested traffic on that road segment is being reported. For example, node 202*f* labeled PercentBlackSegment1-30 may be used to represent the percentage of black-level congestion for road segment Segment1 30 minutes ago.

Nodes 202*g*-*i* may each be used to represent the average or most common traffic conditions on a particular road segment at the present time or at some time in the past. These nodes are labeled SegmentXColor-Y in this example, where X refers to a particular road segment and Y refers to a time in the past (e.g., in minutes, or other unit of time measurement) at which a particular level of traffic congestion on that road segment has been identified (with the traffic congestion level represented here with its corresponding color). For example, node 202*h* labeled Segment1Color-60 may be used to represent the traffic conditions 60 minutes ago on road segment Segment1, with the level of traffic congestion at that time being illustrated with the appropriate congestion color. Nodes 202*j*-*k* may each be used to represent how long the levels of traffic congestion for a particular road segment have been continuously reported as being black. For example, node 202*j* labeled BlackStartSegment1 may be used to represent how long the level of traffic congestion on road segment Segment1 has been continuously reported as being black. A variety of other input variables may be used in other embodiments, such as to provide additional details related to various of the types of conditions shown or to represent other types of conditions, as discussed in greater detail below.

Nodes 204*a*-*g* in FIG. 2A represent output variables in the predictive model, and in particular correspond to predictions regarding traffic conditions that may be made given prior probabilities assigned to input nodes 202*a*-*m* and any current input information for those input nodes. Each output node 204*a*-204*g* in this example is labeled SegmentXColorY, where X refers to a particular road segment and Y refers to a time in the future for which a particular color corresponding to a level of traffic congestion on that road segment is predicted. For example, node 204*a* labeled Segment1Color15 may be used to represent the predicted traffic conditions on road segment Segment1 at 15 minutes in the future. For each road segment, traffic conditions are represented for a number of future times. For example, nodes 204*a*-204*d* represent the predicted traffic conditions on road segment Segment1 at 15-minute intervals over a three hour-long window into the future. In the illustrated embodiment, traffic conditions on N road segments are represented, each having 12 nodes corresponding to the twelve 15-minute time intervals over which traffic conditions are to be predicted. In other embodiments, larger or smaller future time windows and/or more or less time intervals may be represented.

FIG. 2B illustrates the possible values that may be taken by the variables corresponding to nodes depicted in FIG. 2A. In table 210, column 212*a* lists the variable name and column 212*b* lists the possible values the corresponding variable may take, which may be either continuous or discrete. Rows 214*a*-*g* each list an individual variable name and its corresponding range of values. For example, row 214*a* illustrates that the IsSchoolDay input variable may take the values true or false, corresponding to the observation that the current day is a school day or not, while row 214*b* illustrates that the Precipitation input variable may take one of the enumerated values of none, low, medium, or high. In this example, precipitation is measured as a discretized quantity over a fixed time interval for the sake of simplicity, although in other embodiments precipitation may be represented instead in other manners (e.g., as a continuous quantity of rain over a fixed time interval, as a current rate of rainfall, etc.). Row 214*c* illustrates that the StadiumXEvtType input variable may take one of the values none, football, concert, soccer, or other, although in other embodiments the event type may take on a greater or lesser number of possible values (e.g., a Boolean value indicating whether or not there is an event). Row 214*d* illustrates that each PercentBlackSegmentX-Y input variable may take a real numbered value in the closed interval from 0.0 to 1.0, representing the percentage of data points (e.g., road sensor readings, mobile data source values, etc.) or other sub-segments for the road segment SegmentX on which black traffic congestion level conditions are being reported at the corresponding time Y minutes in the past. Row 214*e* illustrates that each BlackStartSegmentX input variable may take one of the values notblack, 0, 5, 10, 15, . . . 30, with the "notblack" value indicating that the road segment SegmentX has not had a black traffic congestion level condition in the last 30 minutes, and with the other values indicating the closest number of minutes during the last 30 minutes that black traffic conditions have been continuously reported on the road segment SegmentX prior to the current time. For example, a value of 10 means that black traffic conditions have been continuously reported for approximately the last 10 minutes, and a value of 0 means that black traffic conditions have been continuously reported for zero minutes (or for less than 2½ minutes if time is rounded down) but that black conditions have previously been present during the last 30 minutes (otherwise, the notblack value would be used). Row 214*f* illustrates that the SegmentXColorY output variable may take one of the enumerated values green, yellow, red, or black, corresponding to increasing levels of traffic congestion reported on road segment X at Y minutes in the future. Row 214*g* illustrates that additional possible values for additional variables may be represented.

FIG. 2C illustrates a collection of example data corresponding to observations made regarding traffic conditions in a given geographic area. Each row represents an observation record consisting of related observations for each of multiple of the variables in the predictive model, such as to reflect a particular time or situation. In table 220, columns 222*a*-222*f* correspond to input variables represented by nodes 202*a*-*m* in FIG. 2A and columns 222*g*-222*j* correspond to output variables represented by nodes 204*a*-*g* in FIG. 2A, with some nodes not represented for the sake of clarity. For example, row 224*a* illustrates a first observation record corresponding to an observation at a time at which school was in session; no precipitation had been measured; a soccer event was scheduled to be occurring in stadium X; black traffic congestion level conditions were reported for 22 percent of road segment SegmentX at a time Y minutes ago; and black traffic congestion level conditions were continuously reported on road segment SegmentN for approximately zero minutes. In addition, 15 minutes after the above observations were made, red traffic congestion level conditions were reported on road segment Segment1; black traffic congestion level conditions were reported on road segment Segment1 30 minutes after those observations; and yellow traffic congestion level conditions were reported on road segment SegmentN 180 minutes after those observations. Rows 224*b-g* similarly illustrate additional observation records, and it will be appreciated that actual observation data may include very large numbers of such observations.

Figure 2D:
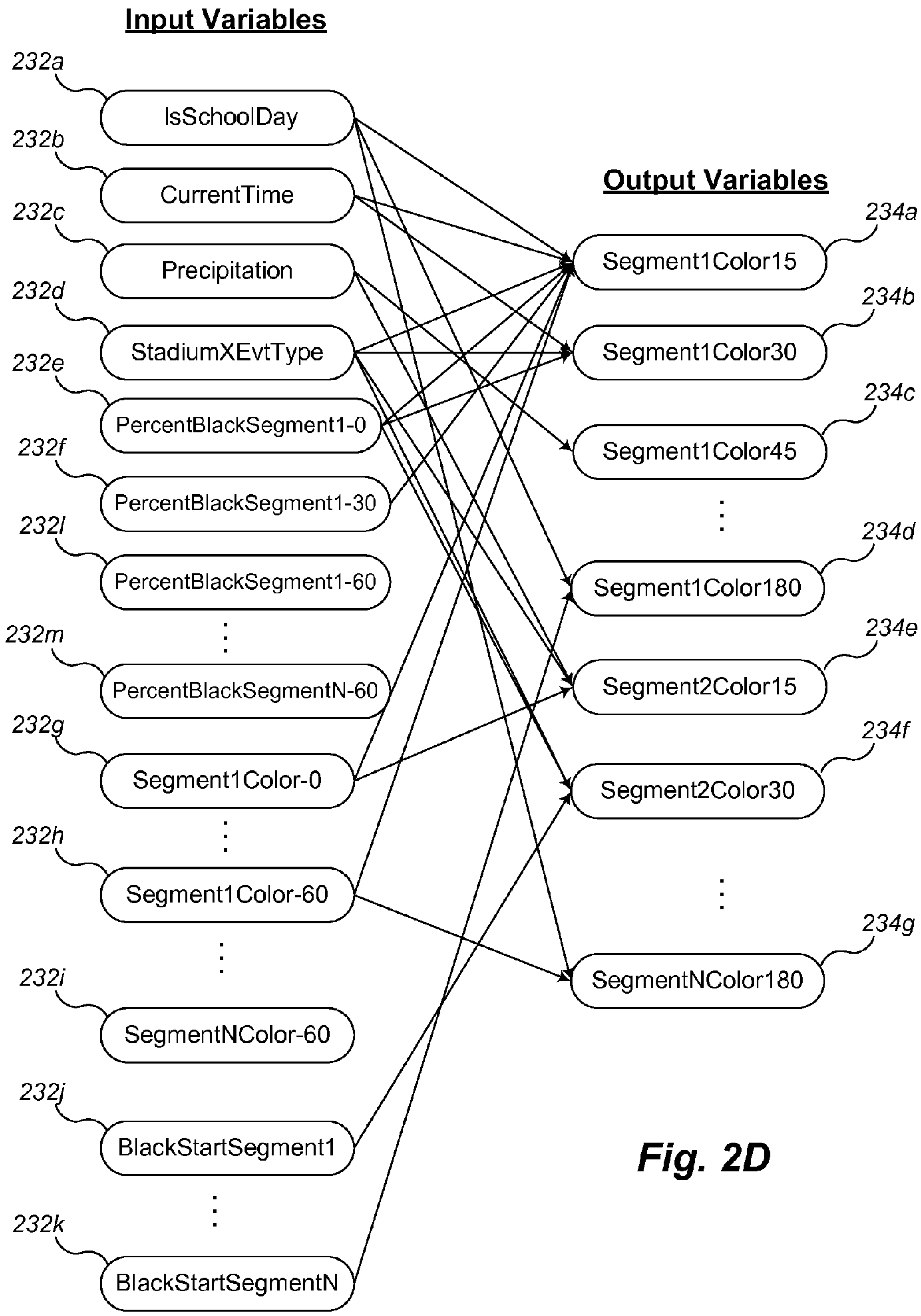

FIG. 2D illustrates an example Bayesian network that may be generated based on observation data such as that illustrated in FIG. 2C, and that may be used as a predictive model for generating future traffic conditions predictions. As is shown, the nodes depicted in FIG. 2D represent the same input and output variables as the nodes as in FIG. 2A, but arcs now connect the input variable nodes 232*a-m* to the output variable nodes 234*a-g* such that each of the output nodes is now the child of one or more of the input nodes 232*a-m* corresponding to input variables. Each arc directed from a parent node to a child node represents dependence between the child node and the parent node, meaning that the observed data from which the Bayesian network structure was generated indicates that the probability of the child node is conditional on the prior probability of its parent node. For example, node 234*c* in this example has a single parent node 232*c*, which can be understood to mean that the probability of the output variable Segment1Color45 represented by node 234*c* is conditional on the prior probability of the Precipitation input variable represented by node 232*c*. Thus, when input information is currently obtained for the Precipitation input variable, a predicted value for the traffic congestion level color of road segment Segment1 at future time 45 minutes can be determined. If a child node has multiple parent nodes, its probability is conditional on the probabilities of all combinations of its multiple parent nodes. For example, output node 234*a* has seven parent nodes in this example, those being input nodes 232*a*, 232*b*, 232*d*, 232*e*, 232*f*, 232*g* and 232*h*, which can be understood to mean that the probability of the output variable Segment1Color15 represented by node 234*a* is conditional on the prior probabilities of the input variable IsSchoolDay represented by node 232*a*, the input variable CurrentTime represented by node 232*b*, the input variable StadiumXEvtType represented by node 232*d*, the input variable PercentBlackSegment1-0 represented by node 232*e*, the input variable PercentBlackSegment1-30 represented by node 232*f*, the input variable Segment1Color-0 represented by node 232*g*, and the input variable Segment1Color-60 represented by node 232*h*.

Intuitively, the Bayesian network may be understood to represent causal relationships. For example, the illustrated Bayesian network expresses causal relationships between input factors such as school schedules, stadium events, weather, and current and past traffic conditions (as represented by input nodes 232*a-m*) and output future traffic conditions on various road segments (as represented by output nodes 234*a-g*). As one specific example, the traffic conditions reported 60 minutes ago on road segment Segment1 and whether it is a school day may influence the traffic conditions 180 minutes in the future on road segment SegmentN, such as if road segments Segment1 and SegmentN are related (e.g., are nearby to each other) and if significant traffic reported on road segment Segment1 on school days has a later impact on road segment SegmentN. This relationship is depicted in FIG. 2D by way of arcs from each of node 232*a* labeled IsSchoolDay and node 232*h* labeled Segment1Color-60 to node 234*g* labeled SegmentNColor180.

The structure and probability distributions of a Bayesian network such as that depicted in FIG. 2D may be generated from observation data via learning algorithms that determine the corresponding relationships and values, such as to determine a network structure that best matches the given observation data. In addition, at least some such learning algorithms can proceed with incomplete data (e.g., such as where some of the observation records are missing some data elements), and may further in some embodiments generate more complicated network structures (e.g., by identifying and representing one or more levels of intermediate nodes between the input nodes and output nodes, such as to reflect high-level relationships between groups of input nodes and/or output nodes). Additional details related to one set of example techniques for use in some embodiments for generating a Bayesian network based on observed case information are included in "A Tutorial on Learning Bayesian Networks," David Heckerman, March 1995, Technical Report MSR-TR-95-06 from the Microsoft Research Advanced Technology Division of Microsoft Corporation and available at ftp://ftp.research.microsoft.com/pub/tr/tr-95-06.pdf, which is hereby incorporated by reference in it entirety.

FIGS. 2E-J depict example decision trees that may each be generated based on observation data, such as that illustrated in FIG. 2C and in conjunction with the example Bayesian network illustrated in FIG. 2D, and that may each be used as part of a predictive model for generating future traffic conditions predictions for a particular road segment at a particular future time. As previously noted, a Bayesian network such as the one depicted in FIG. 2D indicates probabilistic relationships between various variables. A decision tree allows a subset of such relationships to be encoded in a manner that may be used to efficiently compute a predicted value for an output variable given a set of input values. In particular, a decision tree includes numerous decisions arranged in a tree structure, such that possible answers to a decision each lead to a different sub-tree based on that answer, and with the decisions and answers arranged so as quickly split multiple cases with different outcomes into different sub-trees. Given a set of observation data such as that shown in FIG. 2C, decision trees such as those shown in FIGS. 2E-J may be automatically generated via learning algorithms that determine the best decisions and answers to include in the decision tree and the best structure of the tree to facilitate rapid decisions based on input data to reflect current conditions. Additional details related to one set of example techniques for use in some embodiments for generating decision trees based on observed case information and/or a corresponding Bayesian network are included in "Scalable Classification over SQL Databases," Surajit Chaudhuri et al., Microsoft Research Division of Microsoft Corporation, March 1999, Proceedings of 15th International Conference on Data Engineering, Sydney, Australia and available at ftp://ftp.research.microsoft.com/users/AutoAdmin/icde99.pdf, which is hereby incorporated by reference in its entirety.

In the illustrated embodiment, each decision tree is used to generate the predicted traffic congestion level conditions on a single road segment at a single future time given current condition information for input variables. As described in more detail with reference to FIGS. 2A-D, in some embodiments, at each of one or more successive current times, traffic conditions for multiple future times are modeled based on the information available at the current time of the modeling, such as every 15 minutes of a three-hour time interval, resulting in twelve decision trees per modeled road segment. In FIGS. 2E-2J, the decision tree nodes are each labeled with a variable name corresponding to one of the input variables described with reference to FIGS. 2A-D, and the arcs emanating from a given node representing an input variable are each labeled with one or more of the possible values that may be taken by the variable. A path is determined by starting at the root node of the tree, using the value in the set of input data corresponding to the variable represented by that node to determine which arc to follow to a child node, and repeating the process for each successive child node along the path until a leaf node is reached. In FIGS. 2E-J, leaf nodes are rectangular in shape, and each represent a most likely future traffic congestion level prediction for the given set of input data.

Figure 2E:
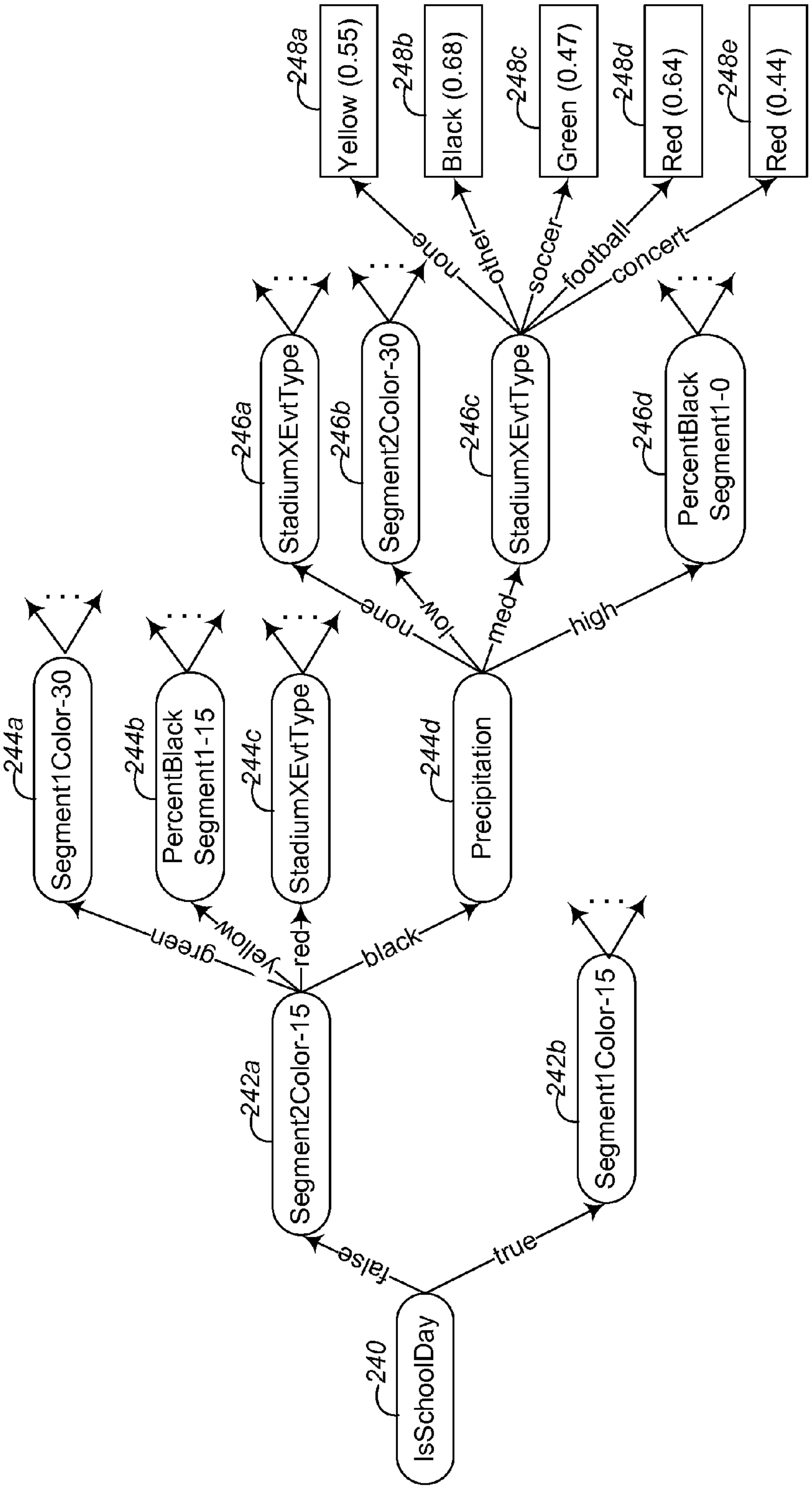

FIG. 2E shows a portion of an example decision tree for predicting future traffic congestion levels for road segment Segment1 at a future time of 15 minutes, and in particular illustrates a single path from the root node to possible leaf nodes, although it will be understood that in an actual decision tree numerous other paths will similarly lead to other such possible leaf nodes. In this example, the root node 240 of the illustrated decision tree corresponds to the IsSchoolDay input variable, with the path leading to node 242*b* being followed if it is currently a school day and with the path leading to node 242*a* being followed otherwise. Node 242*a* represents the Segment2Color-15 input variable, with possible values of the traffic congestion color (e.g., green, yellow, red, black) of road segment Segment2 fifteen minutes in the past leading to nodes 244*a-d* as shown. For example, if it is currently determined that black was reported 15 minutes ago on this road segment, the path to node 244*d* is followed, which represents the Precipitation input variable. Possible values of the Precipitation input variable from node 244*d* lead to nodes 246*a-d* as shown. For example, if the current measured precipitation is medium, the path to node 246*c* is followed, which represents the StadiumXEvtType input variable. Possible values of the StadiumXEvtType input variable lead to leaf nodes 248*a-e* as shown, with each of these leaf nodes representing an associated predicted future traffic congestion level on road segment Segment1 at a future time of 15 minutes. In this example, each leaf node is also labeled with a confidence level associated with the predicted future traffic congestion level (as shown by the value in parenthesis), such as may be determined in various ways. As one example, node 248*d* indicates that if a football game is currently scheduled, then a red traffic congestion level condition on road segment Segment1 is predicted for future time 15 minutes with a confidence level of 64%, while node 248*c* indicates that if a soccer game is instead currently scheduled then green traffic congestion level conditions are predicted on road segment Segment1 for future time 15 minutes with a confidence level of 47%. This difference may be attributed, for example, to the relative attendance and corresponding traffic for events of the two sports within the given geographic area, to different schedules (e.g., start, duration or end times) for such types of events, and/or to different patterns of traffic flow before and/or after the event (e.g., concert attendees may tend to arrive and/or depart en masse, whereas sporting event attendees may tend to arrive and/or depart more sporadically over larger time intervals).

Figure 2F:
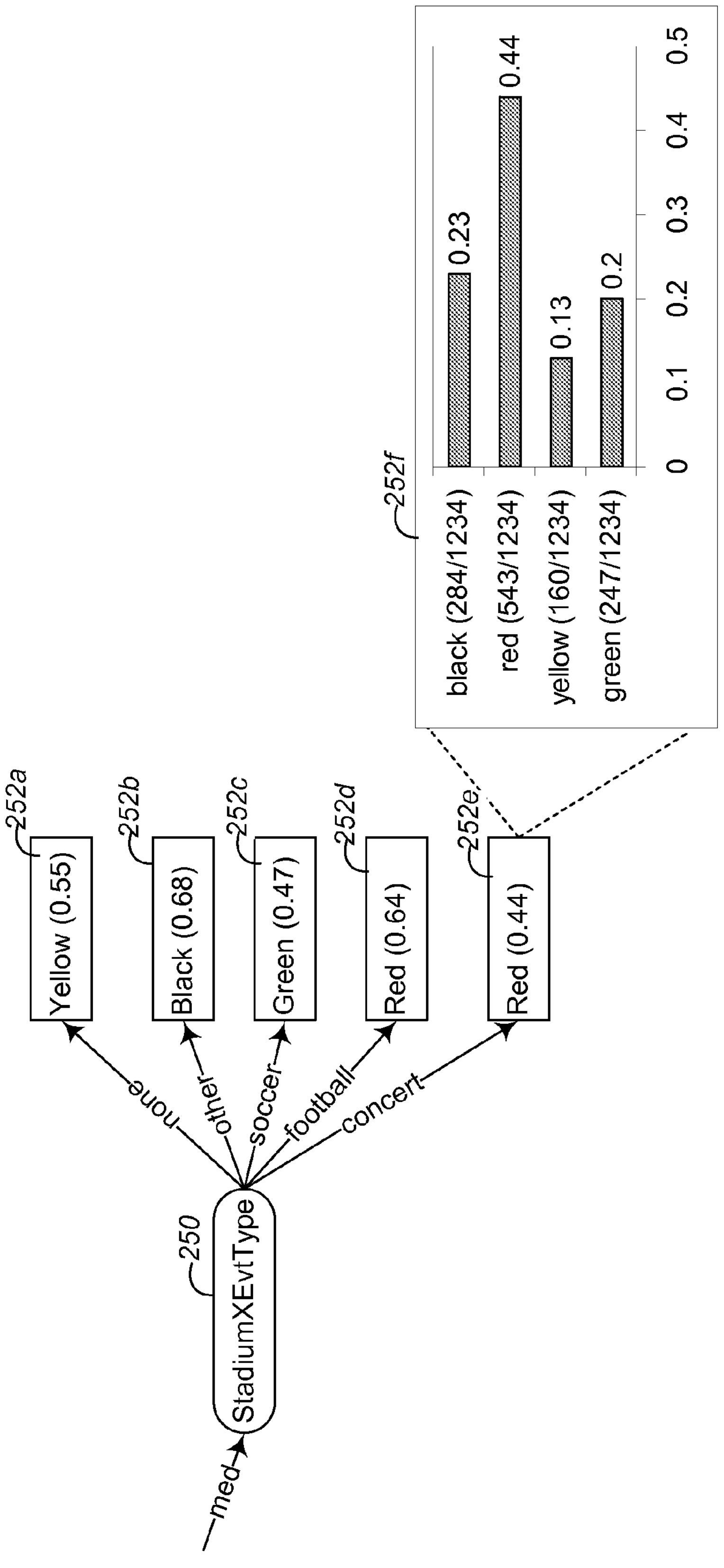

FIG. 2F shows a detailed view of one example leaf node of the example decision tree of FIG. 2E. In particular, a detailed view of leaf node 252*e* is shown, which corresponds to the leaf node 248*e* of FIG. 2E. FIG. 2F shows a histogram 252*f* for node 252*e*, which illustrates a probability distribution over all possible outcomes for node 252*e* in the observed data used to generate the decision tree. In this example, the histogram 252*f* shows the four possible traffic congestion level values (e.g., black, red, yellow, green) and the associated frequency of each value from the observed data. As can be seen from the histogram, the outcome with the highest frequency is a red traffic congestion level, with a frequency of 44% of the observed cases (shown as being the outcome in 543 of 1234 observed cases). In this example, the highest frequency outcome will be selected as the predicted outcome at a particular leaf node, and the frequency of that particular outcome in the observed data will be selected as the confidence value for the prediction. In other embodiments, confidence values may be determined in other manners, such as based on a relationship of the highest frequency outcome to an overall mean, median, or other statistical aggregate measure of the outcomes.

Figure 2G:
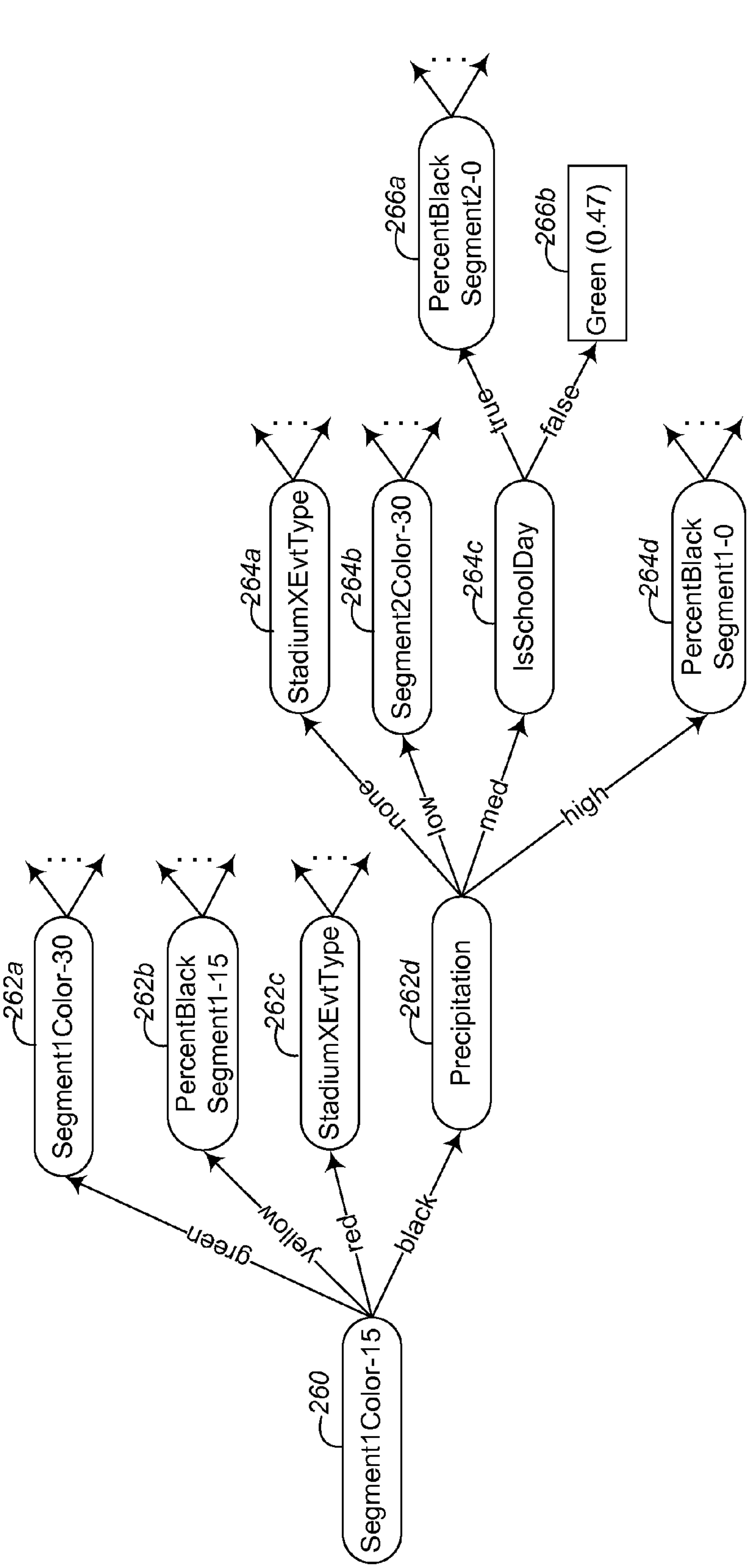

In a manner similar to that of FIG. 2E, FIG. 2G shows a portion of another example decision tree for road segment Segment1, with this decision tree representing predicted future traffic congestion levels for road segment Segment1 at a future time of 30 minutes. In particular, this decision tree illustrates a path from root node 260 to a leaf node 266*b*, which results in a most likely prediction of green traffic congestion level conditions with an associated confidence value of 47% based on input conditions corresponding to that path. In this example, the structure of the decision tree of FIG. 2G differs from that of the decision tree of FIG. 2E, even though it is used to compute predictions for the same road segment, based on the observed data reflecting different relevant factors for 30-minute future predictions than for 15-minute future predictions. For example, the decision tree of FIG. 2G begins with node 260 that corresponds to the input variable Segment1Color-15, whereas the decision tree of FIG. 2E begins with node 240 that corresponds to the input variable IsSchoolDay.

Figure 2H:
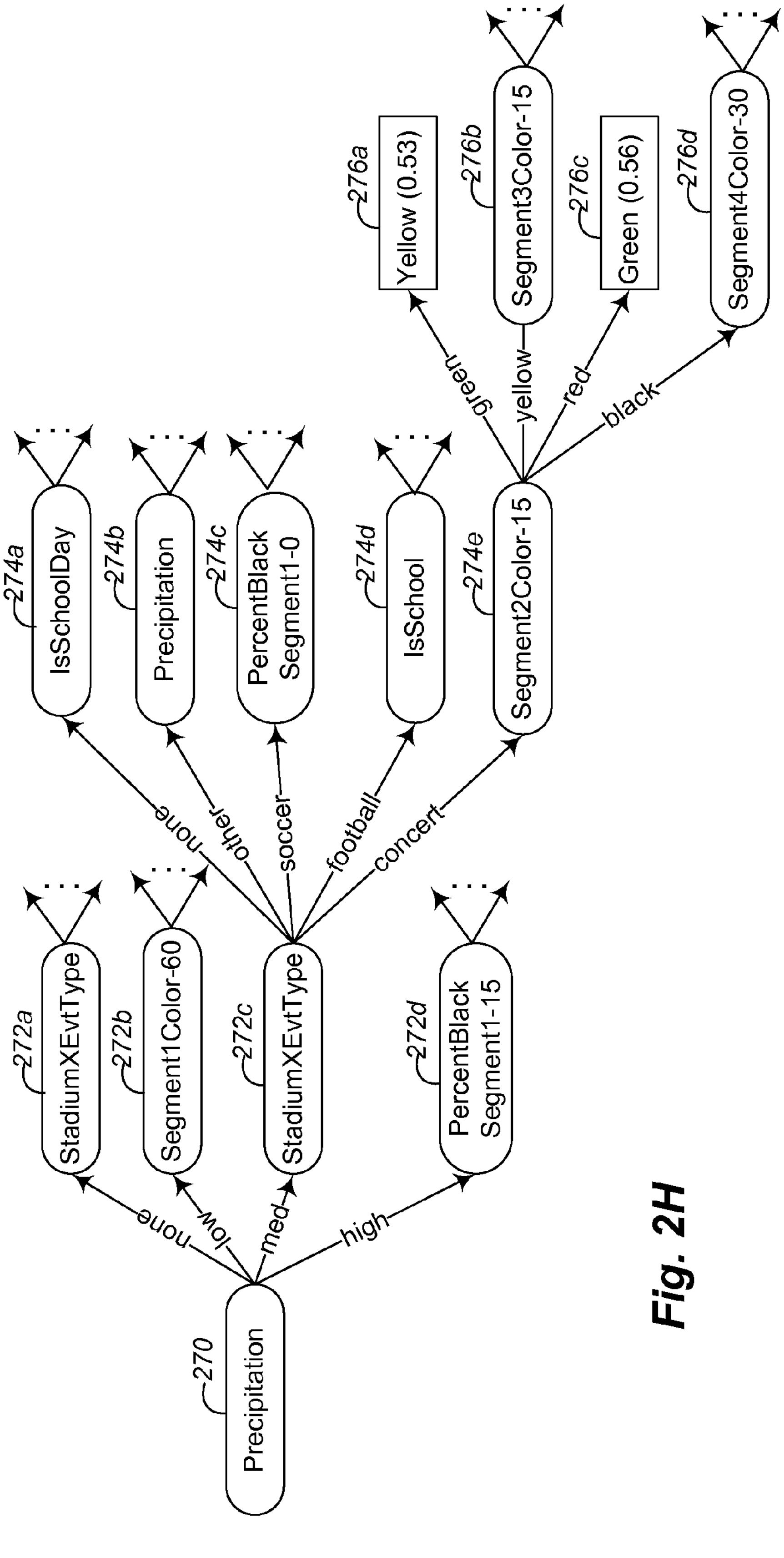

FIG. 2H shows a portion of an example decision tree for predicting future traffic congestion levels for road segment Segment1 at a future time of 60 minutes. In a similar manner to that of FIG. 2G, the structure of this decision tree differs from that of the tree in FIG. 2E, as well as that of FIG. 2G. This decision tree shows a path from root node 270 to a leaf node 276*a* that yields a most likely prediction of yellow traffic congestion level conditions with an associated confidence value of 53%. In addition, this decision tree shows a second path from root node 270 to a leaf node 276*c* that yields a most likely prediction of green traffic congestion level conditions with an associated confidence value of 56%.

Figure 2I:
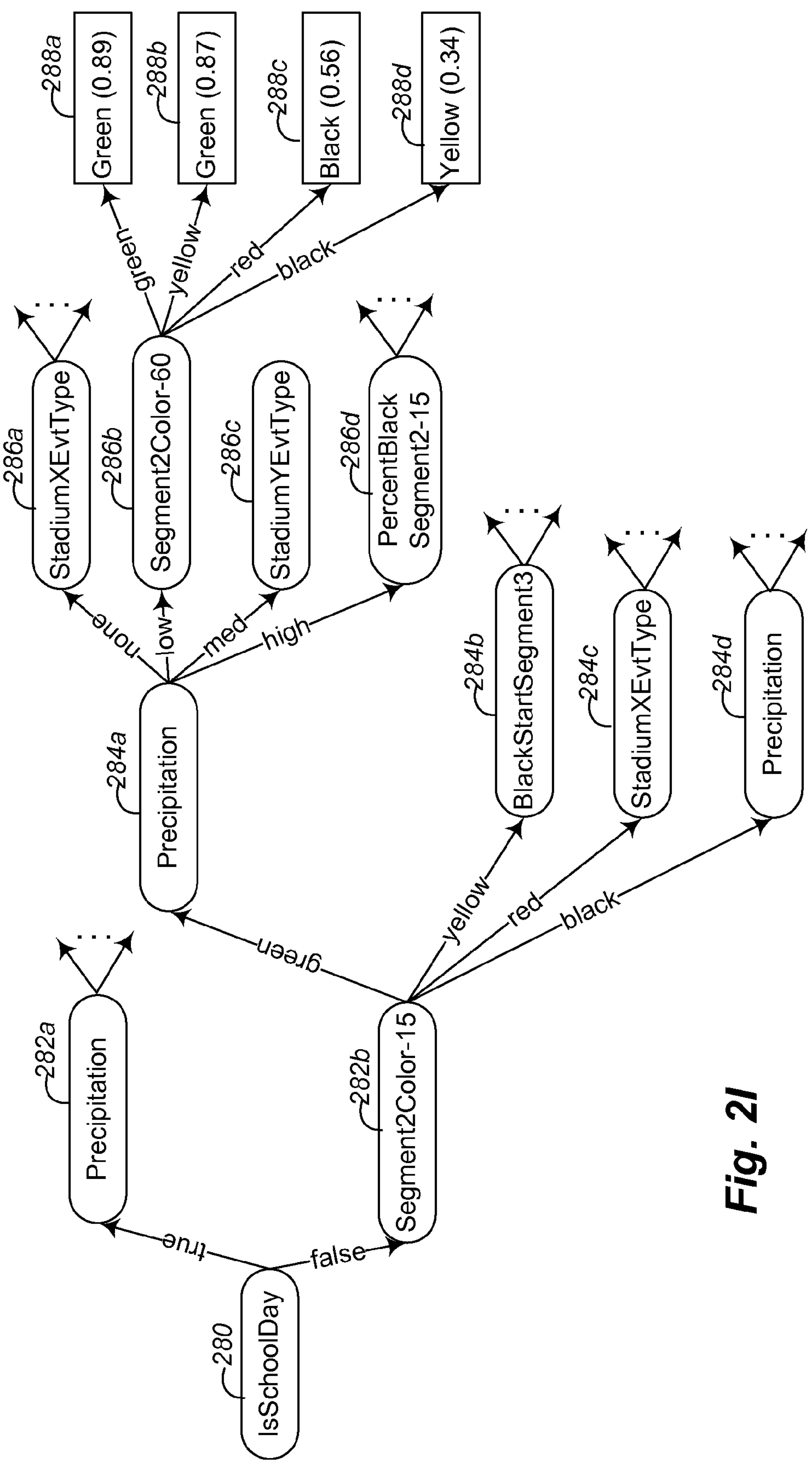

FIG. 2I shows a portion of an example decision tree for predicting future traffic congestion levels for road segment Segment2 at a future time of 30 minutes. This decision tree may be used to predict traffic conditions for road segment Segment2, as opposed to road segment Segment1 as depicted in FIGS. 2E, 2G, and 2H, but otherwise has a similar structure and use as the previously discussed decision trees. This decision tree shows four paths from root node 280 to leaf nodes 288*a-d*, which result in most likely predictions of green, green, black, and yellow traffic congestion level conditions with associated confidence values of 89%, 87%, 56%, and 34%, respectively.

Figure 2J:
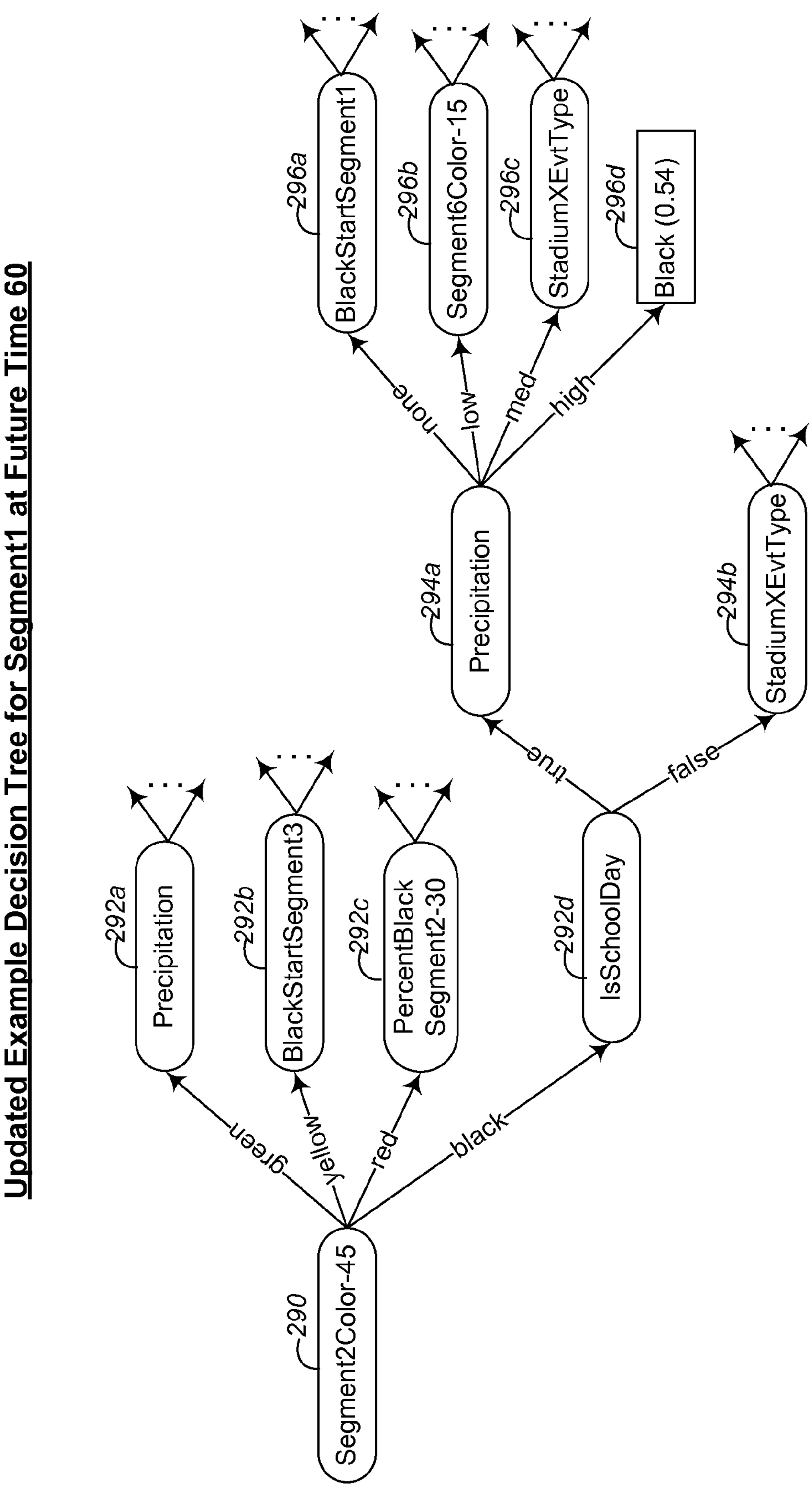

FIG. 2J shows a portion of an updated example decision tree for road segment Segment1 at a future time of 60 minutes, with a particular path illustrated from root node 290 to a leaf node 296*d* that yields a most likely prediction of black traffic congestion level conditions with an associated confidence value of 54%. As described in more detail elsewhere, in some embodiments such decision trees and/or the associated Bayesian network prediction models are updated and/or re-created when new observed case information becomes available. These updates may occur at various times, such as on a periodic basis (e.g., weekly, monthly, etc.), upon request, and/or upon the accumulation of sufficient new observed case data. In addition, in some embodiments the new observed case data may merely be used to update the predicted values for existing leaf nodes (e.g., with respect to histogram 252*f* of FIG. 2F, to update that black is now the most frequent outcome for node 252*e* given the new observed data based on 1284 of 2334 total occurrences), while in other embodiments the new observed case data is used to generate new decision trees with potentially different structures. In this example, the new decision tree depicted in FIG. 2J differs in structure from that shown in FIG. 2H, even though both decision trees predict future traffic congestions levels for road segment Segment1 at a future time of 60 minutes, based on the changes in the observed case data.

Figure 3:
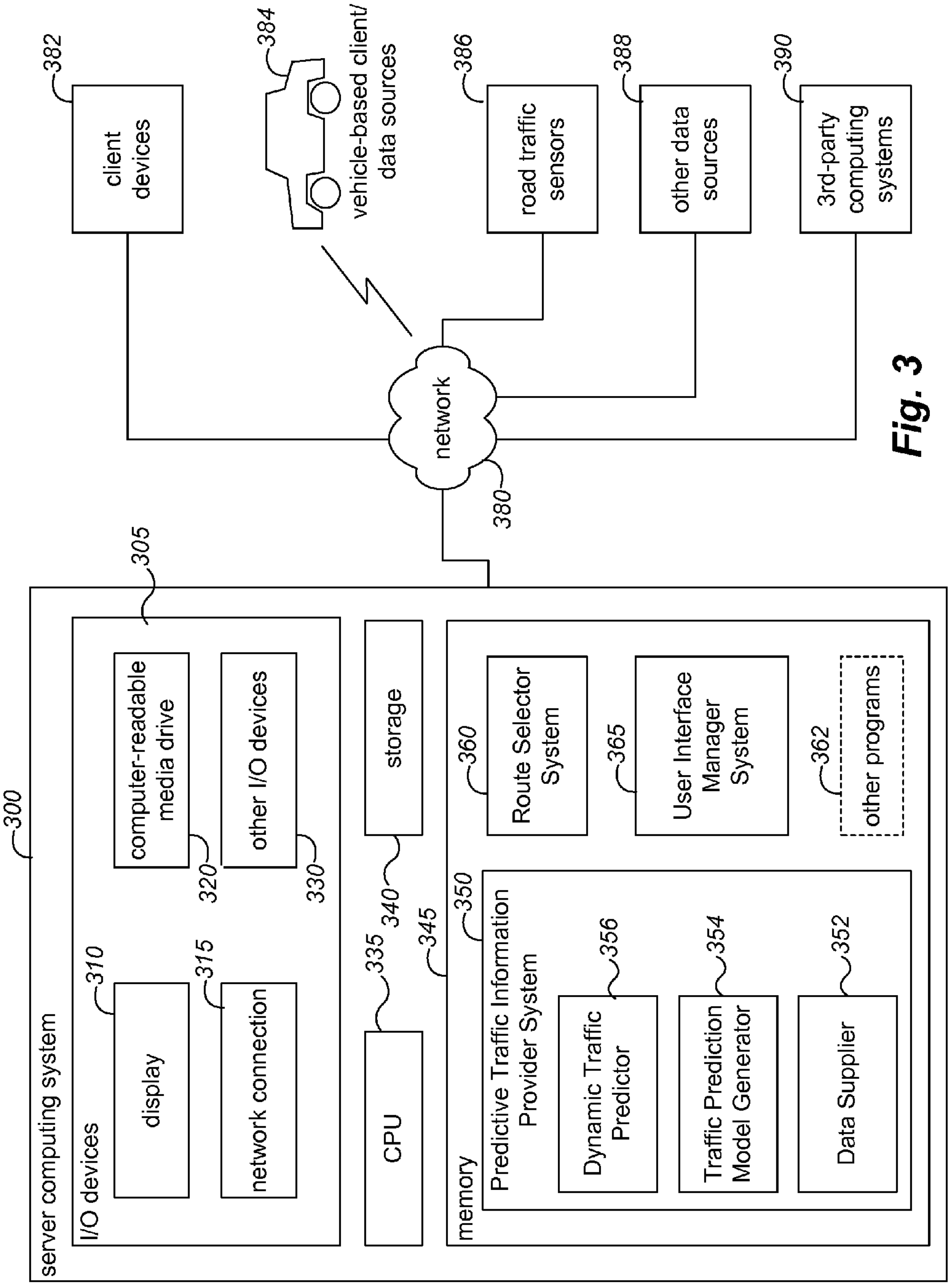
FIG. 3 is a block diagram illustrating a computing system suitable for executing an embodiment of the described Predictive Traffic Information Provider system.

FIG. 3 is a block diagram illustrating an embodiment of a server computing system 300 that is suitable for performing at least some of the described techniques, such as by executing an embodiment of a User Interface Manager system 365, and/or by executing an embodiment of a Predictive Traffic Information Provider system and/or a Route Selector system. The server computing system 300 includes a central processing unit ("CPU") 335, various input/output ("I/O") components 305, storage 340, and memory 345, with the illustrated I/O components including a display 310, a network connection 315, a computer-readable media drive 320, and other I/O devices 330 (e.g., keyboards, mice or other pointing devices, microphones, speakers, etc.).

In the illustrated embodiment, a Predictive Traffic Information Provider system 350, a Route Selector system 360 and optional other systems provided by programs 362 are executing in memory 345 in order to perform at least some of the described techniques, with these various executing systems generally referred to herein as predictive traffic information systems. The server computing system and its executing systems may communicate with other computing systems via a network 380 (e.g., the Internet, one or more cellular telephone networks, etc.), such as various client devices 382, vehicle-based clients and/or data sources 384, road traffic sensors 386, other data sources 388, and third-party computing systems 390. In particular, one or more of the predictive traffic information systems receives various information regarding current conditions and/or previous observed case data from various sources, such as from the road traffic sensors, vehicle-based data sources and other data sources. The Predictive Traffic Information Provider system then uses the received data to generate future traffic condition predictions for multiple future times, and provides the predicted information to the Route Selector system and optionally to one or more other recipients, such as one or more predictive traffic information systems, client devices, vehicle-based clients, third-party computing systems, and/or users. The Route Selector system uses the received predicted future traffic condition information to generate route-related information, such as for frequently used routes and/or upon request for indicated routes, and similarly provides such route-related information to one or more other predictive traffic information systems, client devices, vehicle-based clients, and/or third-party computing systems.

The client devices 382 may take various forms in various embodiments, and may generally include any communication devices and other computing devices capable of making requests to and/or receiving information from the predictive traffic information systems. In some cases, the client devices may run interactive console applications (e.g., Web browsers) that users may utilize to make requests for traffic-related information based on predicted future traffic information, while in other cases at least some such traffic-related information may be automatically sent to the client devices (e.g., as text messages, new Web pages, specialized program data updates, etc.) from one or more of the predictive traffic information systems.

The road traffic sensors 386 include multiple sensors that are installed in, at, or near various streets, highways, or other roadways, such as for one or more geographic areas. These sensors include loop sensors that are capable of measuring the number of vehicles passing above the sensor per unit time, vehicle speed, and/or other data related to traffic flow. In addition, such sensors may include cameras, motion sensors, radar ranging devices, and other types of sensors that are located adjacent to a roadway. The road traffic sensors 386 may periodically or continuously provide measured data via wire-based or wireless-based data link to the Predictive Traffic Information Provider system 350 via the network 380 using one or more data exchange mechanisms (e.g., push, pull, polling, request-response, peer-to-peer, etc.). In addition, while not illustrated here, in some embodiments one or more aggregators of such road traffic sensor information (e.g., a governmental transportation body that operates the sensors) may instead obtain the raw data and make that data available to the predictive traffic information systems (whether in raw form or after it is processed).

The other data sources 388 include a variety of types of other sources of data that may be utilized by one or more of the predictive traffic information systems to make predictions related to traffic flow and/or to make selections of traffic routes. Such data sources include, but are not limited to, sources of current and past weather conditions, short and long term weather forecasts, school schedules and/or calendars, event schedules and/or calendars, traffic incident reports provided by human operators (e.g., first responders, law enforcement personnel, highway crews, news media, travelers, etc.), road work information, holiday schedules, etc.

The vehicle-based clients/data sources 384 in this example may each be a computing system located within a vehicle that provides data to one or more of the predictive traffic information systems and/or that receives data from one or more of those systems. In some embodiments, the Predictive Traffic Information Provider system may utilize a distributed network of vehicle-based data sources that provide information related to current traffic conditions for use in traffic prediction. For example, each vehicle may include a GPS ("Global Positioning System") device (e.g., a cellular telephone with GPS capabilities, a stand-alone GPS device, etc.) and/or other geo-location device capable of determining the geographic location, speed, direction, and/or other data related to the vehicle's travel, and one or more devices on the vehicle (whether the geo-location device(s) or a distinct communication device) may from time to time obtain such data and provide it to one or more of the predictive traffic information systems (e.g., by way of a wireless link)—such vehicles may include a distributed network of individual users, fleets of vehicles (e.g., for delivery companies, transportation companies, governmental bodies or agencies, vehicles of a vehicle rental service, etc.), vehicles that belong to commercial networks providing related information (e.g., the OnStar service), a group of vehicles operated in order to obtain such traffic condition information (e.g., by traveling over predefined routes, or by traveling over roads as dynamically directed, such as to obtain information about roads of interest), etc. Moreover, while not illustrated here, in at least some embodiments other mobile data sources may similarly provide actual data based on travel on the roads, such as based on computing devices and other mobile devices of users who are traveling on the roads (e.g., users who are operators and/or passengers of vehicles on the roads). In addition, such vehicle-based information may be generated in other manners in other embodiments, such as by cellular telephone networks, other wireless networks (e.g., a network of Wi-Fi hotspots) and/or other external systems (e.g., detectors of vehicle transponders using RFID or other communication techniques, camera systems that can observe and identify license plates and/or users' faces) that can detect and track information about vehicles passing by each of multiple transmitters/receivers in the network. Such generated vehicle-based travel-related information may then be used for a variety of purposes, such as to provide information similar to that of road sensors but for road segments that do not have functioning road sensors (e.g., for roads that lack sensors, such as for geographic areas that do not have networks of road sensors and/or for arterial roads that are not significantly large to have road sensors, for road sensors that are broken, etc.), to verify duplicative information that is received from road sensors or other sources, to identify road sensors that are providing inaccurate data (e.g., due to temporary or ongoing problems), etc. The wireless links may be provided by a variety of technologies known in the art, including satellite uplink, cellular network, WI-FI, packet radio, etc., although in at least some embodiments such information about road traffic conditions may be obtained from mobile devices (whether vehicle-based devices and/or user devices) via physically download when the device reaches an appropriate docking or other connection point (e.g., to download information from a fleet vehicle once it has returned to its primary base of operations or other destination with appropriate equipment to perform the information download). In some cases, various factors may cause it to be advantageous for a mobile device to store multiple data samples that are acquired over a determined period of time (e.g., data samples taken at a pre-determined sampling rate, such as 30 seconds or a minute) and/or until sufficient data samples are available (e.g., based on a total size of the data), and to then transmit the stored data samples together (or an aggregation of those samples) after the period of time—for example, the cost structure of transmitting data from a vehicle-based data source via a particular wireless link (e.g., satellite uplink) may be such that transmissions occur only after determined intervals (e.g., every 15 minutes), one or more of the geo-location and/or communication devices may be configured or designed to transmit at such intervals, an ability of a mobile device to transmit data over a wireless link may be temporarily lost (e.g., such as for a mobile device that typically transmits each data sample individually, such as every 30 seconds or 1 minute, and possibly due to factors such as a lack of wireless coverage in an area of the mobile device, other activities being performed by the mobile device or a user of the device, or a temporary problem with the mobile device or an associated transmitter) such that storage of data samples will allow later transmission or physical download, etc. For example, if a wireless transmission of up to 1000 units of information costs $0.25 cents, and each data sample is 50 units in size, it may be advantageous to sample every minute and send a data set comprising 20 samples every 20 minutes, rather than sending samples more frequently (e.g., every minute). Moreover, in some embodiments additional information may be generated and provided by a mobile device based on multiple stored data samples. For example, if a particular mobile device is able to acquire only information about a current instant position during each data sample, but is not able to acquire additional related information such as speed and/or direction, such additional related information may be calculated or otherwise determined based on multiple subsequent data samples.

Alternatively, some or all of the vehicle-based clients/data sources 384 may each have a computing system located within a vehicle to obtain information from one or more of the predictive traffic information systems, such as for use by an occupant of the vehicle. For example, the vehicle may contain an in-dash navigation system with an installed Web browser or other console application that a user may utilize to make requests for traffic-related information via a wireless link from the Predictive Traffic Information Provider system or the Route Selector system, or instead such requests may be made from a portable device of a user in the vehicle. In addition, one or more of the predictive traffic information systems may automatically transmit traffic-related information to such a vehicle-based client device (e.g., updated predicted traffic information and/or updated route-related information) based upon the receipt or generation of updated information.

The third-party computing systems 390 include one or more optional computing systems that are operated by parties other than the operator(s) of the predictive traffic information systems, such as parties who receive traffic-related data from one or more of the predictive traffic information systems and who make use of the data in some manner. For example, the third-party computing systems 390 may be systems that receive predicted traffic information from one or more of the predictive traffic information systems, and that provide related information (whether the received information or other information based on the received information) to users or others (e.g., via Web portals or subscription services). Alternatively, the third-party computing systems 390 may be operated by other types of parties, such as media organizations that gather and report predicted traffic condition and route information to their consumers, or online map companies that provide predicted traffic-related information to their users as part of travel-planning services.

In this illustrated embodiment, the Predictive Traffic Information Provider system 350 includes a Data Supplier component 352, a Traffic Prediction Model Generator component 354, and a Dynamic Traffic Predictor component 356. The Data Supplier component obtains current condition data that may be used by one or more of the other components or other predictive traffic information systems, such as from the data sources previously discussed, and makes the information available to the other components and predictive traffic information systems. In some embodiments, the Data Supplier component may optionally aggregate obtained data from a variety of data sources, and may further perform one or more of a variety of activities to prepare data for use, such as to place the data in a uniform format; to detect and possibly correct errors or missing data (e.g., due to sensor outages and/or malfunctions, network outages, data provider outages, etc.); to filter out extraneous data, such as outliers; to discretize continuous data, such as to map real-valued numbers to enumerated possible values; to sub-sample discrete data (e.g., by mapping data in a given range of values to a smaller range of values); to group related data (e.g., a sequence of multiple traffic sensors located along a single segment of road that are aggregated in an indicated manner); etc. Information obtained by the Data Supplier component may be provided to other predictive traffic information systems and components in various ways, such as to notify others when new data is available, to provide the data upon request, and/or to store the data in a manner that is accessible to others (e.g., in one or more databases on storage, not shown). Additional details related to the aggregation, filtering, conditioning, and provision of obtained traffic-related data are included in U.S. patent application Ser. No. 11/540,342, filed Sep. 28, 2006 and entitled "Rectifying Erroneous Traffic Sensor Data," which is hereby incorporated by reference in its entirety.

In the illustrated embodiment, the Traffic Prediction Model Generator component uses obtained observation case data to generate predictive models used to make predictions about traffic conditions, as previously discussed. In some embodiments, the Traffic Prediction Model Generator component utilizes historical observation case data to automatically learn the structure of a Bayesian network for a given group of one or more roads, and further automatically learns multiple decision tree models that each may be used to make predictions of future traffic flow on a particular road segment for a particular future time. The created predictive models may then be provided to other predictive traffic information systems and components in various ways, such as to notify others when the new models are available, to provide the models upon request, and/or to store the models in a manner that is accessible to others (e.g., in one or more databases on storage, not shown).

The Dynamic Traffic Predictor component utilizes the predictive models generated by the Traffic Prediction Model Generator component to generate predictions of future traffic conditions for multiple future times, such as based on real-time and/or other current condition information. Such predictions may be made at various times, such as periodically (e.g., every five or ten minutes), when new and/or anomalous data (e.g., a traffic accident incident report) has been received, upon request, etc. The generated predicted future traffic condition information may then be provided to other predictive traffic information systems and components and/or to others in various ways, such as to notify others when new information is available, to provide the information upon request, and/or to store the information in a manner that is accessible to others (e.g., in one or more databases on storage, not shown).

The Route Selector system selects travel route information based on predicted future traffic condition information, and provides such route information to others in various ways. In some embodiments, the Route Selector system receives a request from a client to provide information related to one or more travel routes between a starting and ending location in a given geographic area at a given date and/or time. In response, the Route Selector system obtains predictions of future road conditions for the specified area during the specified time period from, for example, the Predictive Traffic Information Provider system, and then utilizes the predicted future road condition information to analyze various route options and to select one or more routes based on indicated criteria (e.g., shortest time). The selected route information may then be provided to other predictive traffic information systems and components and/or to others in various ways, such as to notify others when information is available, to provide the information upon request, and/or to store the information in a manner that is accessible to others (e.g., in one or more databases on storage, not shown).

In the illustrated embodiment, an embodiment of the User Interface ("UI") Manager system 365 is also executing in memory 345 in order to perform at least some of the described techniques related to providing UIs for presenting traffic-related information and/or for providing the traffic-related information. In some embodiments, the UI Manager system 365 receives requests to provide traffic information for one or more road segments in a geographic area. The requests may indicate various types of traffic-related information (e.g., geographic, travel routes, current and/or predicted traffic condition information, etc.), such as to initially provide a UI to present the information and/or to update information in a previously provided UI (e.g., in response to user manipulation of user-selectable controls in the provided UI). In response, the UI Manager system 365 selects and provides appropriate traffic information, such as for display as part of a UI. The user interface may be provided (e.g., sent, transmitted, displayed, etc.) to various destinations, such as clients 382, clients 384, 3rd-party computing systems 390, and/or display 310.

It will be appreciated that the illustrated computing systems are merely illustrative and are not intended to limit the scope of the present invention. Computing system 300 may be connected to other devices that are not illustrated, including through one or more networks such as the Internet or via the Web. More generally, a "client" or "server" computing system or device, or UI Manager system and/or component, may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available. For example, in some embodiments the UI Manger system 365 may execute on computing system 300 without any other executing systems or programs 350, 360 and/or 362. Note also that while various items are illustrated as being stored in memory or on storage while being used, these items or portions of them can be transferred between memory and other storage devices for purposes of memory management and/or data integrity. Alternatively, in other embodiments some or all of the software components and/or modules may execute in memory on another device and communicate with the illustrated computing system/device via inter-computer communication. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
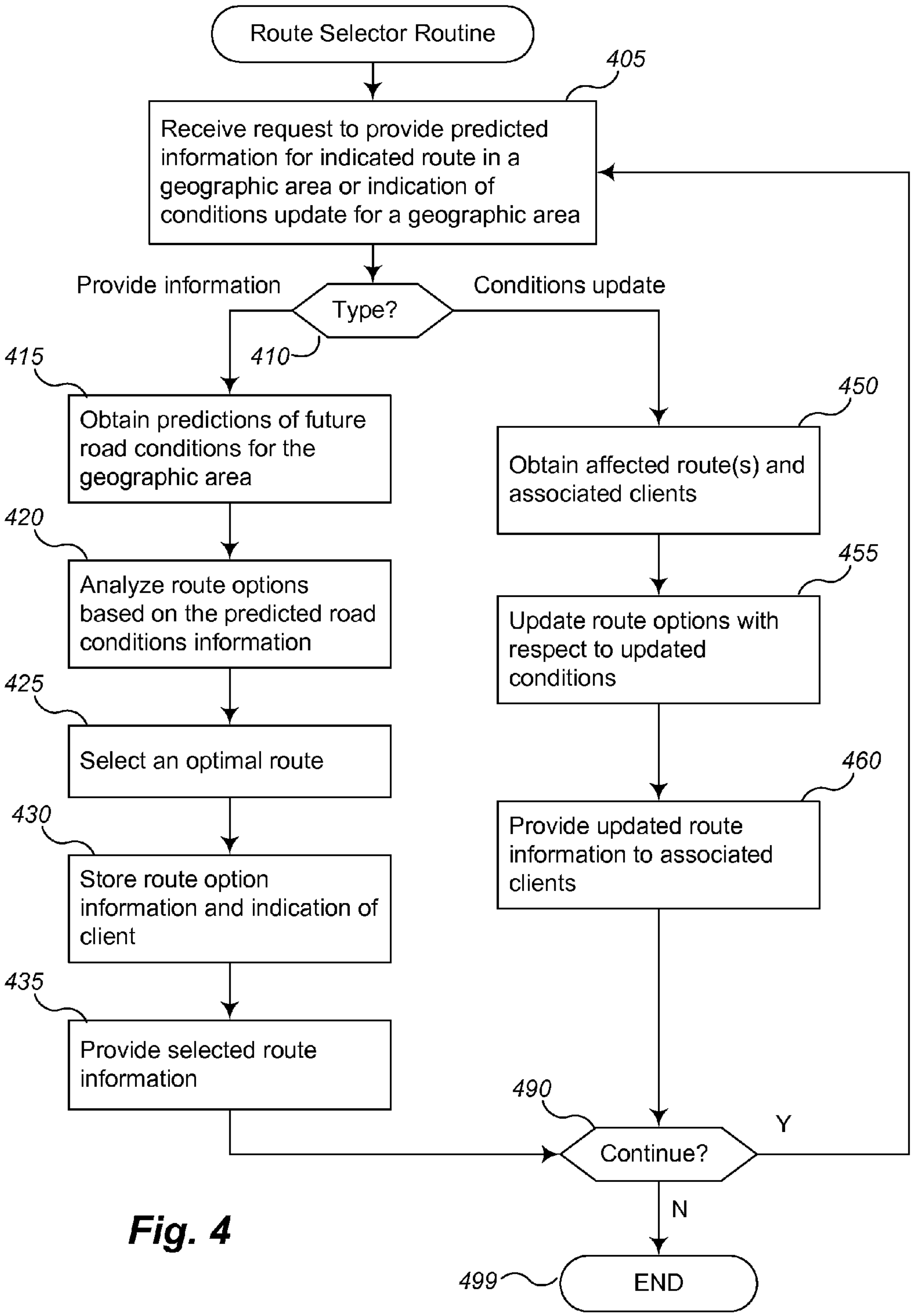
FIG. 4 is a flow diagram of an embodiment of a Route Selector routine.

FIG. 4 is a flow diagram of an embodiment of a Route Selector routine. This routine may be provided, for example, by execution of the Route Selector system 360 of FIG. 3. The routine uses predicted future traffic conditions at multiple future times to plan routes through a network of roads, such as to determine one or more routes that are predicted to be optimal, near-optimal, or otherwise preferred.

The routine begins in step 405 and receives a request to provide predicted information for an indicated route in a geographic area (e.g., a route indicated with a starting location, an ending location, a preferred arrival time, a preferred departure time and/or other indicated criteria for use in identifying or evaluating route options) or receives an indication of an update in relevant conditions for a geographic area. In step 410, the route determines the type of input received, and if a request to provide route information has been received, the routine proceeds to step 415 and obtains predictions of future road conditions at one or more future times for the geographic area, such as for future times that correspond to the preferred travel time (if any). The routine may obtain this information from, for example, the Predictive Traffic Information Provider system 350 described with reference to FIG. 3, such as in an interactive manner or instead by retrieving previously generated prediction information. In step 420, the routine then analyzes route options based on the obtained predicted future road conditions information, such as to determine predicted travel times for each of the route options. The route options may include a number of alternative routes to travel from the indicated starting location (if any) to the indicated ending location (if any), such as a set of pre-determined route options or instead all route options that satisfy indicated criteria (e.g., using roads of a certain size or class, using any roads for which predicted future information is available, using all possible route options, using domain-specific heuristics to constrain the number of possible routes in order to reduce the search space, etc.). In step 425, the routine then optionally selects a predicted optimal route from the set of route options, or in some embodiments more generally ranks the route options (e.g., in a relative or absolute manner) using one or more criteria (e.g., the minimum travel time, minimum travel distance, minimum travel speed, minimum travel speed variability, maximum confidence in a route that otherwise satisfies such criteria, etc. or combinations thereof) and selects some or all of those route options. In step 430, the routine stores the route option information, optionally with an indication of the client that requested the route information (e.g., to enable later provision of updated information to the client should conditions change), and in step 435 provides at least some of the selected route information to the client (e.g., only information for the predicted optimal or top-ranked route, information for a specified number of routes and/or all route options, etc.).

If it is instead decided in step 410 that an indication of a conditions update for a geographic area has been received (e.g., an indication of a traffic incident along a particular roadway), the routine proceeds to step 450 and identifies any affected route(s) whose associated clients are known. In step 455, the routine updates route options with respect to the updated conditions for the identified routes, with the updated conditions possibly including real-time traffic data and/or updated predictions information from the Predictive Traffic Information Provider system, and with the updated route options possibly resulting in a different predicted optimal or top-ranked route option. In step 460, the routine then optionally provides updated route information to the associated clients, such as if the updated route options information would result in different client behavior. For example, the updated route information may be provided to vehicle-based clients that may be traveling on or near the affected routes, or more generally to client devices 382 that had previously been used to obtain information regarding one or more of the affected routes.

After steps 435 or 460, the routine continues to step 490 to determine whether to continue. If so, the routine returns to step 405, and if not continues to step 499 and ends.

Figure 5A:
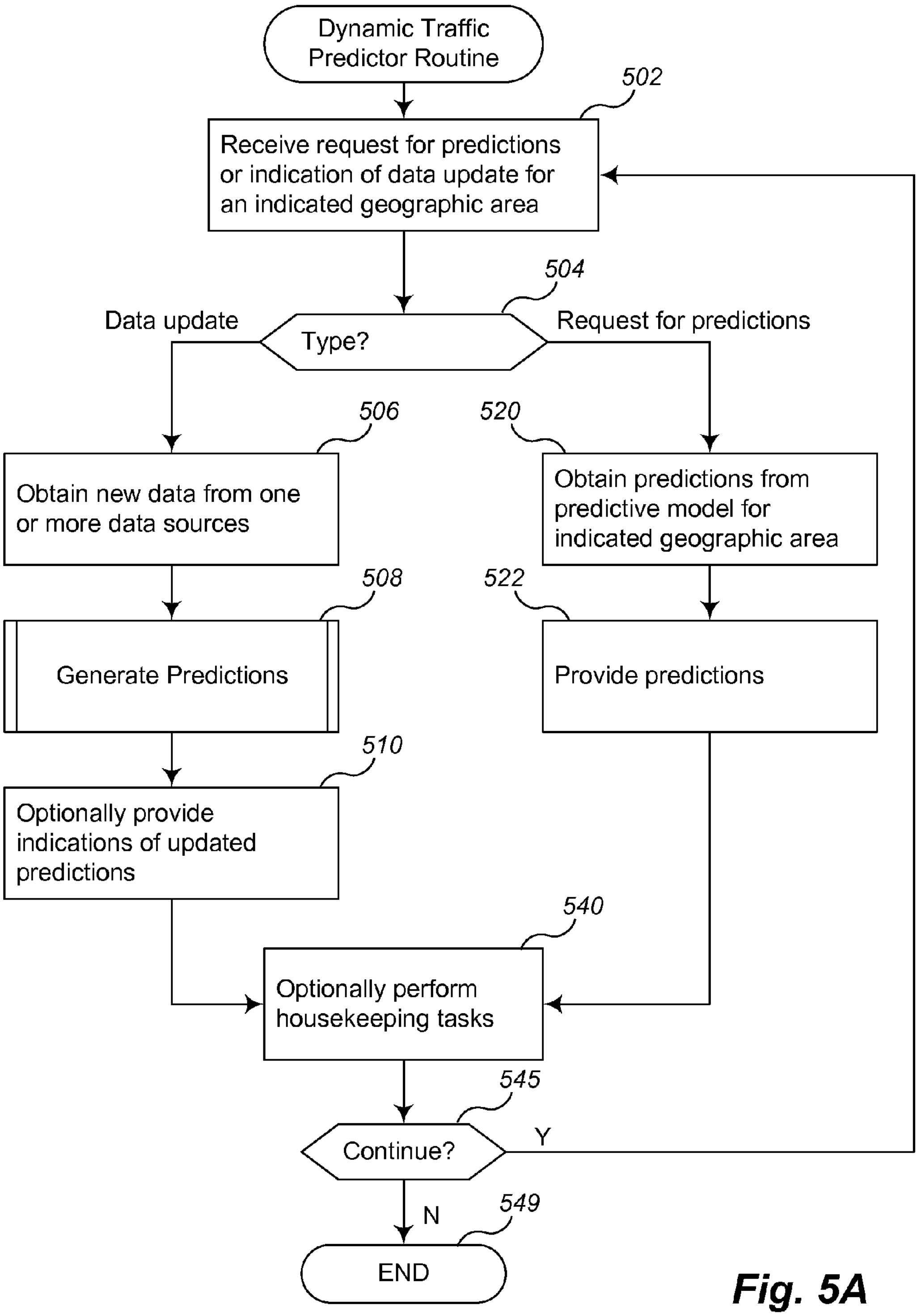
FIGS. 5A-5B are flow diagrams of embodiments of a Dynamic Traffic Predictor routine and an associated Generate Predictions subroutine.
Figure 5B:
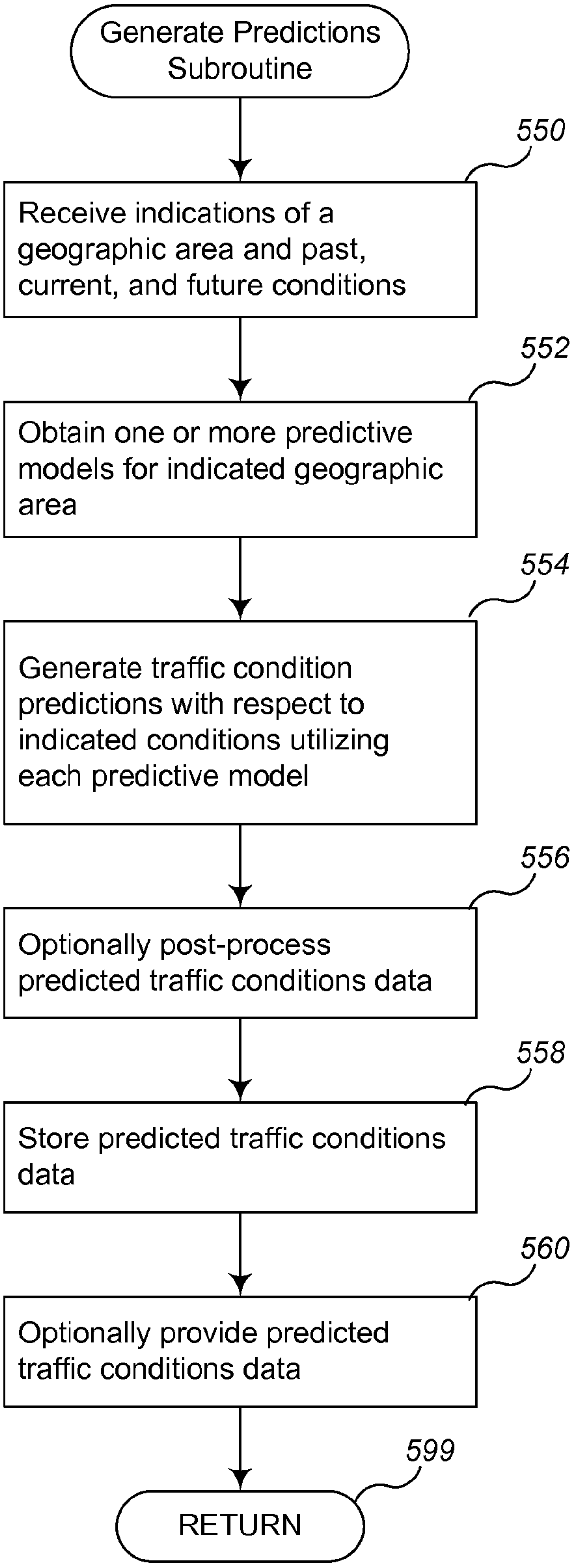

FIGS. 5A-5B are flow diagrams of embodiments of a Dynamic Traffic Predictor routine and an associated Generate Predictions subroutine. The routine of FIG. 5A may be provided, for example, by execution of the Dynamic Traffic Predictor component 356 in FIG. 3, such as to generate predictions of future traffic conditions at multiple future times for each of one or more roads or road segments in one or more geographic areas. In this illustrated embodiment, the routine generates predictions when new current condition input information is received or upon request (e.g., based on periodic requests to generate new predictions, such as every five minutes), but in other embodiments could generate such predictions at other times (e.g., periodically, such as by retrieving any available current condition input information at that time).

The routine begins in step 502 and receives a request for prediction information (e.g., for an indicated road or road segment at an indicated time, or for all roads and road segments in a geographic area based on current conditions) or an indication of a data update for an indicated geographic area. In step 504, the routine determines whether a data update or a predictions request was received, and if it is determined that a data update was received, the routine proceeds to step 506 and obtains new current conditions data from one or more data sources for use as input in the prediction generations (e.g., from the Data Supplier component 352 in FIG. 3, from appropriate stored information, from other sources, etc.). In step 508, the routine executes a Generate Predictions subroutine that generates an updated set of predictions with respect to the newly obtained data, as discussed in greater detail with respect to FIG. 5A, with the generated prediction information stored for later use. In step 510, the routine optionally provides indications of the updated prediction information obtained in step 508 to one or more clients, such as to users who have previously expressed an interest in such information, to third-party entities who may use such prediction information, etc.

If it was instead determined in step 504 that a request for predictions was received, the routine proceeds to step 520 and obtains previously generated predictions from one or more predictive models for the indicated geographic area, such as predictions generated in step 508. In step 522, the routine provides the obtained predictions to the client. After steps 510 and 522, the routine proceeds to step 540 and optionally performs any housekeeping tasks. In step 545, the routine determines whether to continue. If so, the routine returns to step 502, and if not continues to step 549 and ends.

FIG. 5B is a flow diagram of an embodiment of a Generate Predictions subroutine that generates predictions of future traffic conditions at multiple future times for each of one or more roads or road segments in one or more geographic areas, such as for use by the Dynamic Traffic Predictor routine illustrated in FIG. 5A. In this example embodiment, the subroutine generates the future traffic conditions predictions for a geographic area using probabilistic techniques via generated predictive models that include a Bayesian network and multiple corresponding decision trees, such as is previously discussed, but in other embodiments this or a related subroutine could instead generate future traffic conditions predictions in other manners.

The subroutine begins in step 550 and receives indications of a geographic area and of past, current, and future conditions for use as input information. As described in greater detail elsewhere, such conditions may include information about current and past weather conditions, weather forecasts, event schedules, school schedules, current and past traffic conditions, etc. In step 552, the subroutine obtains one or more generated predictive models for the indicated geographic area that include a Bayesian network and one or more decision trees, such as by retrieving previously generated models or by requesting the models from a Traffic Prediction Model Generator component. In step 554, the subroutine generates future traffic condition predictions based on the current conditions input information by using the predictive models, such as to generate predictions at each of multiple future times for each road or road segment in the indicated geographic area. In step 556, the subroutine then optionally performs post-processing of the predicted future traffic conditions information, such as to include merging, averaging, aggregating, selecting, comparing, or otherwise processing one or more sets of output data from the one or more predictive models. In step 558, the subroutine stores the predicted future traffic conditions information, and in step 560 optionally provides the predicted traffic conditions information to one or more clients. In step 599 the subroutine returns.

Figure 6:
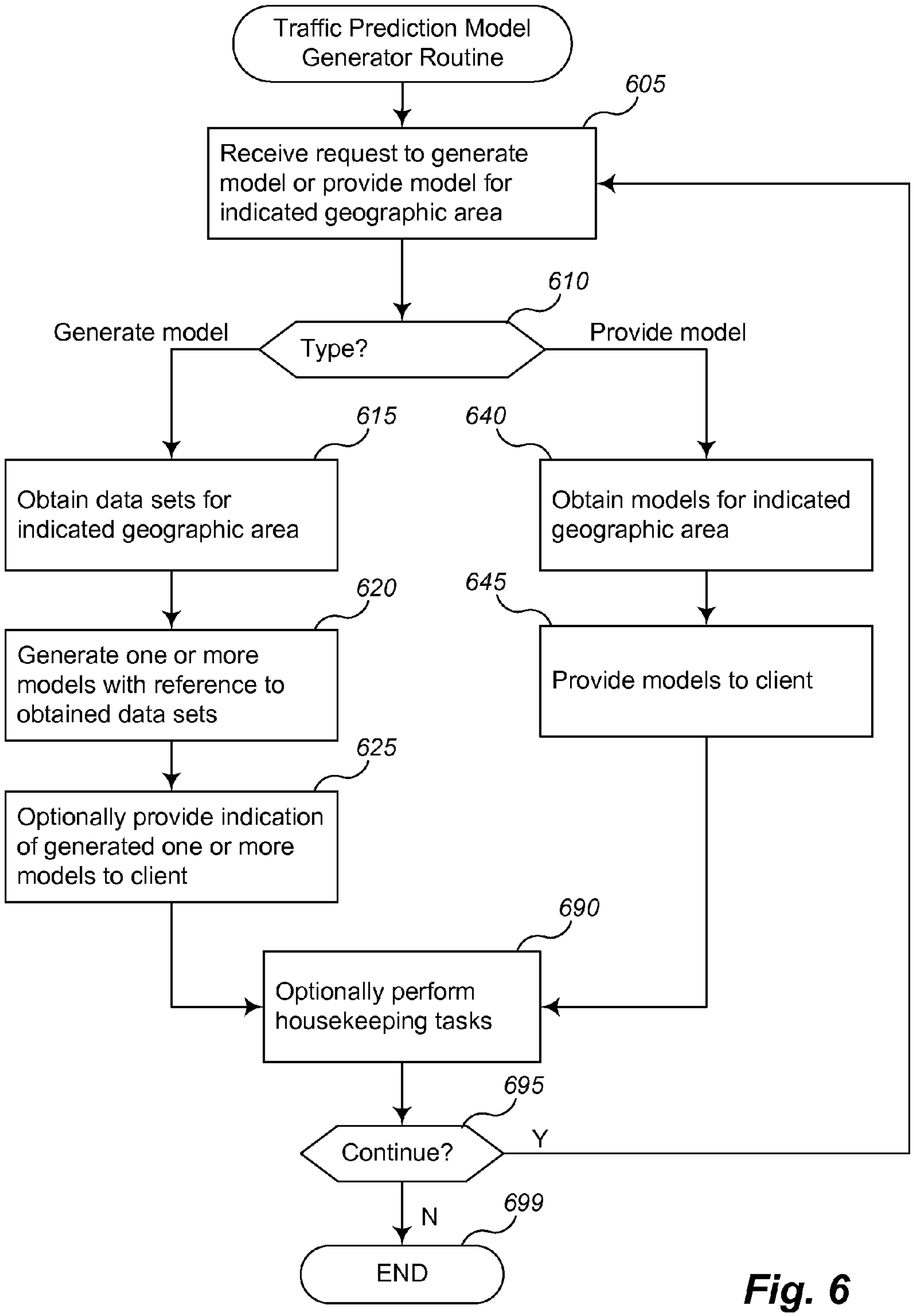
FIG. 6 is a flow diagram of an embodiment of a Traffic Prediction Model Generator routine.

FIG. 6 is a flow diagram of an embodiment of a Traffic Prediction Model Generator routine. The routine may be provided, for example, by execution of the Traffic Prediction Model Generator component 354 of FIG. 3, such as to generate predictive models based on observed case information for later use in generating future traffic conditions predictions.

The routine begins in step 605 and receives a request to generate predictive models for an indicated geographic area or to provide previously generated predictive models for an indicated geographic area. In step 610, the routine determines the type of received request, and if a request to generate a model was received, the routine proceeds to step 615 to obtain observed data for the indicated geographic area, such as from the Data Supplier component 352 or from stored data. In step 620, the routine then generates one or more predictive models with reference to the obtained observed data, as discussed in greater detail elsewhere. In step 625, the routine then optionally provides an indication of the generated one or more models to a client from whom the request was received and/or to others (e.g., the Dynamic Traffic Predictor component 356 of FIG. 3), or otherwise stores the generated models for later use.

If it was instead determined in step 610 that a request to provide a model was received, the routine continues to step 640 where one or more models previously generated predictive models for the indicated geographic area are retrieved. In step 645, the routine then provides those models to the client who requested the models or to another indicated recipient, such as the Dynamic Traffic Predictor component 356 and/or a third-party computing system that utilizes the models to perform its own predictions.

After steps 625 and 645, the routine proceeds to step 690 and optionally performs any housekeeping tasks. In step 695, the routine then determines whether to continue. If so, the routine returns to step 605, and if not continues to step 699 and ends.

In some embodiments, the selection of routes may be based on a variety of types of indicated information, such as when information is requested for fully or partially specified travel routes (with a partially specified route not specifying every road segment between a given starting and ending location), when a starting and ending location are specified (optionally with one or more intermediate locations), when one or more desired times for travel are indicated (e.g., on a particular day; between a first and second time; with an indicated arrival time; etc.); when one or more criteria for assessing route options are specified (e.g., travel time, travel distance, stopping time, speed, etc.), etc. In addition, varying amounts of information related to travel routes may be provided in various embodiments, such as to provide clients with only a predicted optimal selected route or to provide clients with a variety of details about multiple route options analyzed (e.g., in a ranked or otherwise ordered manner, such as by increasing travel time). In addition, some embodiments may represent travel routes in various manners, including human-readable, textual representations using common street and road names and/or machine-readable representations such as series of GPS waypoints.

Various embodiments may also employ various conventions for representing and providing current and predicted traffic condition information. For example, in some embodiments a data feed may be provided for each geographic area of interest to indicate predicted future traffic condition information for each of multiple future times. The data feed format may, for example, be defined by an XML schema that defines an element type with one or more attributes that each contain information related to a predicted traffic congestion level conditions for a single road segment for each of multiple future times, with a fragment of an example such XML stream or file as follows:

```
<Segment id="423" speed="55" abnormality="0" color="3"
  next3hours="3,3,3,3,2,1,1,0,0,0,1,1"
  confidence="2,2,2,1,1,0,0,1,1,1,0,0"/>
```

The above XML fragment represents the current and predicted future traffic conditions for an example road segment 423 (which may represent a single physical sensor, a group of physical sensors that correspond to a logical road segment, one or more data sources other than traffic sensors, etc.). In this example, the current average speed is indicated to be 55 MPH, no abnormalities exist with respect to the current average speed (in this example, abnormalities indicate a difference in the actual current average speed with respect to what would be expected for the current average speed, such as by using a baseline forecast average speed for that time of day, day of week, week of month, and/or month of year); and the current traffic congestion level is indicated to be 3 (in this example, congestion levels are expressed as integers between 0 and 3, with 3 corresponding to the lowest level of traffic congestion and thus being equivalent to a value of green, and with 0 being equivalent to a value of black). In addition, in this example the comma-delimited list labeled "next3 hours" indicates predicted future traffic congestion levels for the next twelve future times at 15 minute intervals. In this example, confidence level information is also provided for each of the twelve predicted future traffic congestion levels, with the comma-delimited list labeled "confidence" indicating such confidence levels, although in other embodiments such confidence levels may not be generated and/or provided. In this example, confidence levels are expressed as integers between 0 and 2, with 2 corresponding to the highest level of confidence and 0 being the lowest level of confidence, although other means of representing predicted future traffic congestion levels and associated confidence levels may be used in other embodiments.

In addition, various embodiments provide various means for users and other clients to interact with one or more of the predictive traffic information systems. For example, some embodiments may provide an interactive console (e.g. a client program providing an interactive user interface, a Web browser-based interface, etc.) from which clients can make requests and receive corresponding responses, such as requests for information related to current and/or predicted traffic conditions and/or requests to analyze, select, and/or provide information related to travel routes. In addition, some embodiments provide an API ("Application Programmer Interface") that allows client computing systems to programmatically make some or all such requests, such as via network message protocols (e.g., Web services) and/or other communication mechanisms.

FIGS. 7A-7I illustrate example displays of various traffic-related information based on predictions of future traffic conditions. In some embodiments, some or all of such traffic-related information may be provided by an embodiment of a Predictive Traffic Information Provider system and/or an embodiment of a Route Selector system, or may instead by provided by one or more third parties based at least in part on predictive traffic information supplied to those third parties by one or more of the system. In addition, such traffic-related information may be provided to users in various ways in various embodiments, such as by a Web-based client on a desktop computing system that displays the information to one or more users or via cellular telephones, or vehicle-based or other mobile devices that display or otherwise provide the information to a user.

Figure 7A:
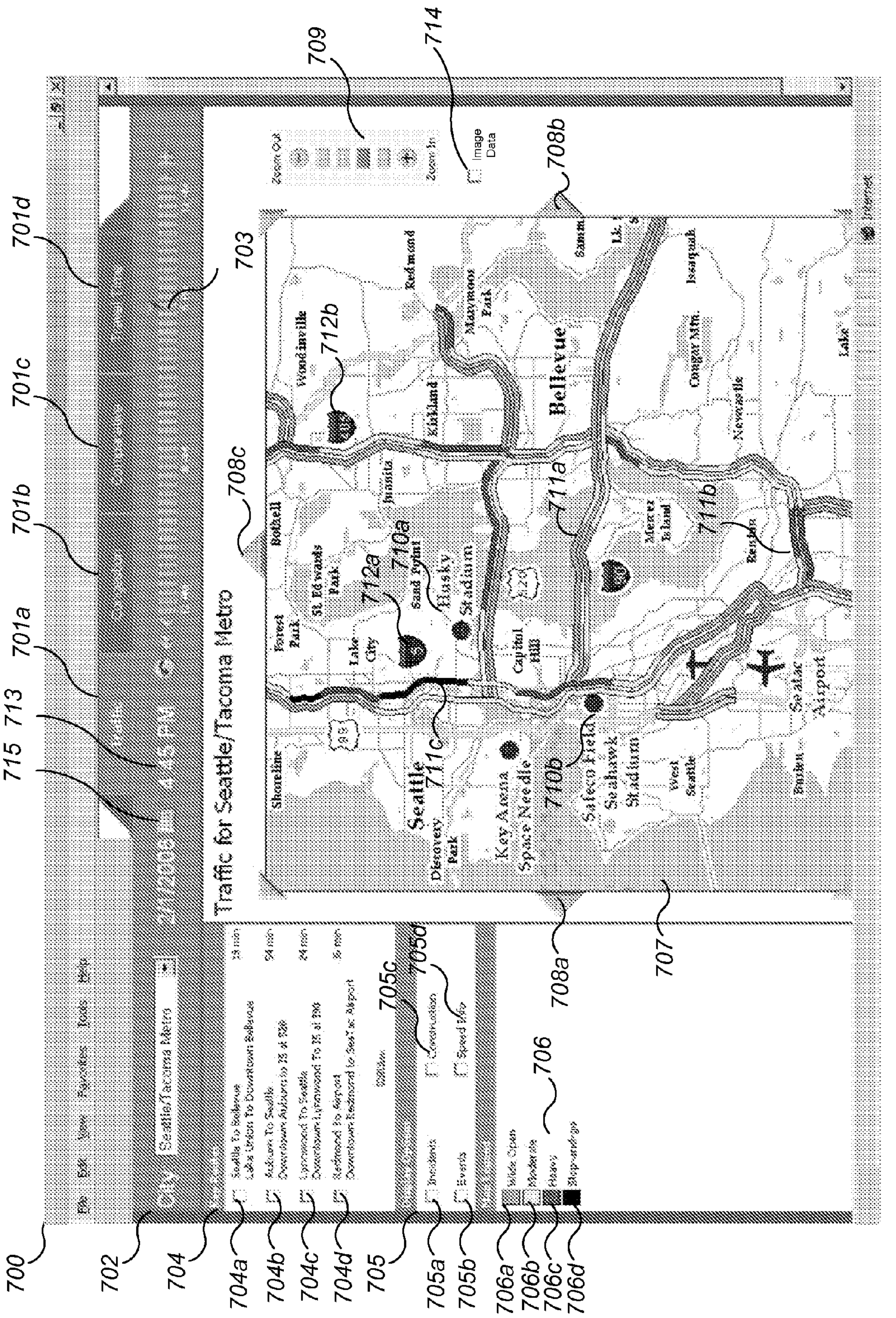
FIGS. 7A-7V illustrate example displays of various traffic-related information and user-selected controls, including using predictions of future traffic conditions and comparisons to normal traffic conditions.

FIG. 7A illustrates an example display 700 showing current traffic conditions for a network of roads in the Seattle/Tacoma Metro geographic area of the state of Washington. In this example, the display includes user-selectable navigation tab controls 701*a-d*, a user-selectable geographic area selection menu control 702, a user-selectable time slider control 703, a date selector calendar control 715, a key route selection area 704, a display option selection area 705, a map legend area 706, a map display area 707, a user-selectable map data selector control 714, user-selectable pan button controls 708*a-c*, a user-selectable zoom tool control 709, and currently selected time indicator information 713 (to correspond to the user-manipulatable time indicator illustrated on the time slider control as a small triangle pointing downward).

In this example, a view of road traffic information is currently selected (based on selection of the "Traffic" navigation tab 701*a*), the geographic area currently selected is the Seattle/Tacoma Metro area (via control 702), and the time currently selected is 4:45 PM on Feb. 1, 2006 (via slider 703 and/or the calendar date selector control 715), with the various displayed information reflecting those selections. As is shown in the map display area 707 and described in the map legend area 706, traffic road congestion level condition information is currently shown for a selection of major roads in the currently visible portion of the Seattle/Tacoma Metro geographic area. For current or past times for which actual road congestion level condition information is available, the displayed information reflects that actual information, and for future times the displayed information reflects predicted future traffic conditions at those times. In this example, the displayed major roads are divided into logical road segments which are each displayed using a level of grayscale shading to indicate a corresponding level of road congestion of that road segment for the selected time, such as with a road segment 711*c* of the northbound portion of the Interstate 5 road being illustrated with "Stop-and-go" traffic conditions (shown in black in this example), with the adjacent road segment to the south being illustrated with "Moderate" traffic conditions, and with the adjacent road segment to the north also being illustrated with "Stop-and-go" traffic conditions before the next road segment to the north changes to "Heavy" traffic conditions. Road segment 711*a* along the Interstate 90 road is currently shown with "Wide Open" traffic conditions, road segment 711*b* along the Interstate 405 road currently is shown with "Heavy" traffic conditions, and numerous other road segments are similarly shown with corresponding traffic congestion level condition information. While illustrated in grayscale here, in other embodiments the map may be displayed instead in color, such as to show "Stop-and-go" traffic conditions in black, "Heavy" traffic conditions in red, "Moderate" traffic conditions in yellow, and "Wide Open" traffic conditions in green.

The display of traffic-related information may be modified by a user (not shown) in various ways in this example embodiment. For example, the geographic area selection menu control 702 can be used to select from one of a number of different geographic areas for which traffic-related information is available. The time slider control 703 can be used to modify the time that is currently selected for which traffic information is shown, such as to view predicted traffic conditions at future times. The key route selection area 704 includes various user-selectable option controls 704*a-d* that may be selected in order to highlight routes on the displayed map, such as to highlight a route from Seattle to Bellevue by selecting option 704*a*. User-selectable display option controls 705*a-d* include information about incidents 705*a*, events 705*b*, construction 705*c*, and speed info 705*d*, such as with corresponding information for one or more selected options being overlaid on the displayed map. Pan button controls 708*a-c* can be used to scroll or pan the map frame 707 to obtain a different view of the current geographic area, with an additional southern pan button control 708*d* not currently shown due to the scrolling of the window. The zoom tool control 709 may be used to increase or decrease the display scale of the map. The map data selector control 714 may be used to select an alternate source of map data, such as actual satellite or other imagery of the geographic area (e.g., over which labels or other indications of the roads of interest are displayed). Various other user-selectable controls may be provided in other embodiments, and some or all of the illustrated controls may not be available.

In this example, the map currently displays various information in addition to the traffic conditions for the selected network of roads, such as to indicate venues and other locations that may correspond to events and other areas of traffic concentration (such as Husky Stadium 710*a* in which college football and other events may occur, Safeco Field 710*b* in which professional baseball and other events may occur, Seahawk Stadium in which professional football and soccer and other events may occur, the Space Needle tourist attraction, the SeaTac Airport, popular parks such as Marymoor Park and Discovery Park, etc.), cities and neighborhoods, and highway labels such as 712*a-b*. Various other types of information may similarly be shown, such as at all times or instead in a user-selectable manner.

Figure 7B:
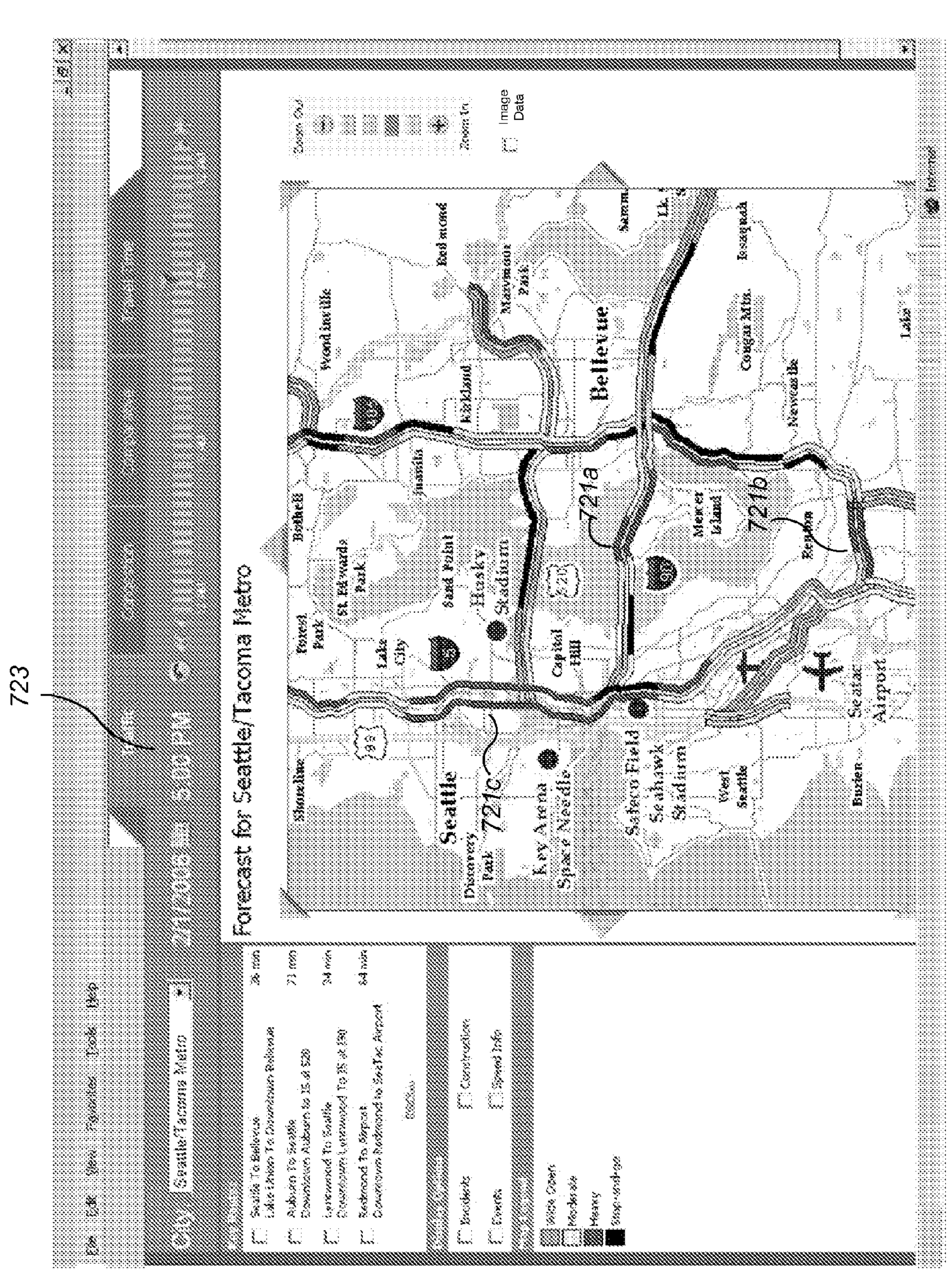

FIG. 7B illustrates an example display showing predicted traffic conditions at a currently selected future time 723 of 5:00 PM, such as based on user modification at 4:45 PM of the slider control 703 of FIG. 7A. Overall, the illustrated predicted traffic congestion level conditions in FIG. 7B for the road network appear to be more congested than the traffic congestion level conditions for 4:45 PM in FIG. 7A. As one example, road segment 721*a* has a different predicted level of road traffic congestion condition than the respective corresponding road segment 711*a* of FIG. 7A, with heavy traffic congestion conditions now being illustrated.

Figure 7C:
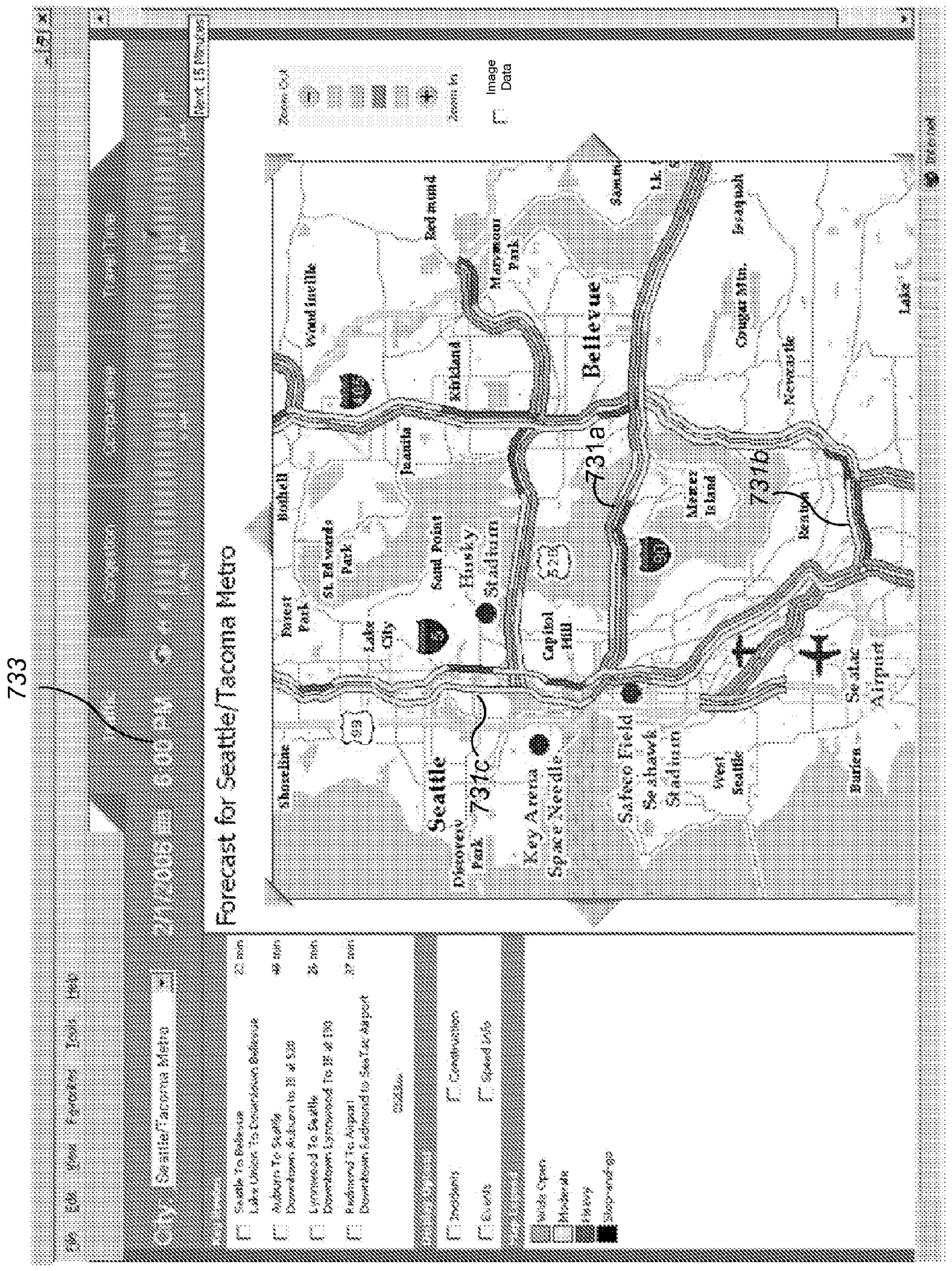

FIG. 7C illustrates an example display showing predicted traffic conditions at a currently selected future time 733 of 6:00 PM, such as based on user modification at 4:45 PM of the slider control 703 of FIG. 7A. Overall, the illustrated predicted traffic congestion level conditions in FIG. 7C for the road network appear to be less congested than the predicted traffic congestion level conditions for 5:00 PM in FIG. 7B. For example, road segment 731*a* is shown as being wide open at 6 PM, while traffic for the same segment 721*a* in FIG. 7B was predicted to be heavy at 5:00 PM. In addition, road segment 731*b* has changed from heavy to moderate levels of traffic congestion between 5:00 and 6:00 PM, as shown by the corresponding segment 721*b* in FIG. 7B.

Figure 7D:
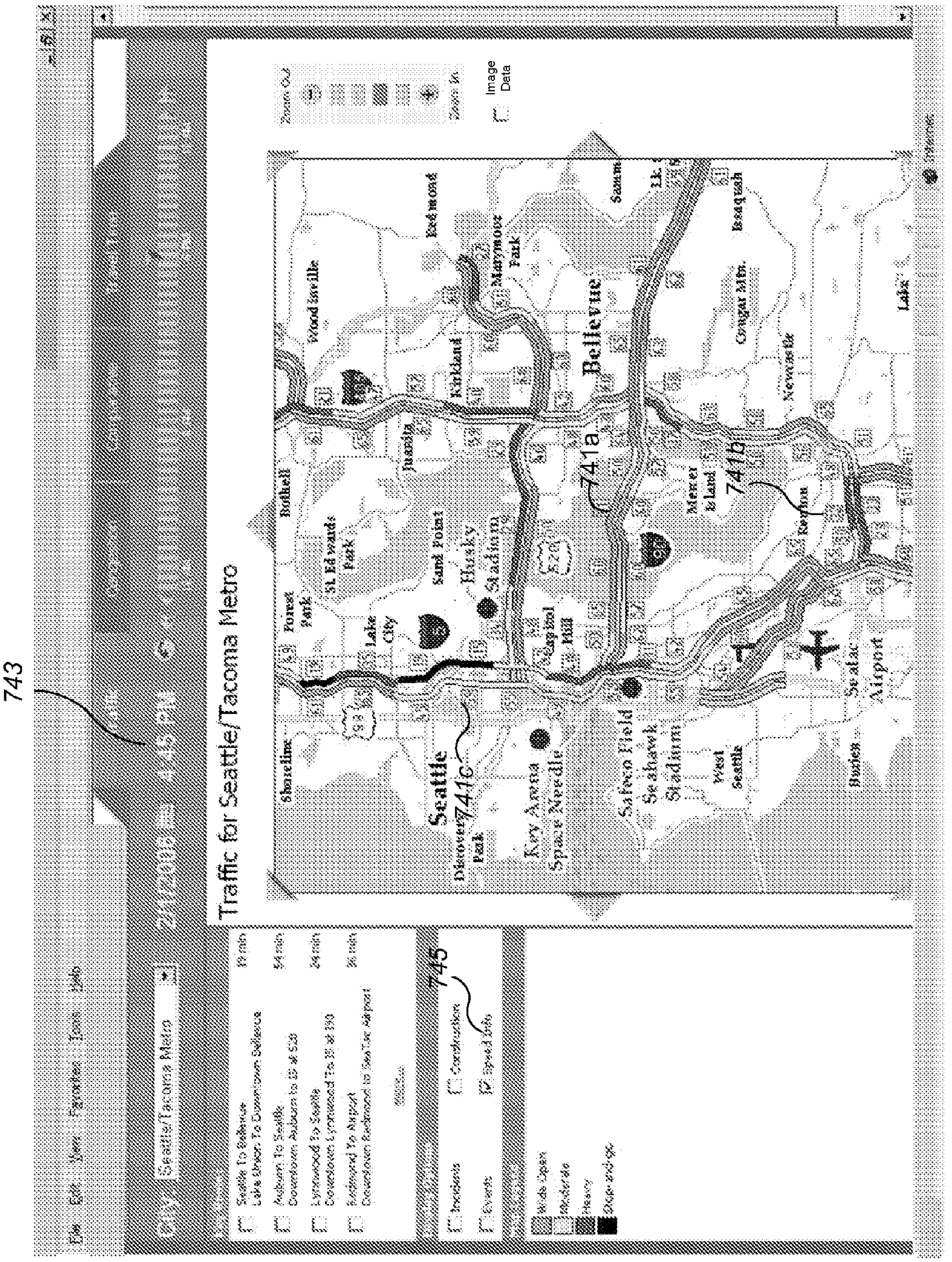

FIG. 7D illustrates an example display similar to that shown in FIG. 7A, but with the map being augmented with roadway speed information. In particular, in this view the user has selected the display option 745 (labeled "Speed Info") in order to cause current average traffic speeds to be illustrated. For example, road segment 741*a* (with wide open traffic congestion) is labeled with a numeric 61 indicator that reflects an average speed of 61 miles per hour for traffic on that segment at the currently selected time 743 of 4:45 PM. In contrast, road segment 741*b* (with heavy traffic congestion) is labeled with a numeric 32 indicator that reflects an average speed of only 32 miles per hour for vehicles on that road segment. In some embodiments such speed information indicators may be displayed for only current and/or past times, while in other embodiments predicted future traffic condition speed information may similarly be displayed for future times. Furthermore, in embodiments in which color is used to reflect absolute or relative levels of congestion or speed, the speed information indicators may further be displayed using colors corresponding to the speed, such as to display the numeric 61 indicator for road segment 741*a* in green (corresponding to wide open traffic) and to display the number 32 indicator for road segment 741*b* in red (corresponding to heavy traffic congestion). Techniques other than color or shading may further be used in some embodiments to indicate information such as absolute or relative levels of congestion or speed, whether for roads and/or information indicators, such as thickness and styles (e.g., dashing) of lines, using various font and other text attributes for alphanumeric information, etc.

FIGS. 7K-7N illustrate example displays corresponding to presenting an animation of information about changing traffic conditions over a sequence of multiple successive times, such as for a user-selectable span of time. In the illustrated example, the user-selectable span of time may include current, past, and/or future times. For current or past times for which actual road traffic condition information is available, the displayed animation reflects that actual information, while for future times, the displayed animation reflects predicted and/or forecast future traffic conditions at those times. For example, at 1 PM, a user may wish to see the traffic conditions predicted for various times during that evening's commute from work (e.g., from 4 PM to 7 PM), so that the user may plan an optimal time to begin the commute. If the displayed animation indicates that the predicted traffic information for 6 PM shows relatively little congestion compared to earlier and later times, the user may decide to leave work at (or slightly before) 6 PM. As another example, at 5:30 PM, the user may wish to see both actual and predicted levels of traffic congestion for various times during that evening's commute, such as from 4:30 PM to 6:30 PM. For instance, if the displayed animation reflects the fact that the actual traffic congestion at 5 PM was relatively low compared to the predicted traffic congestion for the rest of the evening commute time, the user may decide to begin the commute at 5 PM in the future.

Figure 7E:
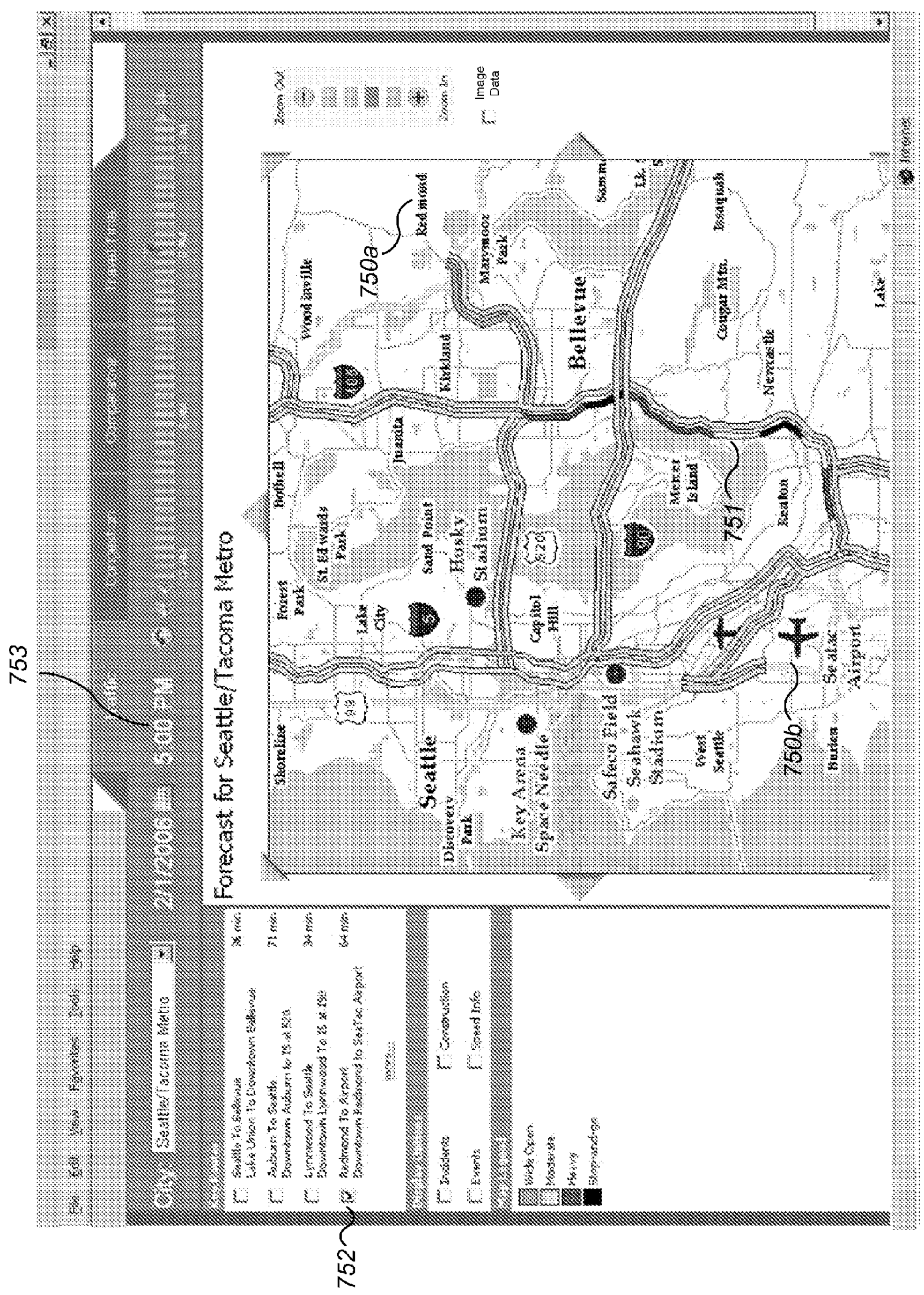
Figure 7F:
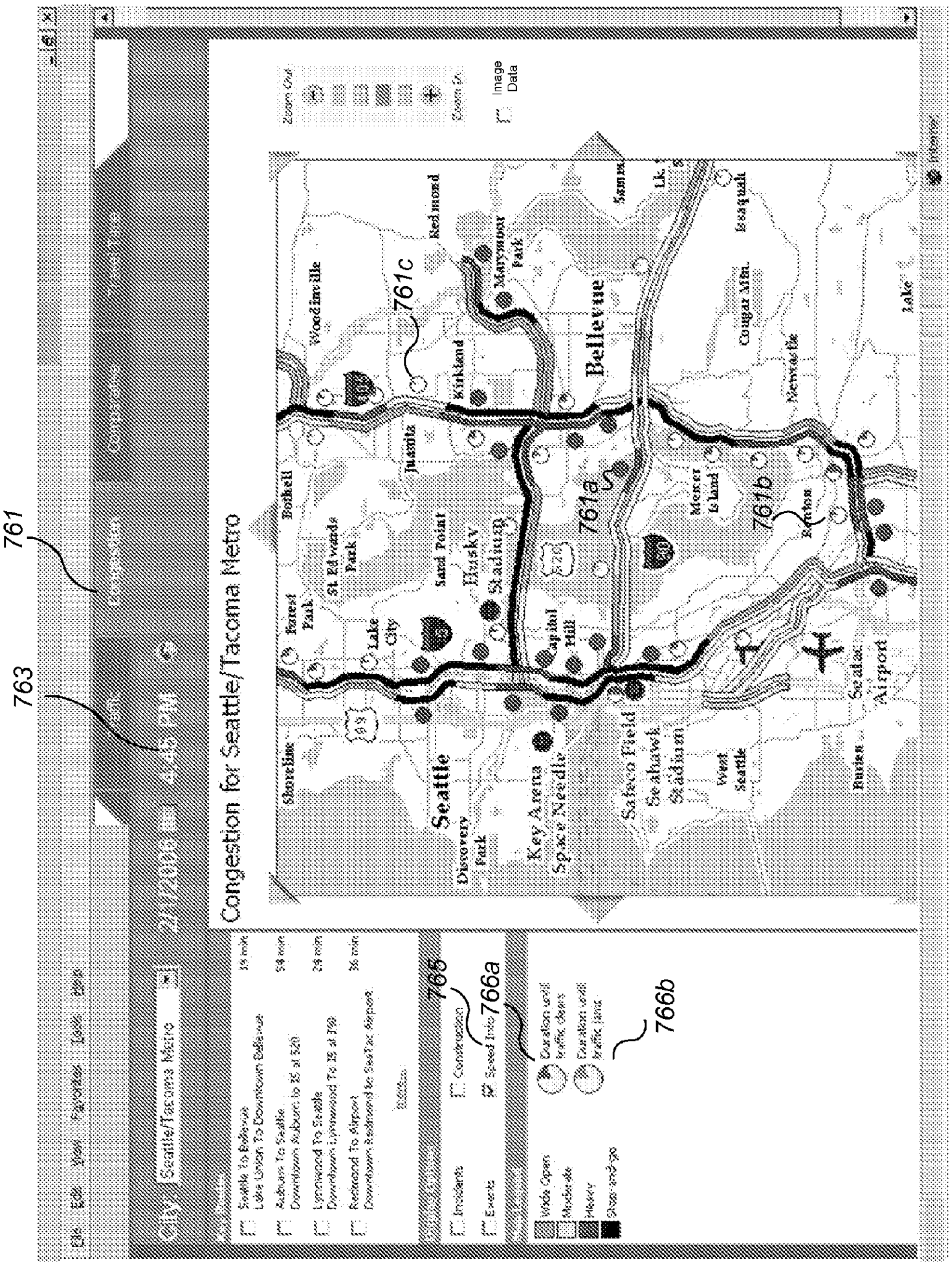
Figure 7G:
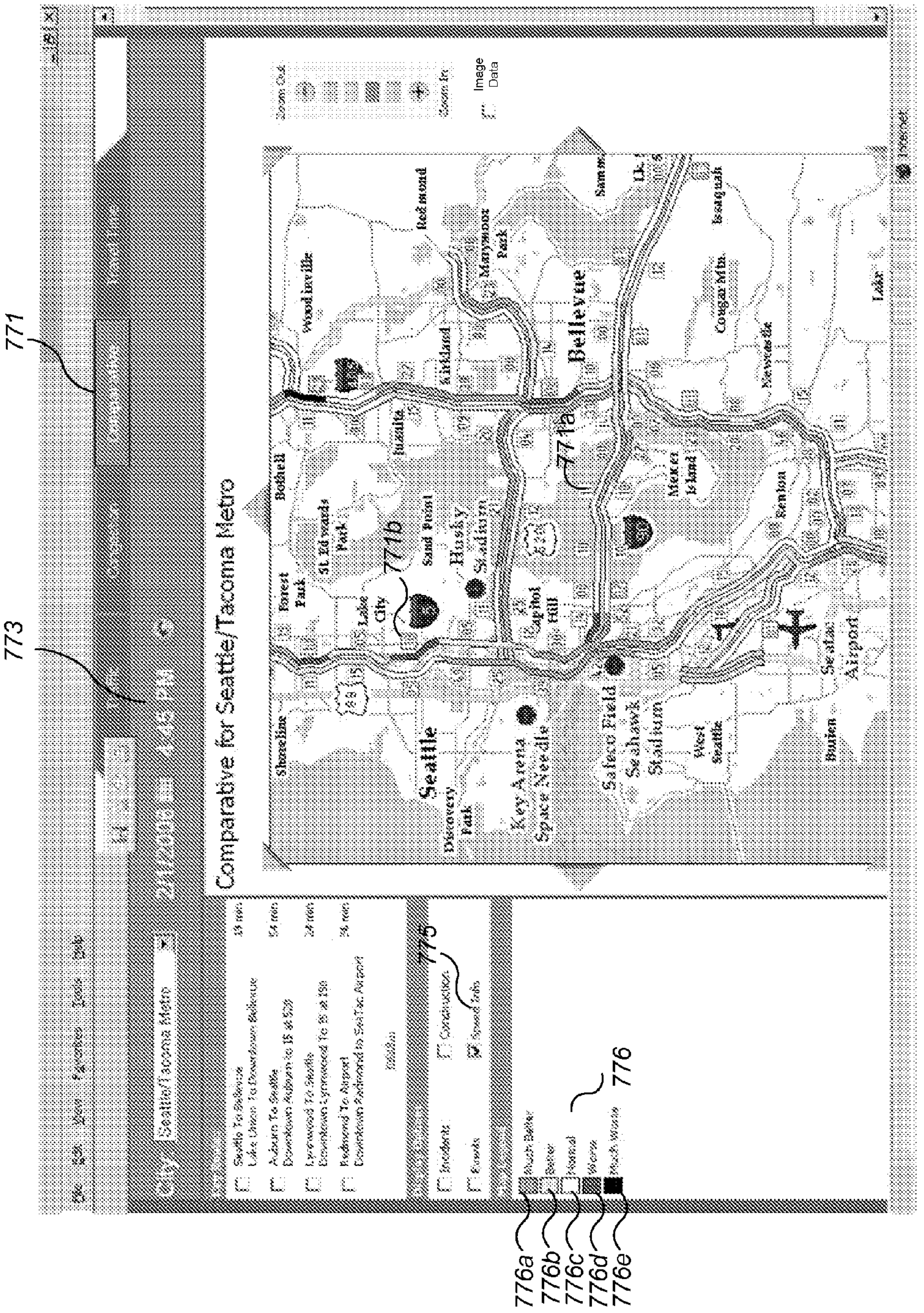
Figure 7H:
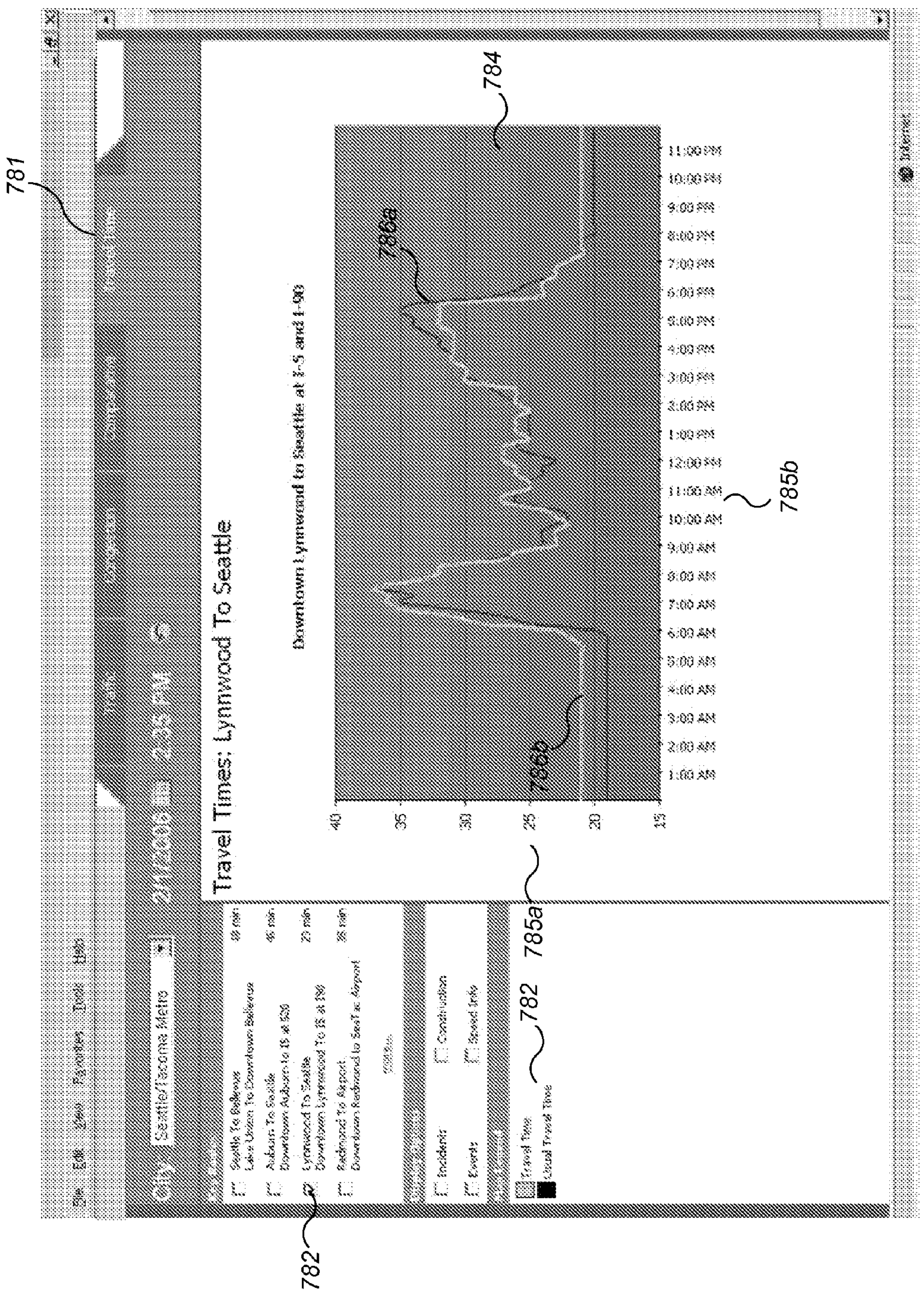
Figure 7I:
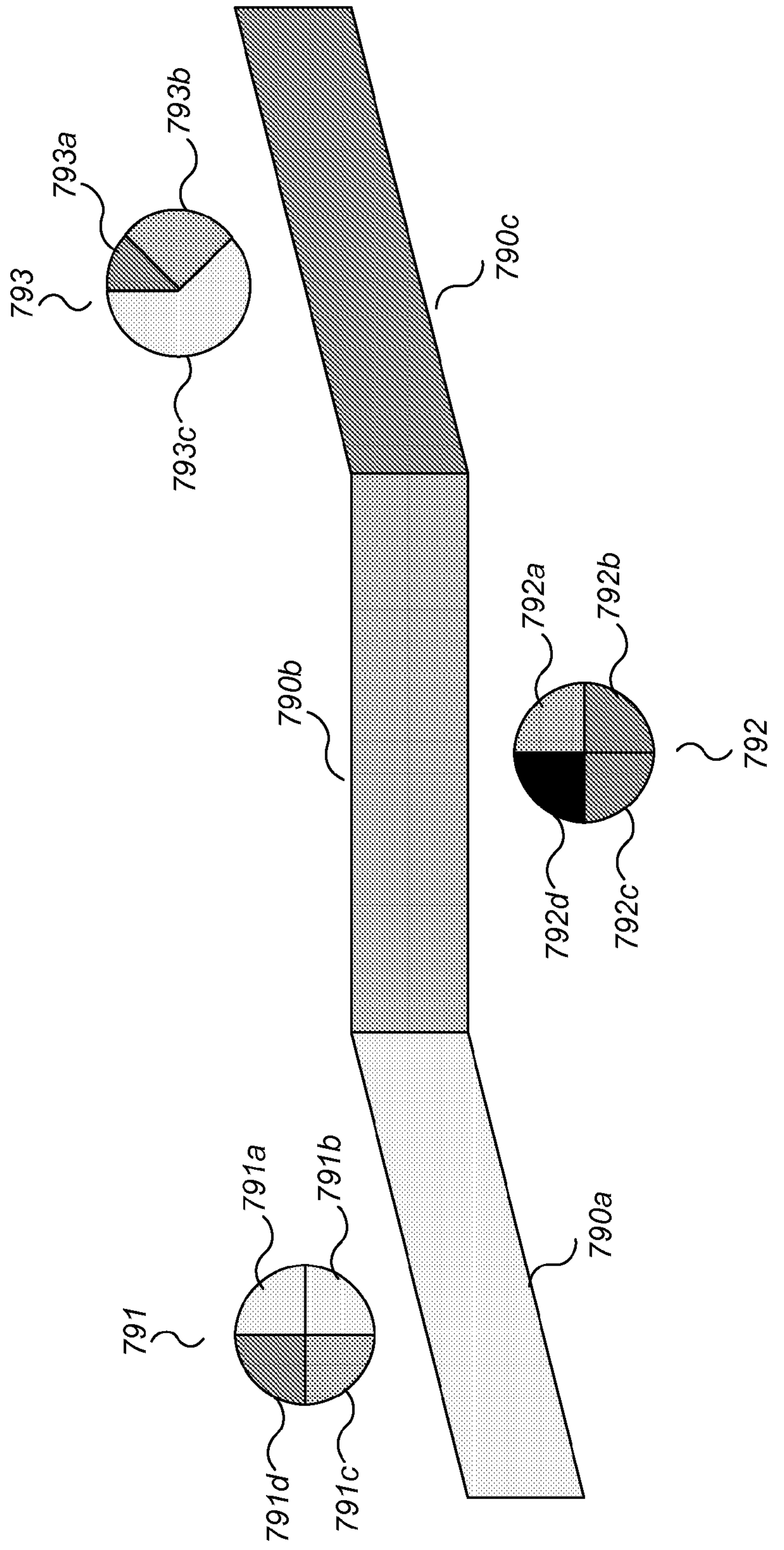
Figure 7J:
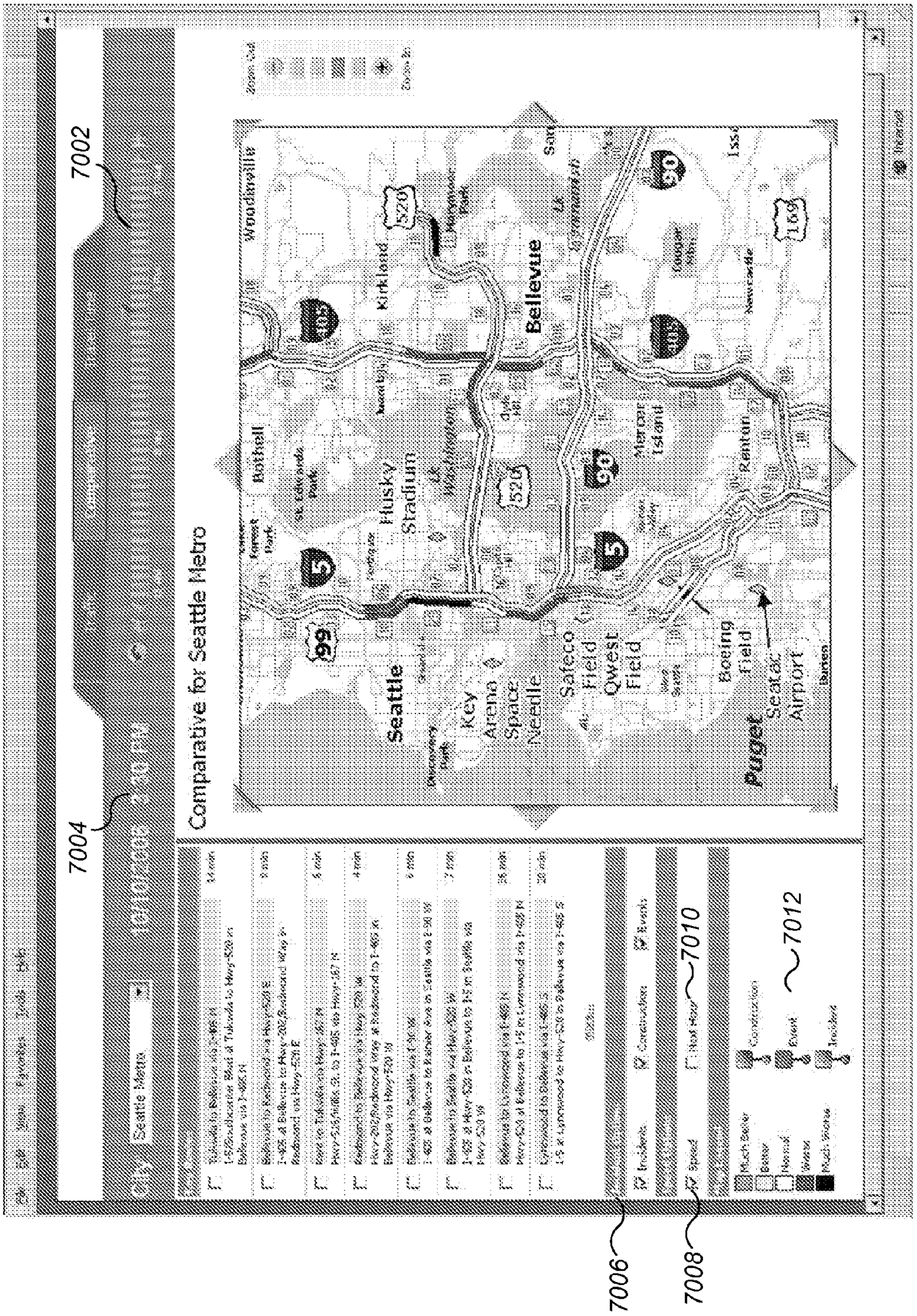
Figure 7K:
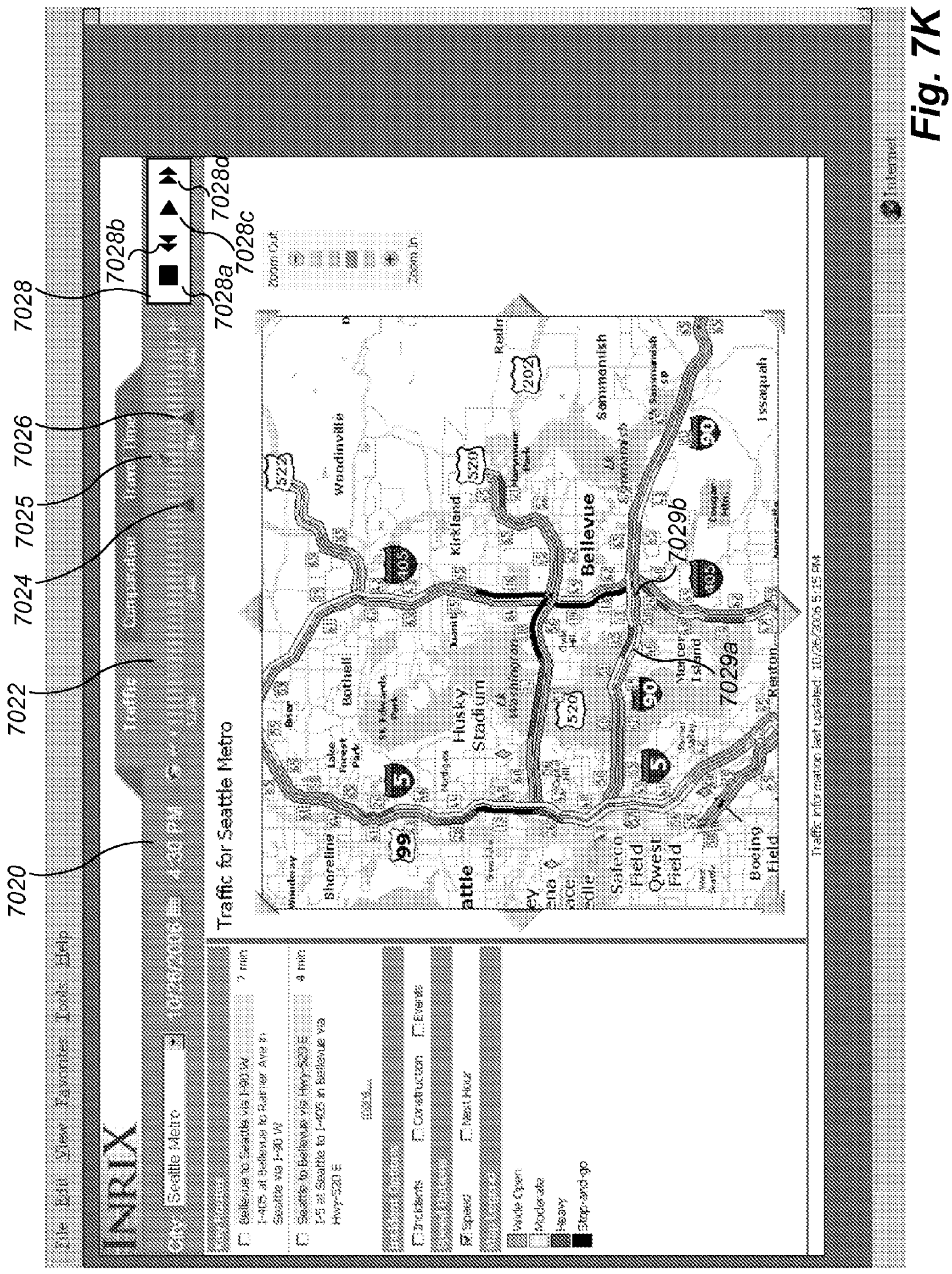

In particular, FIG. 7K illustrates an example user interface display with traffic condition information similar to that shown in FIG. 7A, but with the display further including playback controls 7028, as well as two associated user-manipulatable time period indicator controls 7024 and 7026 on the time slider control 7022. Time period indicator control 7024 may be manipulated by a user to select an earliest time for which the user wishes to view traffic condition information as part of an animation, and time period indicator control 7026 may be manipulated by the user to select a latest time of interest for which the user wishes to view traffic condition information as part of the animation. For example, if a user wishes to view traffic condition information for the time span of 5 AM to 10 AM, the user would select the earliest time to be 5 AM and the latest time to be 10 AM. Additionally, the user may move user-manipulatable separate time indicator control 7025 to indicate a currently selected time, as described in reference to FIG. 7A, which may be inside or outside the time span, although in other embodiments the time indicator 7025 may be replaced by one or both of the controls 7024 and 7026 (e.g., if the currently selected time is selected to be the same as the earliest time or the latest time).

In the example illustrated in FIG. 7K, the current time is 1:00 PM, and the user has selected an earliest time of 2:00 PM, a latest time of 7:00 PM, and a currently selected time of 4:30 PM. In the illustrated embodiment, the displayed map displays static non-animated traffic conditions at the currently selected time (as determined by the position of the triangle-shaped time indicator 7025), but in other embodiments may instead display such traffic conditions for the selected earliest time or at the latest time. Thus, in the example display of FIG. 7K, road segment 7029*a* (corresponding to a portion of road along eastbound Interstate 90) shows "Moderate" traffic conditions at the currently selected time 4:30 PM, while the next road segment to the east 7029*b* shows "Wide Open" traffic conditions at the currently selected time 4:30 PM. The various other road segments similarly display information about traffic conditions at the currently selected time 4:30 PM. As described with reference to FIG. 7D, numeric average traffic speeds are also displayed in this example, such as based on selection of the "Speed" user-selectable control in the "Speed Options" area of user interface.

Figure 7L:
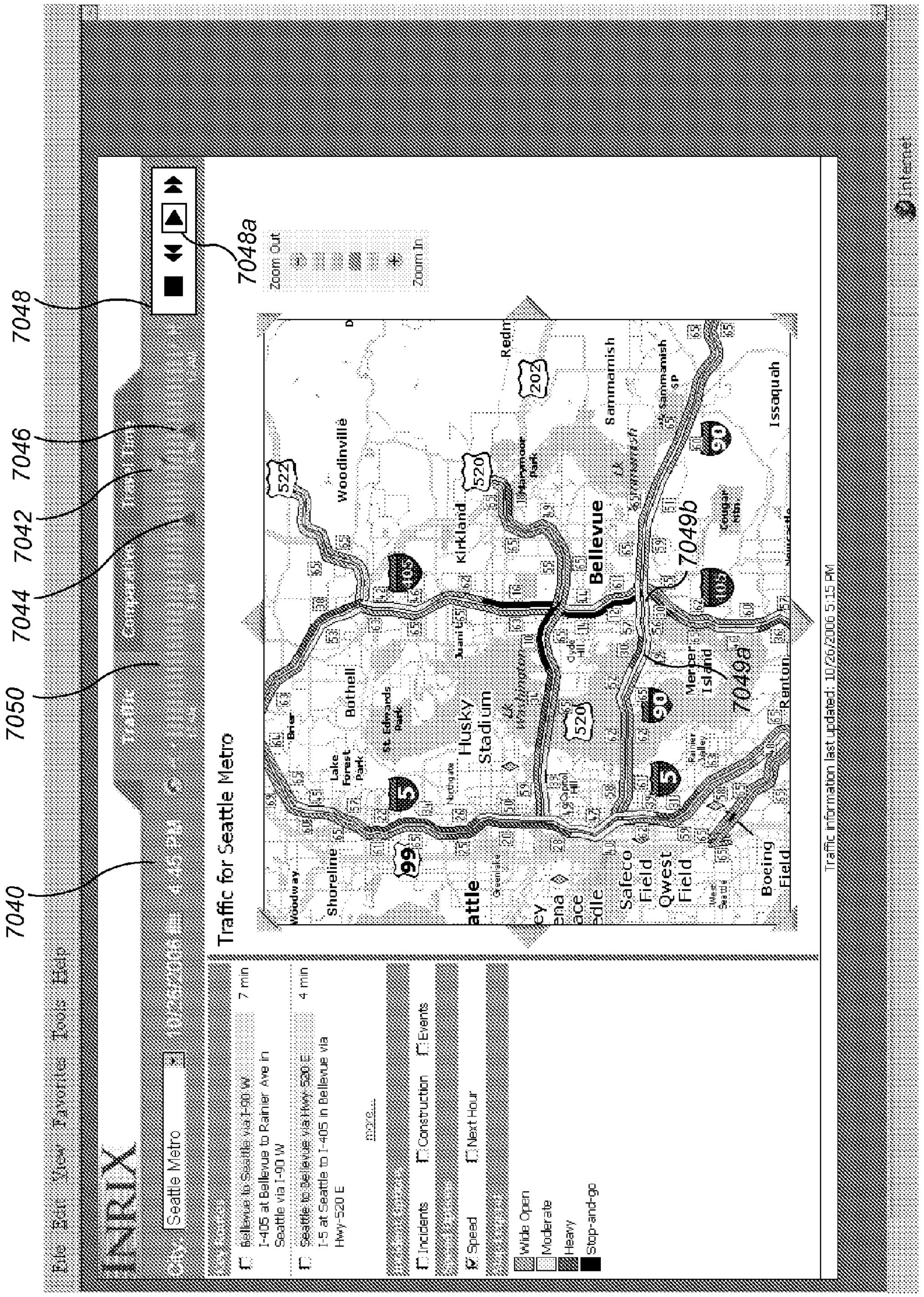
Figure 7M:
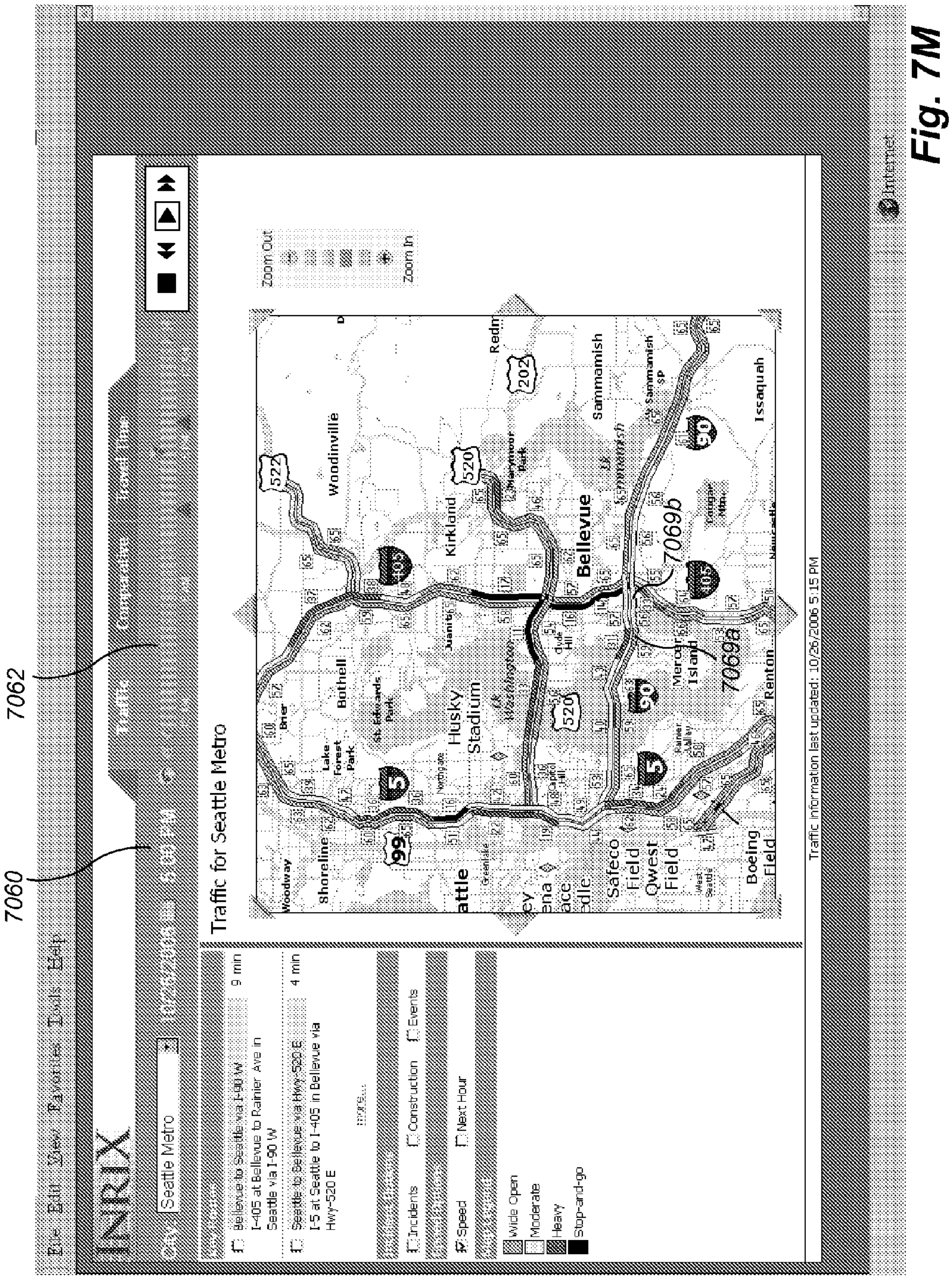
Figure 7N:
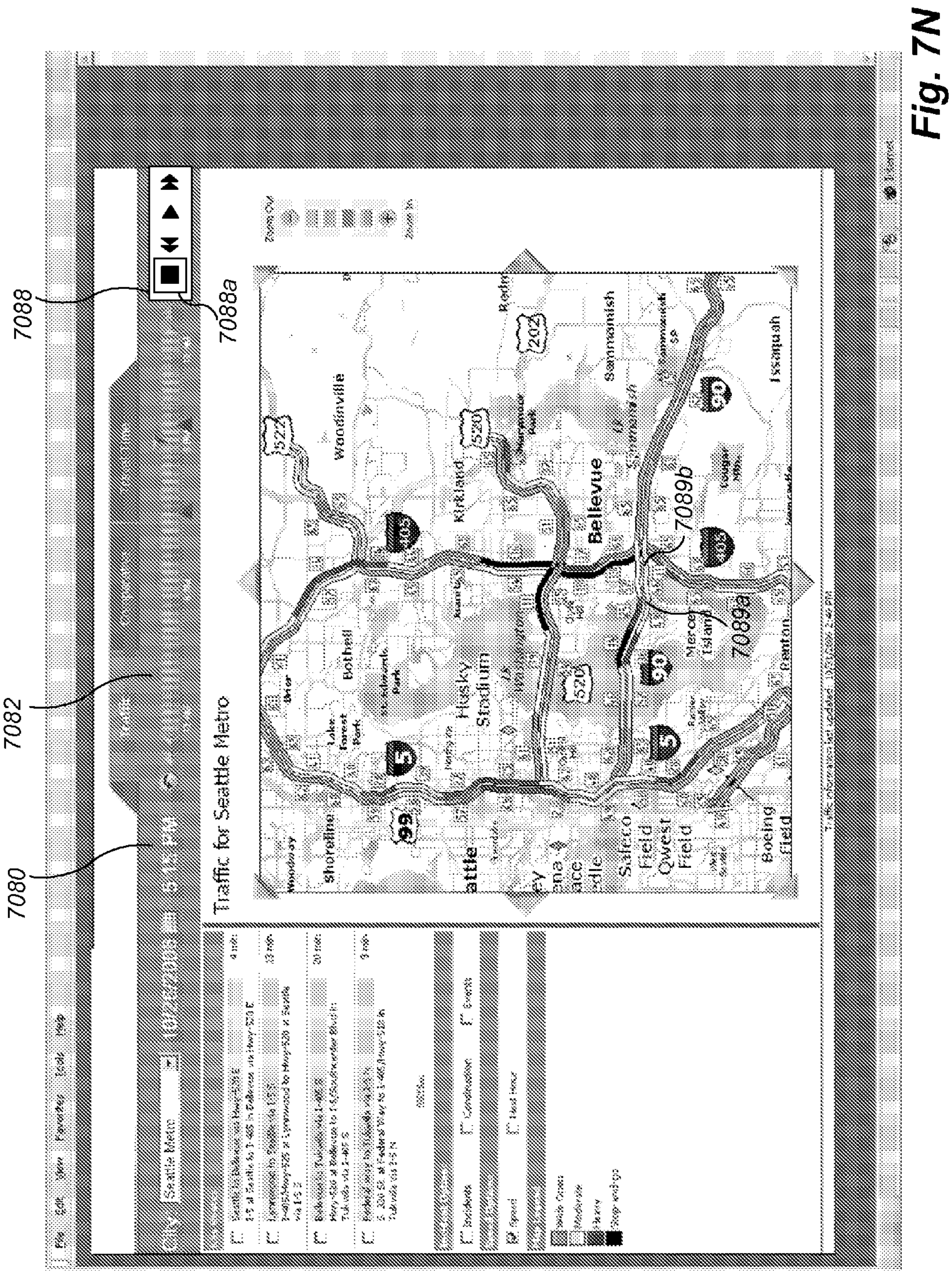

The time sequence manipulation playback controls 7028 include four user-selectable controls in the illustrated embodiment of FIG. 7K to allow manipulation of the display of traffic conditions over a sequence of multiple selected times, those being a "play" control 7028*c*, a "fast-forward" control 7028*d*, a "rewind" control 7028*b*, and a "stop" control 7028*a*. Various other related controls may be provided in some embodiments, such as a "pause" control and/or controls to jump forward and/or backward by a predefined amount of time (e.g., 15 minutes, an hour, a day, etc.). In this example, the "play" control 7028*c* allows a user to animate traffic conditions starting from the currently selected time and moving forward in time toward the latest time selected by the user in predefined time increments (e.g., 1 minute, 5 minutes, 15 minutes, etc.), although in other embodiments and situations the animation may begin at the earliest time rather than the currently selected time (e.g., if the currently selected time is outside the time span between the earliest and latest times, or regardless of the currently selected time). As is illustrated in FIGS. 7L-7N, traffic condition information for each segment may change during the animation to reflect the actual and/or predicted traffic conditions at the changing times for the animation. The "play" control may, for example, cause the traffic conditions to be animated at a rate corresponding to normal time passage, or may instead be animated at a rate faster than normal time passage (e.g., depending on the time increment between each successive selected time for the animation at which traffic conditions are presented). In some embodiments, the currently selected time 7020 and/or the location of the triangle-shaped time indicator 7025 may change to match the selected time for which traffic information is currently being displayed, while in other embodiments the currently selected time 7020 and/or time indicator 7025 may not change (e.g., if another indication of time (not shown) changes to indicate the time to which the animation currently corresponds). The "fast-forward" control **7028*d* allows the user to animate traffic conditions similarly to that of the "play" control, but at a faster rate, whether by showing all of the same information but in less time, or by showing less information (e.g., by using a larger time increment). In some embodiments, the time increment to be used for some or all of the playback controls may further be user selectable. The "rewind" control 7028*b* allows the user to animate traffic conditions starting from the currently selected time and displaying backward in time toward the earliest time selected by the user in the illustrated example, although in other embodiments may begin the animation at the latest time rather than the currently selected time. The "stop" control 7028*a* allows the user to stop the current animation. In the example illustrated, the user selects the "play" control in FIG. 7**K to begin an animation at the currently selected time of 4:30 PM.

FIG. 7L shows the user interface as the animation advances to selected time 4:45 PM, which in this example is reflected with the triangle-shaped time indicator 7042 of the time slider 7050 and the currently selected time display 7040 having being updated to represent the selected time 4:45 PM. The animation advances from the display in FIG. 7K to that of FIG. 7L without additional user input or interaction after selection of the "play" control, such as immediately or within a small amount of time (e.g., a second). While the time increment between selected times is 15 minutes in this example, in other embodiments other time increments may be used. In addition, while illustrated in FIG. 7L with distinct reference numbers such as 7040, 7042, 7044, 7046, 7048 and 7050, these illustrated controls and information correspond to the analogous controls and information 7020, 7025, 7024, 7026, 7028 and 7022 of FIG. 7K, respectively. In this example, the "play" control **7048*a* of playback control 7048 is also shown as being selected. The positions of user-selectable controls 7044 and 7046 remain unchanged (with respect to the corresponding controls 7024 and 7026 of FIG. 7K) because the user has not changed the earliest or latest times of interest. Due in part to the fact that the animation has only advanced 15 minutes from the start time, much of the traffic condition information in FIG. 7L is the same as it was in FIG. 7K. For example, road segment 7049*a* has the same predicted level of traffic congestion as the respective corresponding road segment 7029*a* of FIG. 7K. However, some traffic condition information has changed in the 15-minute interval since the start time. For example, road segment 7049*b* has a different predicted level of traffic congestion at 4:45 PM than the respective corresponding road segment 7029*b* of FIG. 7K at 4:30 PM, with moderate traffic congestion conditions now being illustrated for road segment 7049*b***.

FIG. 7M shows the user interface as the animation advances to selected time 5 PM. The slider control 7062 and selected time display 7060 have both been updated to reflect the new time, and the animation advances from the display in FIG. 7L to that of FIG. 7M without additional user input after selection of the "play" control in FIG. 7K, such as within a small amount of time after the information in FIG. 7L is displayed (e.g., a second, or substantially immediately). In FIG. 7M, road segment **7069*a* has a different predicted level of traffic congestion at time 5 PM than the respective corresponding road segment 7049*a* of FIG. 7L at time 4:45 PM, with little to no traffic congestion now being illustrated for road segment 7069*a*. On the other hand, road segment 7069*b* has the same predicted level of road traffic congestion condition as the respective corresponding road segment 7049*b* of FIG. 7**L.

FIG. 7N shows the user interface as the animation advances to selected time 5:15 PM. The slider control 7062 and selected time display 7060 have both been updated to reflect the new time, and the animation advances from the display in FIG. 7M to that of FIG. 7N without additional user input after selection of the "play" control in FIG. 7K, such as within a small amount of time after the information in FIG. 7M is displayed (e.g., a second, or substantially immediately). In this example, the "stop" control **7088*a* is highlighted to indicate that the user has elected to end the animation after the traffic condition information for 5:15 PM is displayed. In FIG. 7N, road segment 7089*a* has a different predicted level of road traffic congestion for time 5:15 PM than the respective corresponding road segment 7069*a* of FIG. 7M at time 5 PM, with moderate traffic congestion conditions now being illustrated for road segment 7089*a*. On the other hand, road segment 7089*b* has the same predicted level of road traffic congestion condition as the respective corresponding road segment 7069*b* of FIG. 7M. Because the currently selected time of 5:15 PM is still between the selected earliest and latest times of 2 PM and 7 PM, respectively, the user may choose to select the "play" button again to continue the animation, the "fast forward" button to resume the animation at a faster speed, or the "rewind" button to reverse the animation backward in time toward the earliest time of 2 PM. For the sake of brevity, the user interface displays resulting from such user selections are not illustrated here. Once the currently selected time is updated to equal either the selected earliest or latest time, certain controls of playback control 7088 may no longer be selectable. For instance, if the user resumes the animation and the animation displays until the latest selected time, the animation may automatically stop, and the "play" and "fast forward" controls may no longer be selectable. However, in that case, the user would still be able to select either the "rewind" control, manually change the currently selected time, select a new earliest time, and/or select a new latest time, which may result in some or all playback controls 7088** again being selectable.

FIG. 7E illustrates an example display similar to that shown in FIG. 7B, but with the map showing predicted travel conditions on a particular travel route at the currently selected future time 753 of 5:00 PM. In this example, the user has selected key route option control 752 labeled "Redmond to Airport," and in response information about predicted traffic conditions relevant to the route between Redmond **750*a* and SeaTac Airport 750*b* is shown for the currently selected future time. In particular, in this example traffic condition information at the currently selected time is shown for each of the road segments on the route 751 through the road network corresponding to the selected route option 752, and traffic condition information is shown only for the route 751**, such as by displaying other roads in a de-emphasized fashion (e.g., in embodiments in which road congestion levels are shown in color, by showing the other roads in gray). In other embodiments, information about a route may be shown in other manners, such as by removing all visual representations of other roads and road segments that are not part of the route, and/or by representing the road segments of the route in an abstract manner without displaying any geographic information.

Figure 7O:
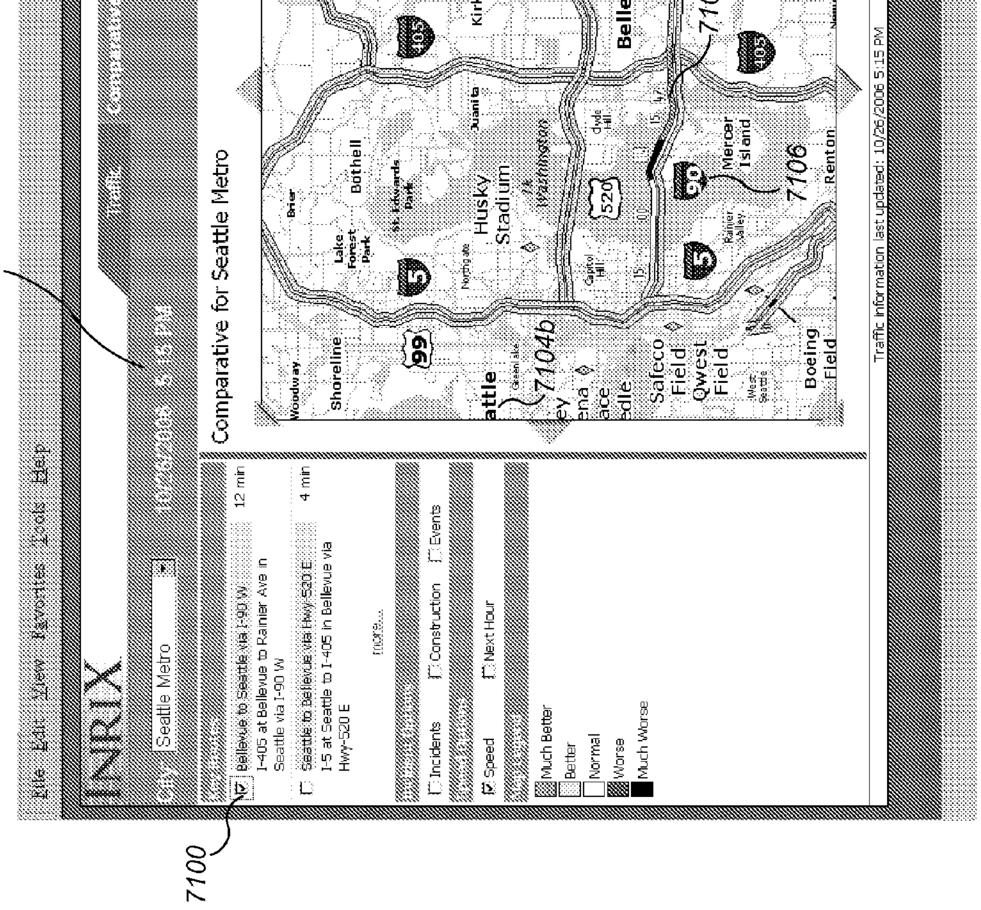
Figure 7P:
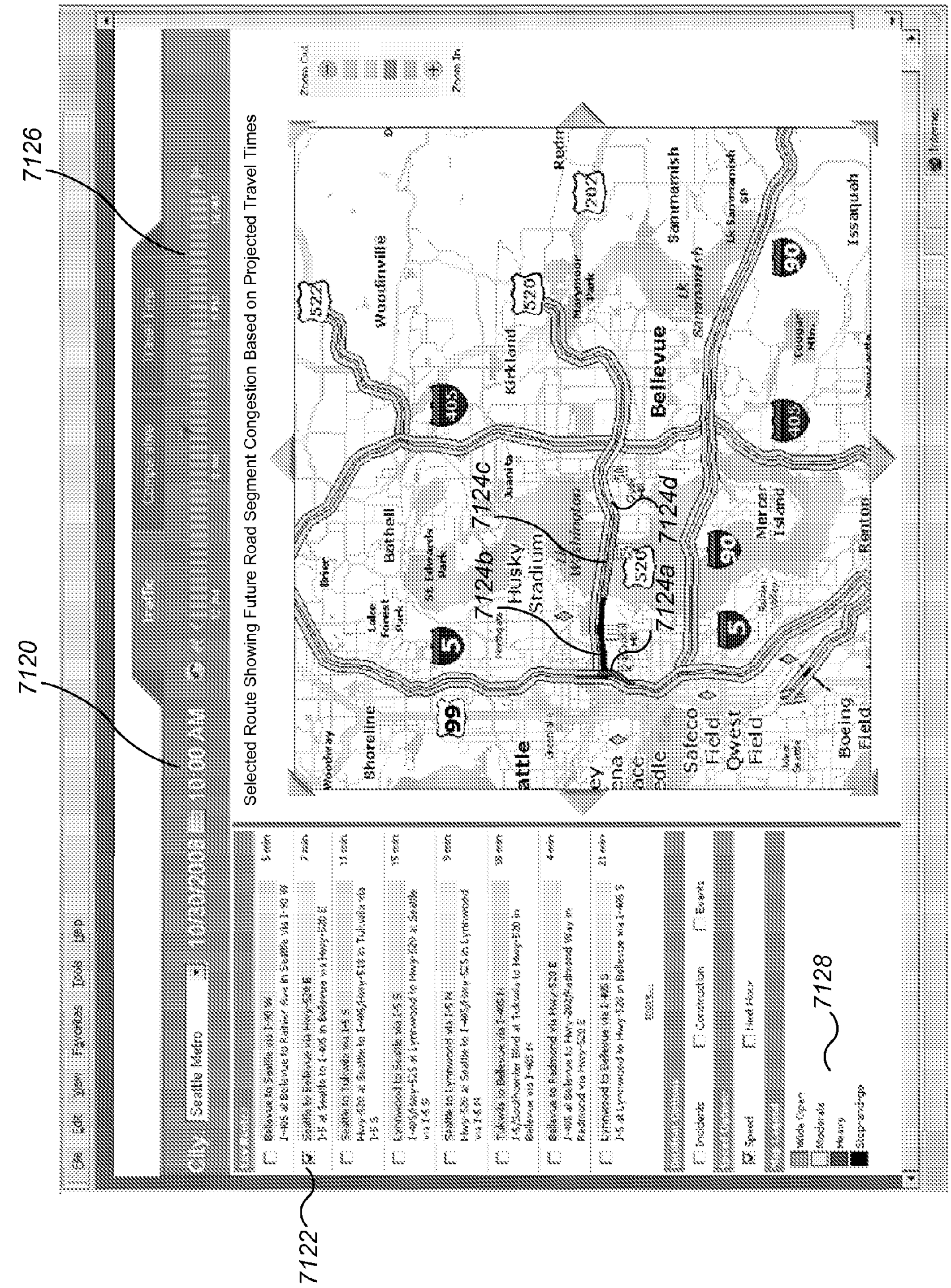

FIG. 7P illustrates another example display of a selected route in a manner similar to that of FIG. 7E, but with static road traffic information shown for varying times for various of the road segments along the illustrated route (in this example, a route from Seattle to Bellevue, corresponding to selection of the route option control 7122 labeled "Seattle to Bellevue via Highway 520"). The illustrated display includes a time slider control 7126, which the user has used in this example to specify a currently selected future time of 10:00 AM on the current day, as reflected by time display 7120. Traffic condition information for each of the road segments 7124*a*-7124*d* along the route is displayed (e.g., shaded to reflect predicted future traffic conditions congestion levels 7128), while other road segments of the map are displayed in a de-emphasized fashion (e.g., drawn in gray in embodiments where the selected road segments are drawn in colors indicating traffic congestion levels). However, in a manner distinct from that of FIG. 7E, the traffic conditions indicated for the road segments 7124*a*-7124*d* correspond to different selected times, and in particular at selected times that correspond to projected travel times along preceding road segments of the route. Thus, if a vehicle were to begin traveling along the route at the currently selected time of 10:00 AM, road segment 7124*a* indicates road traffic conditions at the currently selected time, and each of the other road segments 7124*b*-7124*d* indicates traffic conditions for later times at which the vehicle is projected to travel on the road segment (e.g., at a time that the vehicle is projected to reach the beginning of the road segment or the middle of the road segment).

Thus, in this example, road segment 7124*a* indicates (e.g., via its color or shade of gray) that traffic conditions along the corresponding stretch of road at or around the specified start time of 10:00 AM are predicted to be "Heavy." Based on a calculated expected travel time over road segment 7124*a* of 15 minutes (e.g., based on the predicted traffic conditions for the road segment and the length of the road segment), a next selected time of 10:15 AM is determined at which a vehicle may be expected to enter the next road segment on the route, road segment 7124*b*. Road segment 7124*b* may then be displayed (e.g., shaded or colored) to indicate predicted traffic conditions at the next selected time of 10:15 AM as being "Stop-and-go." Given a calculated expected travel time over road segment 7124*b* at 10:15 AM of 25 minutes (given the predicted travel conditions for road segment 7124*b* at 10:15 AM), a next selected time of 10:40 AM is determined at which a vehicle may be expected to enter the next road segment on the route, road segment 7124*c*. Road segment 7124*c* may then be displayed to indicate predicted traffic conditions at the next selected time of 10:40 AM as being "Wide Open." By a similar process, a next selected time may be determined for road segment 7124*d* based on a calculated expected travel time over road segment 7124*c* at 10:40 AM, and road segment 7124*d* may then be displayed to indicate predicted traffic conditions for the next selected time. Such a process may be repeated for any sequence of multiple road segments, so as to provide a view of future road segment congestion based on projected travel times.

Figure 7Q:
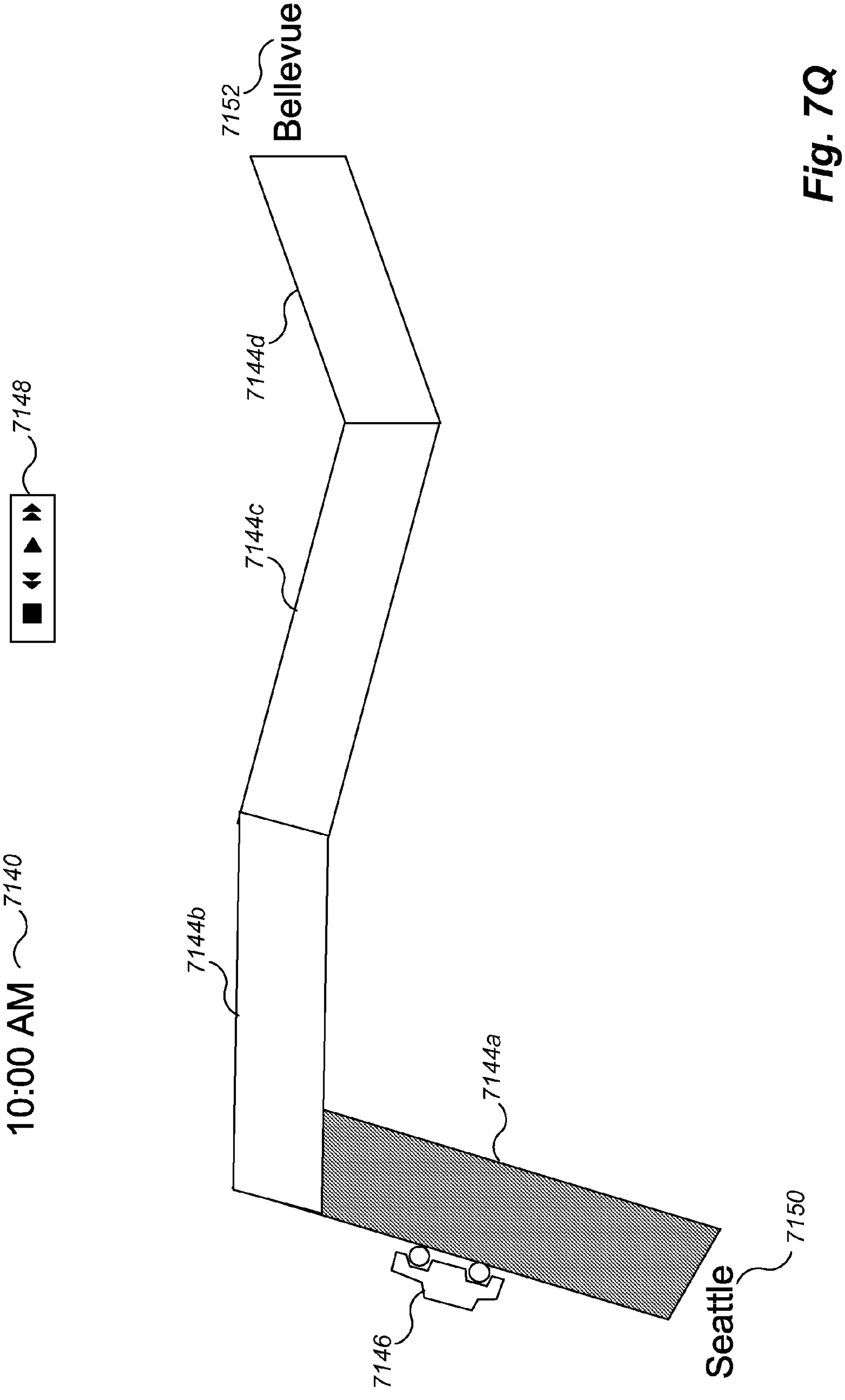
Figure 7R:
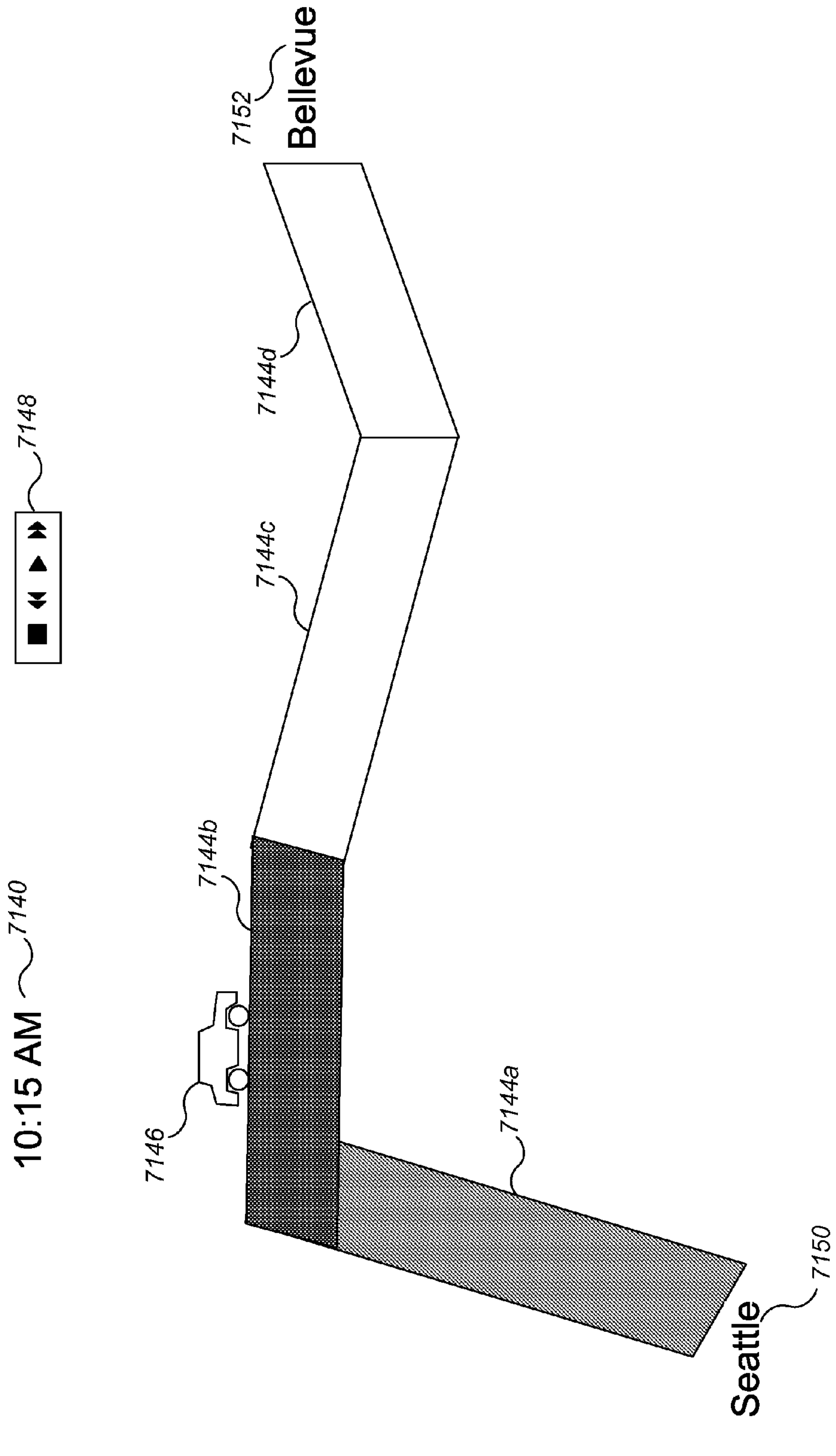
Figure 7S:
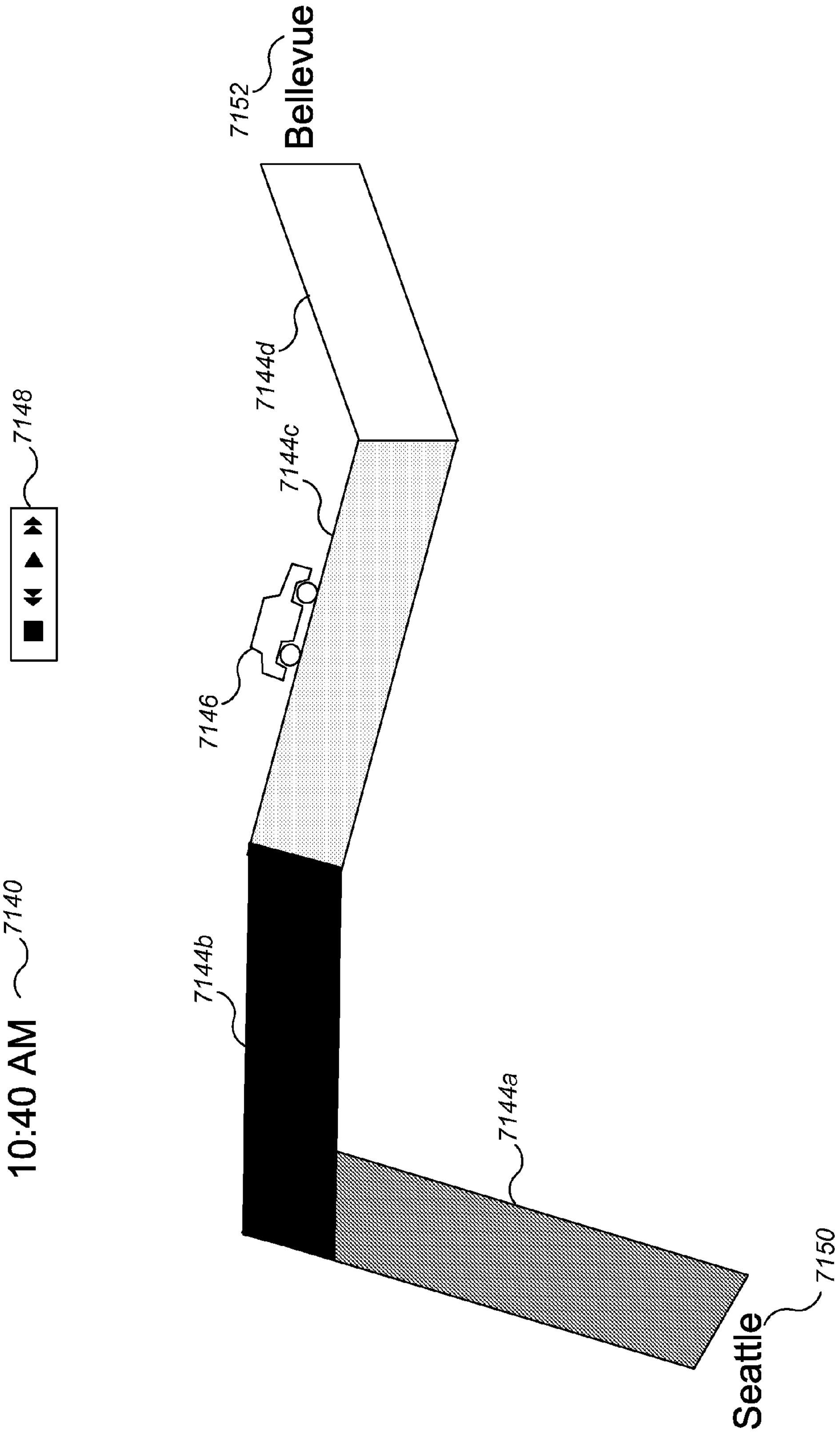

FIGS. 7Q-7S illustrate alternative example displays of the varying time traffic conditions information for the route illustrated in FIG. 7P, and in particular based on showing an animated view of the varying times for the route. While the displays in FIGS. 7Q-7S are shown in an abstract manner without corresponding geographic information, in other embodiments the information illustrated in FIGS. 7Q-7S may instead be illustrated within a map display similar to that shown in FIG. 7P. In this example, the animation for the route includes an iconic representation of a vehicle traveling over the road segments of the route in order to visually indicate the projected progress of a vehicle and the associated traffic conditions at road segments at the times they are traversed by the vehicle, but in other embodiments such a vehicle representation may not be provided.

In particular, FIG. 7Q illustrates an example display for animating projected travel over the selected route, showing an indicated route origin 7150 of "Seattle" and an indicated route destination 7152 of "Bellevue." The selected route comprises four road segments 7144*a*-7144*d*, such as to correspond to road segments 7124*a*-7124*d* of FIG. 7P. The example display further includes playback controls 7148 similar to controls 7028 of FIG. 7K, a selected time display 7140, and a vehicle icon 7146. A user may utilize the playback control 7148 to execute (e.g., play, stop, fast-forward, etc.) an animation of the vehicle icon 7146 as it travels over road segments 7144*a*-7144*d*. As the vehicle icon 7146 as it travels over the road segments 7144*a*-7144*d*, with each road segment being displayed in a manner that indicates predicted traffic conditions at the future time during which the vehicle is expected to be traveling upon the corresponding road segment (based on calculations such as those described with reference to FIG. 7P). While this example involves all of the times during which travel on the route occurs being future times with predicted future traffic conditions, in other situations some or all of the times during which travel occurs may be current or past times, so that actual traffic conditions information may instead be used. In FIG. 7Q, the vehicle icon 7146 is shown adjacent to road segment 7144*a*, which is shaded to indicate "Heavy" traffic conditions at or around an initial selected time of 10:00 AM, as indicated by the time display 7140. Road segments 7144*b*-7144*d*, which have yet to be reached by the animated vehicle icon 7146, are displayed in a de-emphasized manner (e.g., grayed out and/or without color).

FIG. 7R corresponds to a next display in the animation, with the vehicle icon 7146 now being shown adjacent to road segment 7144*b*. As with the prior discussed animation, this example animation advances from the display in FIG. 7Q to that of FIG. 7R without additional user input or interaction after selection of the "play" control (or other initiation of the animation), such as immediately or within a small amount of time (e.g., a second). In this example, the road segment 7144*b* is shaded to indicate "Stop-and-go" traffic conditions at or around a calculated next selected time of 10:15 AM, as indicated by the updated time display 7140. Again, road segments 7144*c*-7144*d*, which have yet to be reached by the animated vehicle icon 7146, are displayed in a de-emphasized manner, although in this example the previously display road traffic conditions information for initial road segment 7144*a* continue to be displayed. In other embodiments, previously traveled road segments may be de-emphasized in a similar manner to the yet-to-be-reached road segments. In FIG. 7S, the next display in the animation is shown, with the vehicle icon 7146 having progressed to road segment 7144*c*. Road segment 7144C is shaded to indicate "Wide Open" traffic conditions at or around the corresponding selected time of 10:40 AM, as indicated by the time display 7140. A final view of the above described animation, in which all four road segments 7144*a*-7144*d* indicate future traffic conditions, would appear similar to that of FIG. 7P, and is not described here for sake of economy. By displaying the views illustrated in FIGS. 7Q-7S consecutively and with minimal interstitial time (e.g., a fraction of a second), and optionally with additional figures to show movement of the vehicle icon within each road segment, an illusion of motion may be perceived by a user, such that the vehicle icon 7146 appears to be moving over the road segments 7144*a*-7144*d* whilst the road segments are consecutively decorated, drawn, or otherwise displayed to indicate future traffic conditions.

FIG. 7F illustrates an example display similar to that shown in FIG. 7A, but with the map showing a congestion-oriented view of current traffic conditions at the currently selected time 763 of 4:45 PM. In this view, the user has selected the "Congestion" navigation tab control 761 and the speed information display option 765 in order to obtain information about predicted times until current traffic conditions are expected to change from their current state. In this example, a time slider is not shown because the predicted information provided is relative to a current time of 4:45 PM, although in other embodiments similar predicted change information may additionally be available for user-selected future times. In this view, road segments are annotated with circular clock icons, such as icons 766*a* and 766*b*. The clock icon 766*a* with darker shading in this example indicates an amount of time until traffic on a given road segment clears or otherwise improves by a designated amount (e.g., changes from "Stop-and-go" or "Heavy" to "Moderate" or "Wide Open"), while the clock icon 766*b* with lighter shading in this example indicates an amount of time until traffic on a given road segment becomes congested or otherwise worsens by a designated amount (e.g., changes from "Wide Open" or "Moderate" to "Heavy" or "Stop-and-go"). For example, clock icon 761*a* is all dark, indicating that the corresponding adjoining road segment is expected to remain in a congested state for at least the next hour. In contrast, clock icon 761*b* is only approximately one-eighth dark, indicating that the adjoining road segment is expected to clear in approximately one-eighth of an hour, and clock icon 761*c* is approximately one-eighth light, indicating that traffic on the adjoining road segment is expected to become congested soon.

FIG. 7I illustrates an example display similar to that shown in FIG. 7F, but with only a portion of one road illustrated and with icons that each visually present information about predicted traffic conditions for multiple future times. In this example, three road segments 790*a-c* are shown and each displayed with a degree of predicted traffic congestion level at a particular currently selected time, not shown (although in embodiments in which the currently selected time is a past time, at least some of the information displayed may reflect actual traffic congestion levels corresponding to the past time rather than predicted information). In this example, road segment 790*a* has wide-open traffic conditions at the currently selected time, road segment 790*b* has moderate traffic conditions at the currently selected time, and road segment 790*c* has heavy traffic conditions at the currently selected time.

In addition, each road segment has an adjoining clock icon that can display multiple areas each corresponding to a portion of the hour following the currently selected time, although in other embodiments the clock may represent a period of time other than an hour, or such information may alternatively be displayed in manners other than a clock or a circle. For example, clock 791 adjoins road segment 790*a* and has four portions 791*a-d*, with each portion for this clock being a 15-minute quadrant, and with each clock portion being filled with the level of grayscale for the traffic congestion level represented by that portion. Thus, portion 791*a* represents the 15 minutes following the currently selected time and is shaded to indicate that wide-open traffic conditions are predicted for road segment 790*a* during those 15 minutes, and portion 791*b* represents the period of time from 15 to 30 minutes after the currently selected time and also indicates predicted wide-open traffic congestion level conditions. While the portions of example clock 791 are evenly spaced in 15-minute segments (e.g., to reflect predictions made at each of 15-minute time intervals), in other embodiments each distinct portion of time within a clock may instead correspond to a different predicted or actual traffic congestion level—if so, the two portions 791*a* and 791*b* that both represent the same level of traffic congestion would instead by combined into a single portion, which in this example would be a portion that fills the first half of the clock. In this example, portion 791*c* indicates predicted moderate traffic conditions for the road segment during the next period of time (which in this example is 30 to 45 minutes after the currently selected time), and portion 791*d* indicates predicted heavy traffic conditions for the road segment during the last 15 minutes of the hour. Thus, in contrast to the clock icons illustrated in FIG. 7F that each represent a single predicted future traffic condition (the future point in time when the level of traffic congestion will change), the clock icon 791 illustrates predicted future traffic conditions for each of multiple future times, and provides significantly more information to the user regarding predicted future conditions in a compact and easy-to-understand manner.

In a similar manner to clock icon 791, clock icon 792 adjoins road segment 790*b* and has four portions 792*a-d* that in this example are each 15-minute quadrants. Quadrants 792*a-d* represent, respectively, moderate, heavy, heavy, and stop-and-go predicted traffic congestion level conditions for road segment 790*b* at the periods of time corresponding to the portions. Conversely, clock icon 793 has only three portions that each represents a traffic congestion level distinct from any other portions adjacent in time. Thus, with respect to adjoining road segment 790*c*, portion 793*a* of clock 793 indicates predicted heavy traffic congestion level conditions for the road segment during a first approximately 7 minutes following the currently selected time, portion 793*b* indicates predicted moderate traffic congestion level conditions for the road segment during the following approximately 15 minutes, and portion 793*c* indicates predicted wide open traffic congestion level conditions for the road segment during the remainder of the hour. While three portions of time are illustrated here, in will be appreciated that more or less portions could be displayed, that each portion can represent any amount of time down to the difference in times between distinct future time predictions, and that different portions of such a clock may represent the same predicted level of traffic congestion (e.g., if one or more intervening portions have one or more different predicted traffic congestion levels).

Figure 7T:
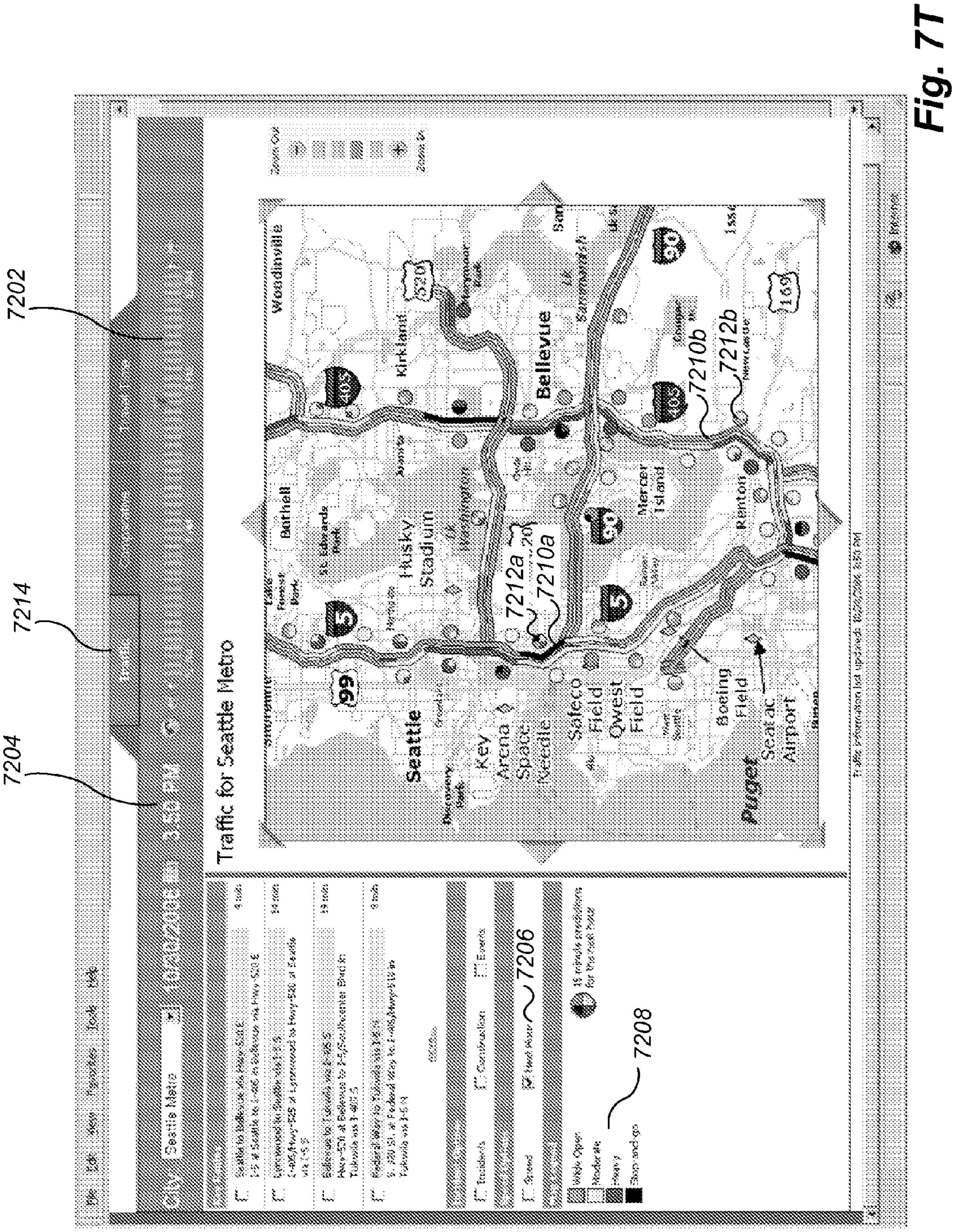

FIG. 7T illustrates an example display similar to that shown in FIG. 7A, but with the map including icons that each visually present information about predicted traffic conditions for multiple future times, in a manner similar to that described with reference to FIG. 7I. In this example, the displayed user interface includes several navigation tab controls with which a user may select to display various types of traffic condition information, including comparative information (e.g., based on a comparison to expected conditions), non-comparative information (e.g., to display actual and/or predicted traffic flow measurements), and information about travel times for particular routes. In this example, the user has selected the "Traffic" navigation tab control 7214 in order to obtain information about non-comparative traffic conditions at a specified selected time. In the illustrated example, time display information 7204 shows the currently selected time as 3:50 PM on Oct. 30, 2006, and the road segments of the map are accordingly shaded (as described with reference to FIG. 7A, and reflected in map legend 7208) to reflect current actual or predicted levels of traffic congestion for the road segments at the currently selected time.

In this example, the user has also selected a "Next Hour" control 7206, which results in the display of clock icons for each of the currently selected road segments to visually present information about predicted traffic conditions for multiple future times following the currently selected time for each road segment. The displayed clock icons include clock icon 7212*a* corresponding to adjoining road segment 7210*a*, and clock icon 7212*b* corresponding to adjoining road segment 7210*b*. In this example, each clock icon represents a hour, and can display multiple sector areas each corresponding to a portion of the hour, with each sector area being filled with the level of grayscale (or in other embodiments, color) for the traffic congestion level represented by the time period for that portion. In particular, the illustrated clock icons in this example each have four 15-minute quadrant sectors reflecting predicted traffic conditions for four consecutive 15-minute time periods beyond the currently selected time indicated in the time display 7204. Clock icon 7212*a* indicates that traffic congestion levels on road segment 7210*a* will be "Stop-and-go," "Moderate," "Heavy," and "Wide Open" for the next four 15-minute time periods after the currently selected time of 3:50 PM, and clock icon 7212*b* indicates that traffic congestion levels on road segment 7210*b* will be "Moderate," "Moderate," "Wide Open," and "Wide Open" for the next four 15-minute time periods after the currently selected time of 3:50 PM.

In addition, the illustrated display includes a time slider control 7202 that may be utilized by a user to specify a new currently selected time for which traffic conditions are to be displayed, such as a future or past currently selected time. Upon specification of a new currently selected time, the visual representations of the road segments on the map are each updated to display the grayscale level (or color) corresponding to the actual or predicted level of congestion for the new currently selected time for the road segment, and the visual clock icons are similarly updated to include the actual or predicted traffic congestion levels for the corresponding road segment during the hour following the new currently selected time.

FIG. 7G illustrates an example display similar to that shown in FIG. 7A, but with the map showing a comparative view of current traffic conditions at the currently selected time 773 of 4:45 PM so as to indicate differences from normal conditions. In this view, the user has selected the "Comparative" navigation tab control 771 and the speed information display option control 775 in order to obtain information describing a degree of difference (e.g., a numeric amount of difference and/or one of multiple predefined enumerated levels of difference) between current traffic conditions as compared to normal expected conditions for the currently selected time, with normal traffic conditions being determined in this example by reference to a predictive model that can be used to determine expected default long-term traffic condition forecasts based on historical observations and some current conditions such as scheduled events but not on transient or temporary situations such as accidents and other road incidents, short-term road construction, weather, etc. More generally, in other embodiments the "normal" data against which the comparison is made may be determined or selected in other manners, such as by purely using historical averages, by allowing a user to designate the types of information to be considered for the "normal" data (e.g., to use school calendar information but not events), by allowing a user or other operator to designate a particular set of data to be used for the comparison (e.g., by supplying a particular set of data, by indicating a particular past date to use, such as last Wednesday at 5 PM, etc.), etc. In this example, a time slider is not shown because the predicted information provided is relative to a current time of 4:45 PM, although in other embodiments similar predicted difference information may additionally be available for user-selected future times, such as is described in more detail with respect to FIG. 7J. In this view, the road segments are again marked to reflect information of interest, but the map legend 776 indicates different meanings for the markings, such as to indicate varying degrees or levels of difference from normal in various shades of gray (or in other embodiments to instead using various colors, such as green to indicate that current or predicted traffic conditions are much better than normal 776*a*, yellow to indicate that the traffic conditions are better than normal 776*b*, white to indicate that the traffic conditions are substantially normal 776*c*, red to indicate that the traffic conditions are worse than normal 776*d*, and black to indicate that the traffic conditions are much worse than normal 776*e*). In addition, in this example the selection of the speed information control 775 prompts road segments to be annotated with numbers in boxes to indicate a numeric difference of the number of miles per hour faster or slower than normal that traffic is flowing on a given road segment (e.g., for embodiments in which colors are used, boxes displayed in one of two colors to indicate better than normal speeds and worse than normal speeds, such as green for better and red for worse). For example, road segment 771*a* is displayed with a level of grayscale indicating better-than-normal traffic and is annotated with the number "11" in a box (e.g., a green box) to indicate that traffic is flowing 11 miles per hour faster than normal on that road segment. In contrast, road segment 771*b* is displayed with a level of grayscale indicating worse-than-normal traffic and is annotated with the number "10" in a box (e.g., a red box) to indicate that traffic is flowing 10 miles per hour slower than normal on that road segment.

Other types of comparative traffic conditions information may be displayed in other manners in other embodiments. For example, in some embodiments, comparative traffic conditions information may be determined and displayed in a manner other than on a per-road segment basis, such as to determine and display aggregate comparative traffic conditions information for multiple road segments (e.g., multiple road segments along a particular route, or in a particular geographic area), whether in addition to or instead of displayed comparative traffic information on a per-road segment basis. In addition, other types of comparative information may be determined and displayed in other embodiments, such as differences in an average amount of time to travel from one end of a road segment to another, differences in average traffic volume or occupancy, etc.

Furthermore, anomalous road traffic conditions may be automatically detected in various ways, and information about the detected anomalies may be presented or otherwise provided in various ways, such as to facilitate travel on roads of interest. The detection of anomalous road traffic conditions is performed in at least some embodiments for each of one or more segments of roads at each of one or more selected times with respect to target traffic conditions that are identified to be analyzed for a particular road segment at a particular selected time, such as to identify target traffic conditions that reflect actual traffic conditions for a current or past selected time, and/or to identify target traffic conditions that reflect predicted future traffic conditions for a future selected time. The analysis of target traffic conditions for a selected segment of road at a selected time to detect anomalous road traffic conditions may include comparing the target traffic conditions for the road segment at the selected time to distinct expected road traffic conditions for the road segment at the selected time, with the expected conditions reflecting road traffic conditions that are typical or normal for the road segment at the selected time. When the target traffic conditions have sufficiently large differences from the expected conditions, corresponding anomalous conditions may be identified, and information about the anomalous conditions may be provided in various ways.

Traffic conditions data that is analyzed to detect anomalous conditions may reflect one or more of various types of traffic flow measurements in various embodiments (e.g., average traffic speeds, average traffic volume over a period of time, average traffic occupancy that reflects the average percentage of time that vehicles are occupying a particular location, etc.). In addition, a particular type of traffic flow data may be detected as being anomalous based on differing in one or more ways from expected traffic flow data of that type, such as to be abnormal, atypical, unusual, or otherwise sufficiently different (e.g., so as to exceed a predetermined or dynamically determined threshold). Information related to detected anomalous traffic conditions may be provided to users and/or other computer systems or applications in various ways in various embodiments. For example, as previously noted, users may be provided with graphically displayed maps that indicate degrees or levels to which target traffic conditions differ from expected traffic conditions. In other embodiments, alerts or other notifications may be sent to client devices and/or client applications that are used or operated by users when specified circumstances occur, so that the client applications/devices may notify the users if appropriate that traffic is likely to differ from normal or other expectations. Furthermore, in some embodiments such information related to detected anomalous traffic conditions may be provided to other entities or systems that may use the information in various ways, including by making some or all of the provided information to customers or other users of the other entities and systems.

In at least some embodiments, at least some of the described techniques for detecting anomalous road traffic conditions and providing information about the detected anomalies are automatically provided by an Anomalous Traffic Conditions Detector system. Additional details related to such detecting and providing of information about anomalous road traffic conditions are included in U.S. patent application Ser. No. 11/556,648, filed Nov. 3, 2006 and entitled "Detecting Anomalous Road Traffic Conditions," now U.S. Pat. No. 7,899,611, which is hereby incorporated by reference in its entirety.

FIG. 7J illustrates an example user interface display with comparative traffic condition information similar to that shown in FIG. 7G, but with the display further including a user-manipulatable time slider control 7002 similar to control 703 of FIG. 7A. In this example, the current time is 1:00 PM, but a user has manipulated the time slider 7002 such that the position of the triangle-shaped time indicator on the slider control reflects a currently selected time 7004 of 3:30 PM. In response, the displayed map is updated so that the displayed traffic conditions information corresponds to a comparative view of traffic conditions at the selected time, such as to indicate differences between target traffic conditions for 3:30 PM and expected traffic conditions for 3:30 PM. By using the example user interface display of FIG. 7J, the user may obtain information related to anomalous traffic conditions at selected times of interest. Although not specifically illustrated in FIG. 7J, in some embodiments the user may select times of interest by using time sequence manipulation playback controls as illustrated and discussed in reference to FIGS. 7K-7N. The target and expected traffic conditions data that is used as a basis for comparison for a particular selected time may be selected in various ways, such as based on the difference between the current time and the selected time. In this example, the user is requesting comparative information for a time two and one-half hours in the future, which may be within the time interval for which short-term predicted information is available. As such, target traffic conditions may be obtained from a predictive model that provides short-term predictive information based on current conditions (e.g., current traffic conditions, current weather, traffic incidents, etc.) as well as future conditions corresponding to the selected time (e.g., event schedules, school schedules, forecast weather, scheduled traffic construction or other work, etc.). The expected traffic conditions may be obtained from a predictive model that provides longer-term default forecast information based primarily on conditions and other inputs that may be considered by the user as part of their subjective understanding of "normal" traffic conditions (e.g., not based on current conditions, such as current weather and traffic incidents). In other embodiments and situations, target and expected traffic conditions may be determined in various other ways.

The illustrated user interface display of FIG. 7J also includes an incident display options control area 7006 that includes various user-selectable controls that a user may modify in order to display or not display indications of various types of information affecting traffic conditions via one or more corresponding markers 7012. In this example, the user-selectable controls allow control over display of information about traffic incidents, locations of road construction or other road work, and scheduled events. In addition, the user interface display of FIG. 7J also includes a speed options control area that includes user-selectable controls 7008 and 7010 to modify how speed-related information is displayed on the map. In the illustrated example, in response to the user's selection of the Speed control 7008, the map has been annotated with a number in a box for each road segment to numerically indicate information about average speed for the associated road segment, and in particular in this example to display a comparative number of how many miles per hour faster or slower that the target traffic conditions speed for the selected time is relative to the expected traffic conditions speed for the selected time. By selecting the Next Hour control 7010, the map would instead or in addition be annotated with clock icons similar to those described with reference to FIG. 7I and FIG. 7T, so as to provide the user with an indication of predicted traffic information for each road segment during a future time period beyond the selected time, such as the next hour. The predicted future information may be displayed as comparative predicted future traffic conditions information and/or as non-comparative absolute predicted future traffic conditions information. Thus, for example, if comparative predicted future traffic conditions information is displayed, a particular clock icon for a particular road segment may indicate distinct predicted traffic information for each of multiple distinct future times during the future time period, such as that traffic conditions will be much better than normal in 15 minutes from the selected time, will be somewhat better than normal in 30 minutes, will be normal in 35 minutes, etc.).

FIG. 7O illustrates an example display with comparative traffic information similar to that shown in FIG. 7J, but with the map showing comparative traffic condition information on a particular travel route at the currently selected time 7102 of 5:15 PM. In this example, the user has selected route option control 7100 corresponding to a route 7108 labeled "Bellevue to Seattle via I-90 W." In response, information about comparative traffic conditions relevant to travel along Interstate-90 westbound road between Bellevue 7104*a* and Seattle 7104*b* is shown for the currently selected time. In particular, in this example comparative traffic condition information (e.g., differences between predicted and expected traffic conditions at 5:15 PM) is shown only for route 7108 through the road network, such as by displaying other roads in a de-emphasized fashion as previously described.

Figure 7U:
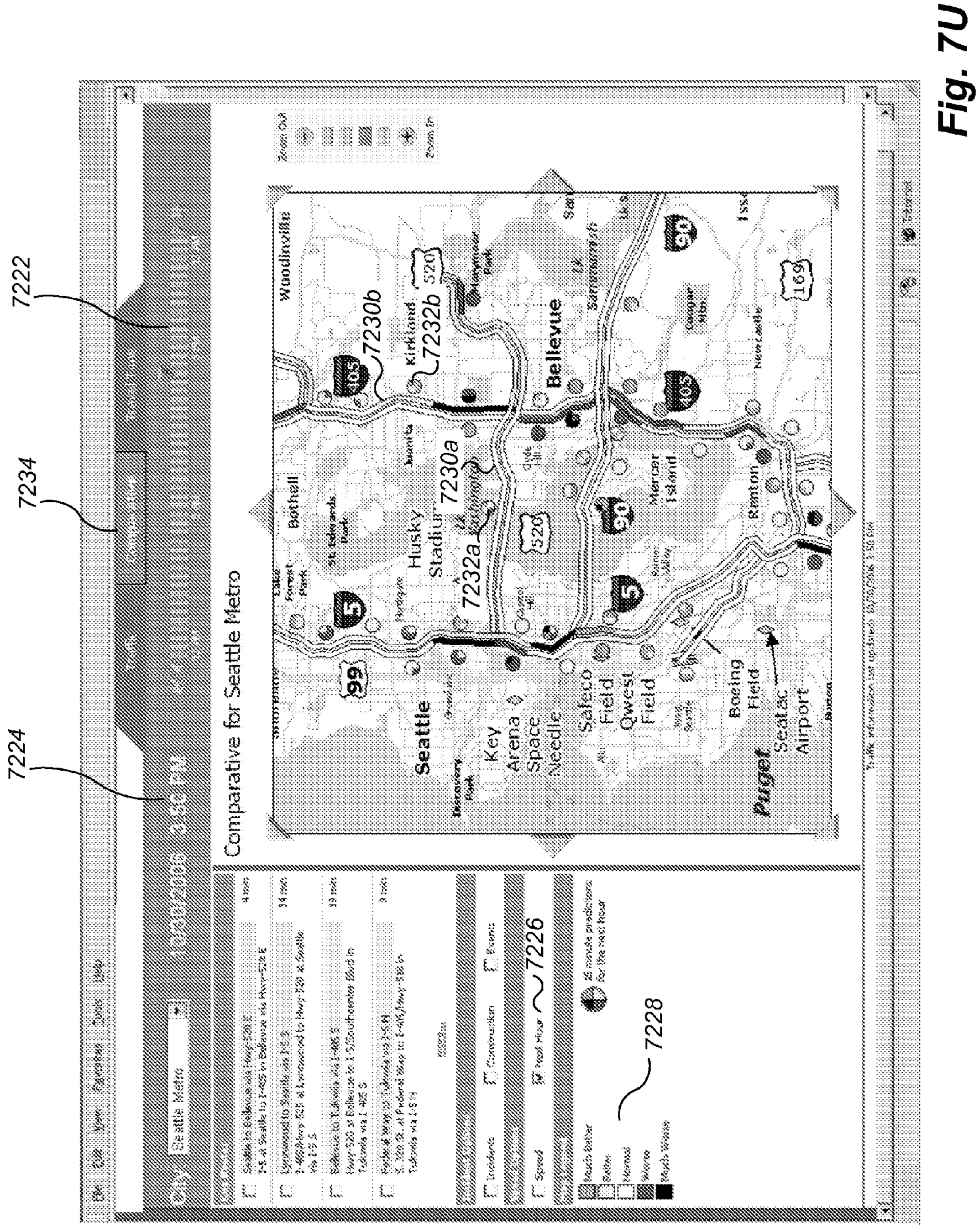

FIG. 7U illustrates an example display with comparative traffic information similar to that shown in FIG. 7J, and with the map including clock icons similar to those previously discussed with respect to FIG. 7T, but in a manner to display predicted comparative traffic conditions information rather than non-comparative information. In particular, in response to selection of the "Next Hour" control 7226, clock icons are displayed for each road segment to visually present comparative traffic conditions information for multiple future times. In this view, the user has selected the "Comparative" navigation tab control 7234, and time display 7224 shows the currently selected time to be 3:50 PM on Oct. 30, 2006, with the visual representations of the road segments being accordingly colored and/or shaded to reflect comparative traffic condition information according to map legend 7228.

The displayed clock icons include clock icon 7232*a* that corresponds to adjoining road segment 7230*a*, and clock icon 7232*b* that corresponds to adjoining road segment 7230*b*, so as to display future comparative traffic conditions information for the next hour beyond the currently selected time. In particular, the illustrated clock icons in this example each have four 15-minute quadrants reflecting comparative traffic conditions for four consecutive 15-minute time periods beyond the currently selected time. Clock icon 7232*a* indicates that predicted traffic congestion levels on road segment 7230*a* will be "Much Better," "Much Better," "Much Better," and "Better" than normal for the next four 15-minute time periods after the currently selected time, and clock icon 7232*b* indicates that predicted traffic congestion levels on road segment 7230*b* will be "Much Better," "Better," "Worse," and "Better" than normal for the next four 15-minute time periods after the currently selected time. In addition, the illustrated display includes a time slider control 7222 that may be utilized by a user to specify a particular currently selected time for which comparative traffic conditions information is to be displayed. For example, the time slider control 7222 may be used to specify a new currently selected future time (e.g., 7:00 PM), such that the visual representations of the road segments would be updated to display comparative information for the new currently selected time (e.g., differences between predicted and expected traffic conditions at 7:00 PM), and the illustrated clock icons would similarly be updated to display comparative predicted information for an hour beyond the new currently selected time (e.g., to reflect differences between predicted and expected traffic conditions for 15-minute time periods beginning at 7:00 PM, 7:15 PM, 7:30 PM, and 7:45 PM).

FIG. 7H illustrates an example display similar to that shown in FIG. 7A, but with the map showing a graphical view of total travel time for a particular travel route over the course of a day based on the currently selected day of Feb. 1, 2006. In this view, the user has selected the "Travel Time" navigation tab 781 in order to obtain the usual and actual/expected total travel times for a selected route, such as a route between Lynnwood and Seattle based on selection of the Lynnwood to Seattle route option control 782. In particular, a graph 784 is displayed that plots time of day on the x-axis 785*b* and total travel time in minutes on the y-axis 785*a*. The dark line 786*a* graphs the usual total travel time for the given travel route at the various times during the day, and the light line 786*b* graphs the current and/or predicted travel times (based on whether the currently selected day is in the past, is today, or is in the future), thus enabling easy comparison of the differences in the total travel time lines. As with respect to FIG. 7G, the usual total travel times for a route in FIG. 7H may be determined in various ways in various embodiments, including based on historical averages, by reference to a predictive model that can be used to determine expected long-term traffic condition forecasts based on historical observations and some current conditions (such as scheduled events) but not on transient or temporary situations (such as accidents and other road incidents, short-term road construction, etc.), by allowing a user to designate the types of information to be considered for the "usual" data (e.g., to use school calendar information but not events), by allowing a user or other operator to designate a particular set of data to be used for the comparison (e.g., by supplying a particular set of data, by indicating a particular past date to use, such as last Wednesday at 5 PM, etc.), etc. In addition, a time slider is not shown in this example because the predicted information provided is relative to the day of a currently selected time, although in other embodiments similar predicted difference information may be available for user-selected future times via a slider or other mechanism to select a date.

Figure 7V:
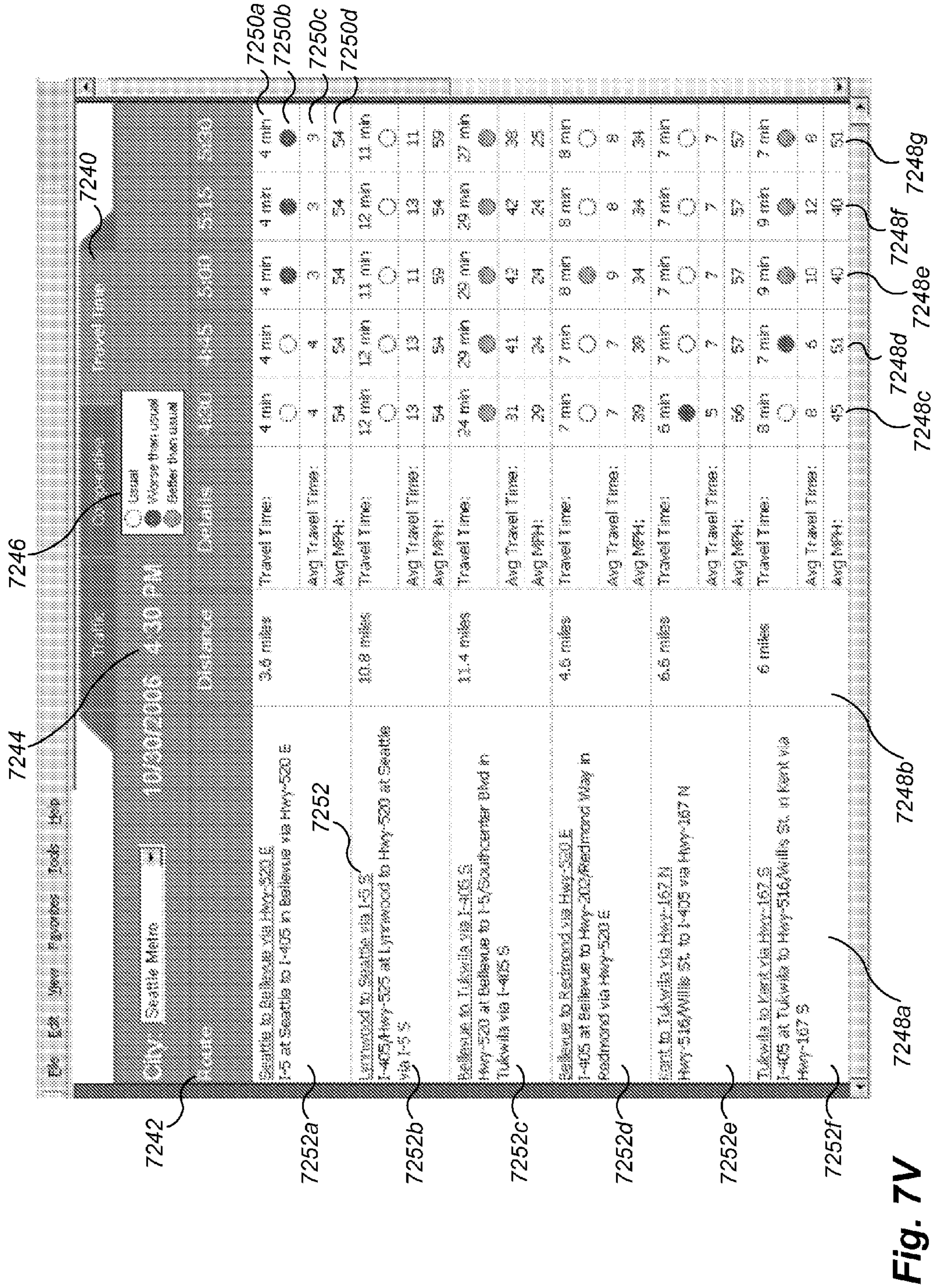

FIG. 7V illustrates a tabular view of various travel information for multiple routes for a currently selected time. In this view, the user has selected the "Travel Time" navigation tab control 7240 in order to obtain travel information that in this example includes distances, actual and/or expected travel times and average speeds, and comparative traffic condition information for multiple routes displayed in a table 7242. The illustrated table 7242 provides travel time information for a currently selected time 7244, which may be a past, current, or future time (e.g., specified by a time slider control or other mechanism, not shown). The table includes travel time information organized into rows 7252*a*-7252*f* and columns 7248*a*-7248*g*. In particular, each row 7252*a*-74252*f* corresponds to a particular route 7248*a*, with a description in column 7248*a*, distance information in column 7248*b*, group 7284*c* of traffic conditions information at the currently selected time, and groups 7284*d*-7284*g* of traffic conditions information at each of multiple times following the currently selected time. Each group of traffic conditions information in this example includes an actual or predicted numeric travel time 7250*a*, a comparative travel time indication 7250*b* expressed as a color or grayscale shade as reflected in legend 7246, an average expected numeric travel time 7250*c* (e.g., to indicate a historical average number of minutes needed to travel the route at the corresponding time of day), and an average expected traffic speed 7250*d* (e.g., to indicate a historical average speed for vehicles traveling the route during the corresponding time of day). The comparative travel time indicator 7250*b* may be based on, for example, a comparison of the actual/predicted travel time 7250*a* and the average expected travel time 7250*c*, such that the color or grayscale shade indicates that the actual/predicted travel time is "Better than usual," "Usual," or "Worse than usual." By way of example, row 7252*f* describes a route from Tukwila to Kent via Highway 167 that is 6 miles in length and that is expected to have travel times that are "Usual, "Worse than usual," "Better than usual," "Better than usual," and "Better than usual" for travel during the respective time periods starting at 4:30 PM, 4:45 PM, 5:00 PM, 5:15 PM, and 5:30 PM. Each route also includes a selection control, such as control 7252 for the route represented in row 7252*b*, that may be selected by the user in order to obtain additional information about the route. For example, by selecting control 7252, a graph such as the one described with reference to FIG. 7H may be displayed.

In other embodiments, similar and/or additional information may be displayed in different ways. For example, comparative information for multiple future times may be displayed by way of a clock icon, such as those described with reference to FIG. 7U, or other mechanisms. In addition, other measures of traffic conditions, such as traffic volumes and/or vehicle occupancy may be displayed. Furthermore, other embodiments may combine various other described user interface aspects, such as a time slider control, which may be utilized by a user to specify a currently selected time for which travel information is to be displayed. Other details related to displaying and otherwise providing information about road traffic conditions are included in U.S. Provisional Patent Application No. 60/864,333, filed Nov. 3, 2006 and entitled "Road Traffic Condition Information," now expired, which is hereby incorporated by reference in its entirety.

Figure 8A:
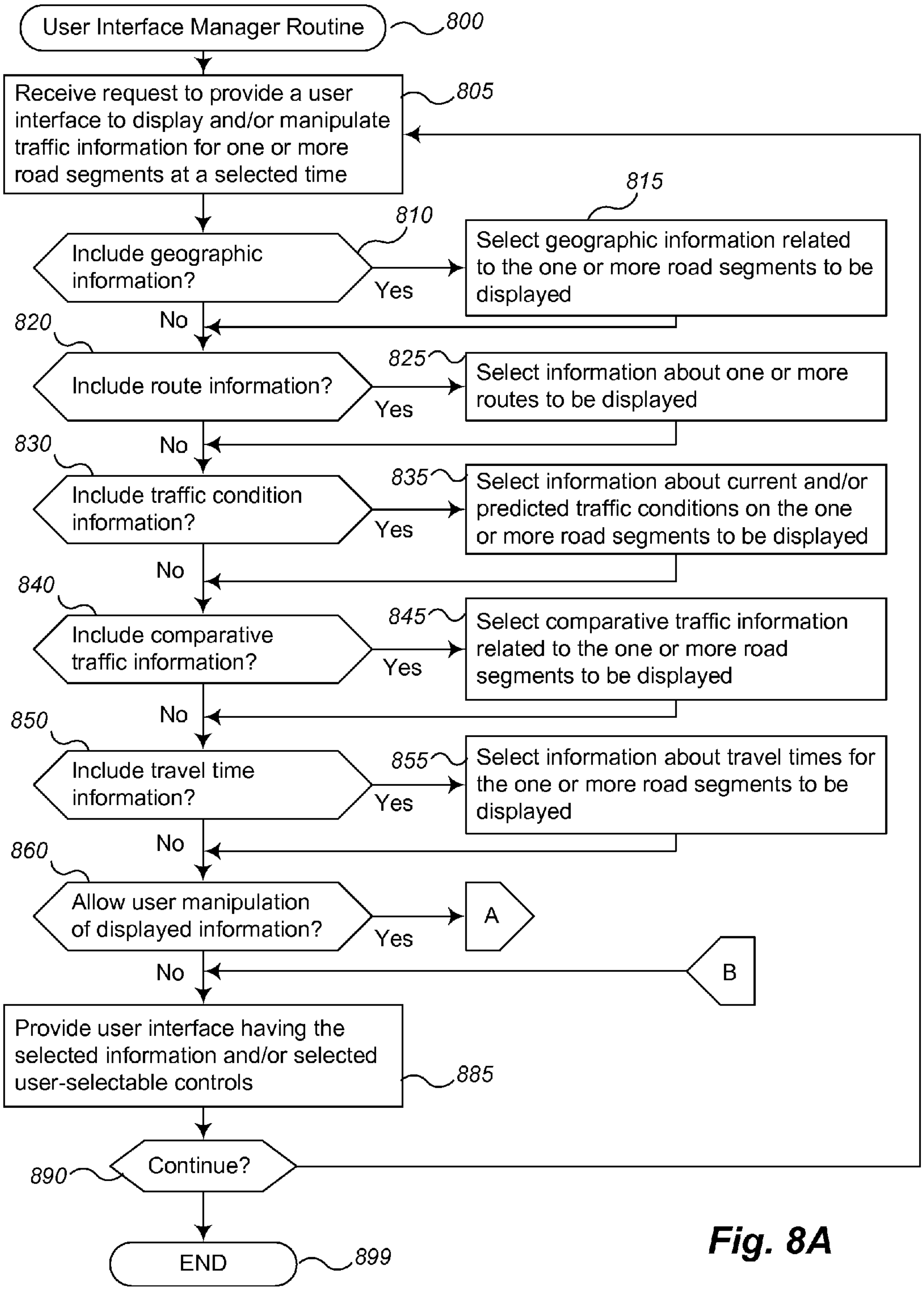
FIGS. 8A and 8B are a flow diagram of an embodiment of a User Interface Manager routine.
Figure 8B:
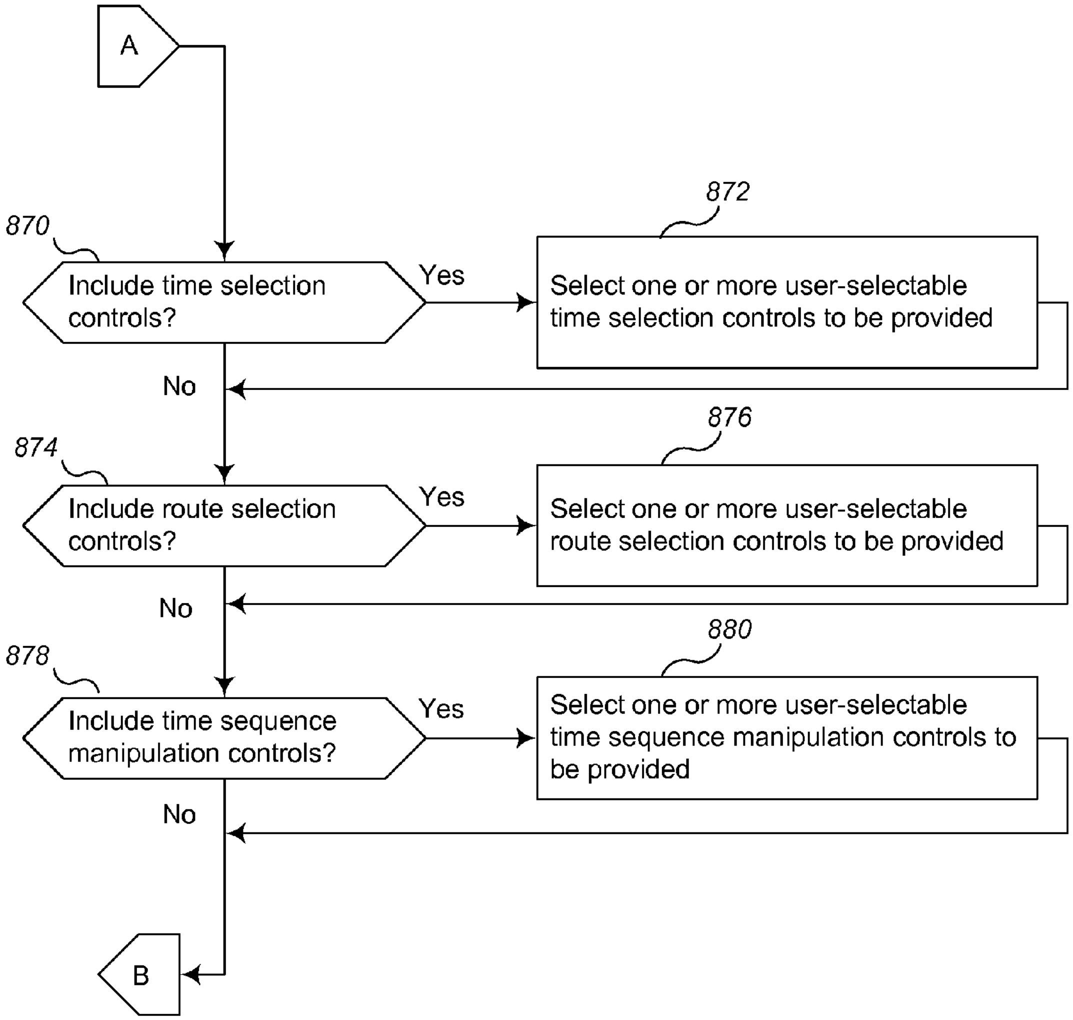

FIGS. 8A-8B illustrate a flow diagram of an embodiment of a User Interface Manager routine 800. This routine may be provided by, for example, execution of the User Interface Manager system 365 of FIG. 3, or instead via one or more predictive traffic information systems as described in FIG. 3. The routine provides user interfaces and/or corresponding information to users to allow display and/or manipulation of traffic information of interest. In this example, the routine provides a user interface to a user in response to a received request from the user (e.g., via a client device operated by the user) that includes indications of desired traffic information and/or user-selectable controls for manipulating such information. In other embodiments, the routine may be performed in other manners, such as by automatically pushing or otherwise providing new or updated traffic-related information to one or more selected users and/or destination devices (e.g., registered client devices). Furthermore, while the illustrated embodiment provides a user interface that includes information and optionally user-selectable controls, in other embodiments this or a related routine may instead provide information to be displayed in a separate user interface or otherwise used.

The routine begins in step 805 and receives a request to provide a user interface to display and/or manipulate traffic information for one or more road segments at a currently selected time. The currently selected time may be any time (e.g., past, current, future) or time period for which traffic information is to be displayed, and if not indicated the currently selected may default to a current time or other default time. The one or more road segments may be indicated in various ways, such as via an indicated geographic area that includes the road segments, via an indicated route that includes the road segments, via an indicated road that includes the road segments, etc. In other embodiments, the request may include other or additional information, such as an indication of a particular user (who may have previously specified preferences, such as that may be utilized to automatically customize a particular user interface for the user), a particular client device (e.g., having operational characteristics, such as an operating system and/or display characteristics, that may be utilized to automatically customize a particular user interface for the device), etc.

In step 810, the routine determines whether the requested user interface is to include geographic information, such as by default unless otherwise indicated. If so, the routine continues to step 815 and selects geographic information related to the one or more road segments to be displayed. Geographic information may be in the form of one or more maps, and may include information about locations and other descriptive information about roads (e.g., streets, highways, etc.), population centers (e.g., cities, towns, etc.), landmarks (e.g., event centers, stadiums, universities), ground cover (e.g., water, trees, urban areas, etc.), etc. In some embodiments, the selected information may be limited or otherwise filtered, such that it relates to (e.g., is geographically proximate to) the one or more road segments.

If it is instead determined in step 810 that the requested user interface does not include geographic information, or after step 815, the routine continues to step 820 and determines whether the requested user interface is to include route information for one or more indicated routes. If so, the routine continues to step 825 and selects information about the one or more routes to be displayed. The selected route information may be based on one or more user-specified routes (e.g., frequently traveled routes previously specified by a user), one or more automatically identified and/or generated routes (e.g., routes identified as frequently traveled), one or more predefined routes, etc.

If it is instead determined in step 820 that the requested user interface does not include route information, or after step 825, the routine continues to step 830 and determines whether the requested user interface is to include non-comparative traffic condition information. If so, the routine continues to step 835 and selects information about past, current, and/or predicted traffic condition conditions for the currently selected time on the one or more of the road segments to be displayed. As described elsewhere, such traffic condition information may take various forms and be obtained in various ways (e.g., with reference to one or more predictive models).

If it is instead determined in step 830 that the requested user interface does not include non-comparative traffic condition information, or after step 835, the routine continues to step 840 and determines whether the requested user interface is to include comparative traffic information. If so, the routine continues to step 845 and selects comparative traffic information related to the one or more road segments to be displayed. As described in more detail elsewhere, such information may include comparative information that reflects differences from normal expected traffic conditions, such as anomalies, degrees or levels of difference, etc.

If it is instead determined in step 840 that the requested user interface does not include comparative traffic information, or after step 845, the routine continues to step 850 and determines whether the requested user interface is to include travel time information, such as for one or more routes or for some or all road segments. If so, the routine continues to step 855 and selects information about travel times for the one or more road segments to be displayed. As described in more detail elsewhere, such information may include actual travel times (e.g., measured travel times obtained from vehicle-based traffic sensors) and/or predicted travel times (e.g., based predicted average vehicle speed for one or more road segments).

If it is instead determined in step 850 that the requested user interface does not include travel time information, or after step 855, the routine continues to step 860 and determines whether the requested user interface allows user manipulation of displayed information, such as via one or more user-selectable controls. If so, the routine continues to step 870 and determines whether the requested user interface is to include time selection controls. If so, the routine continues to step 872 and selects one or more user-selectable time selection controls to be provided. Such controls may include, for example, time slider controls, calendar controls (e.g., for selecting dates), and text input controls that provide mechanisms for a user to specify dates and/or times of day.

If it is instead determined in step 870 that the requested user interface does not include time selection controls, or after step 872, the routine continues to step 874 and determines whether the requested user interface is to include route selection controls. If so, the routine continues to step 876 and selects one or more user-selectable route selection controls to be provided. Such controls may include, for example, radio button controls, checkbox controls, and/or menu controls that provide a mechanism for a user to specify one or more travel routes.

If it is instead determined in step 874 that the requested user interface does not include route selection controls, or after step 876, the routine continues to step 878 and determines whether the requested user interface is to include one or more time sequence manipulation controls. If so, the routine continues to step 880 and selects one or more user-selectable time sequence manipulation controls to be provided. Such controls may include, for example, playback-related controls that provide mechanisms for a user to direct an animation or other dynamic display of traffic information, such as multiple successive views of predicted future traffic conditions for multiple road segments within a geographic area.

If it is instead determined in step 860 that the requested user interface does not allow user manipulation of displayed information, or in step 878 that the requested user interface does not include one or more time sequence manipulation controls, or after step 880, the routine continues to step 885 and provides a user interface having the selected information and selected user-selectable controls. Providing the user interface may include, for example, bundling, combining, linking, archiving, and/or merging the selected information and/or controls into a single physical user interface (e.g., an executable configured to run on a particular type of client device) that is then sent and/or transmitted to the provider of the initial request (e.g., a client device), or instead selecting from one or more predefined user interface templates that are populated with current information. In other embodiments, providing the user interface may include sending and/or transmitting one or more separate portions of information and/or controls, such as multiple client-side JavaScript code modules configured to operate within the context of a Web browser or other client application.

In step 890 the routine determines whether to continue, and if so returns to step 805. Additional received requests to provide user interfaces that are received in step 805 may include requests from new users to obtain new user interfaces, and/or requests for updated information that are initiated by user selection of user-selectable controls in user interfaces previously provided in step 885. If it is instead determined in step 890 not to continue, the routine proceeds to step 899 and ends.

Various embodiments may further utilize various input information and provide various output information for the predictive models used to make future traffic conditions predictions. In some embodiments, inputs to the predictive models related to date and time information include the following variables: MarketId (an identifier for a geographic region); DateTimeUtc (the time of day in Universal Time); DateTimeLocal (the time of day in local time); DateTimeKey, DateDayOfWeekLocal (the day of the week); DateMonthLocal (the month of the year); DateDayLocal; DateHourLocal (the hour of the day); DatePeriod15 MinutesLocal (the 15 minute interval of the day); and HolidayLocal (whether the day is a holiday). In some embodiments, inputs to the predictive models related to current and past traffic conditions information include the following variables: RoadSegmentId (an identifier for a particular road segment); SpeedX (the current reported speed of traffic on road segment X); BlackStartLocalX (the length of time that black traffic congestion level conditions have been reported for road segment X); PercentBlackX (the percentage of sensors or other data sources associated with road segment X that are reporting black traffic congestion level conditions); PercentBlackX-N, where X is a particular road segment and N is a member of {15, 30, 45, 60} and where the value corresponds to the percentage of a road segment X (e.g., percent of sensors associated with the road segment) for which black traffic conditions were reported N minutes ago; RawColorX (the current color corresponding to a level of traffic congestion on road segment X); RawColorX-N, where X is a particular road segment and N is a member of {15, 30, 45, 60}, and where the value is a color corresponding to a level of traffic congestion on road segment X N minutes ago; SinceBlackX (the length of time since black traffic congestion levels have been reported for road segment X); HealthX; and AbnormalityX. In some embodiments, inputs to the predictive models related to weather conditions information include the following variables: Temperature (current temperature); WindDirection (current wind direction); WindSpeed (current wind speed); SkyCover (current level of cloud or haze); PresentWeather (current weather state); and RainNHour, where N is a member of {1, 3, 6, 24} and represents precipitation accumulation in the previous N hour(s); and MetarId. In some embodiments, inputs to the predictive models related to event and school schedules information include the following variables: EventVenueId (a venue identifier); EventScheduleId (a schedule identifier); DateDayLocal (the day of a given event); StartHourLocal (the start hour of a given event); EventTypeId (an event type identifier); EventVenueId (a venue identifier); SchoolLocationId (a school location identifier); and IsSchoolDay (whether or not the current day is a school day).

In some embodiments, outputs to the predictive models related to traffic conditions include the following variables: RawColorXN, where X is a particular road segment and N is a member of {15, 30, 45, 60, 75, 90, 105, 120, 135, 150, 165, 180}, and where the value is a color corresponding to an expected level of traffic congestion on road segment X in N minutes time; and PredRawColorXNProb to indicate confidence in given predictions, where X and N are defined as above with reference to the RawColorXN variables and the value is the confidence level in prediction for road segment X in N minutes time (e.g., based on the level of historical support from observed data for the decision tree path taken to make the prediction).

The following illustrates one example of possible values or ranges of values that may be taken by various of the variables described above, with the indicator " . . . " between two numbers indicating that any integer between and including those two numbers are possible values (e.g., "1 . . . 4" represents {1, 2, 3, 4}), and with possible values of 0 and 1 indicating true and false for appropriate variables (e.g., casedata.HolidayLocal). In other embodiments, other input and/or output variables may be used, and their values may be represented in other manners.

| Variable Name | Example Possible Values |
|---|---|
| eventschedule.EventScheduleId | Integer |
| eventschedule.EventVenueId | Integer |
| eventschedule.Name | "Seattle Mariners Game" |
| eventschedule.DateDayLocal | 1 . . . 31 |
| eventschedule.StartHourLocal | 0 . . . 23 |
| eventschedule.EventTypeId | Integer |
| eventvenue.EventVenueId | Integer |

-continued

| Variable Name | Example Possible Values |
|---|---|
| eventvenue.Name | "Safeco Field" |
| eventvenue.MarketId | Integer |
| casedata.DateTimeUtc | Feb. 13, 2006 12:15:00 |
| casedata.DateTimeLocal | Feb. 13, 2006 04:15:00 |
| casedata.DateDayOfWeekLocal | 1 . . . 7 |
| casedata.DateMonthLocal | 1 . . . 12 |
| casedata.DateHourLocal | 0 . . . 23 |
| casedata.HolidayLocal | 0, 1 |
| roadsegmentdata.RoadSegmentId | Integer |
| roadsegmentdata.SpeedX | 0 . . . 100 (mph) |
| roadsegmentdata.BlackStartLocalX | Before 0745, 0745-0759, 0800-0814, 0815-0829, 0830-0844, 0845-0859, . . . , 1915-1929, After 1930 |
| roadsegmentdata.SinceBlackX | Integer (minutes) |
| roadsegmentdata.PercentBlackX | none, 0-15, 15-30, 30-50, 50-75, 75-100 |
| roadsegmentdata.PercentBlackX-N | none, 0-15, 15-30, 30-50, 50-75, 75-100 |
| roadsegmentdata.RawColorX | 0, 1, 2, 3 |
| roadsegmentdata.RawColorXN | 0, 1, 2, 3 |
| roadsegmentdata.RawColorX-N | 0, 1, 2, 3 |
| roadsegmentdata.ColorX | 0, 1, 2, 3 |
| roadsegmentdata.HealthX | 0, 1 |
| roadsegmentdata.AbnormalityX | 0, 1 |
| roadsegmentdata.PredRawColorXN | 0, 1, 2, 3 |
| roadsegmentdata.PredRawColorXNProb | Real [0, 1] |
| weather.MetarId | Integer |
| weather.MarketId | Integer |
| weather.Temperature | 32-40 F., 40-80 F., Extreme Heat, Freezing, Hot, Unknown |
| weather.WindDirection | N, NE, E, SE, S, SW, W, NW |
| weather.WindSpeed | Breezy, Calm, Windy, Heavy, Unknown |
| weather.SkyCover | Broken Clouds, Clear Skies, Few Clouds, Obscured Cover, Overcast, Scattered Clouds, Unknown |
| weather.PresentWeather | Blowing Snow, Clear or Fair, Cloudy, Fog, Haze, Mist, Rain, Snow, Thunderstorms, Unknown, Windy |
| weather.RainNHour | Extreme Rain, Hard Rain, No Rain, Soft Rain, Trace Rain, Unknown |
| schoollocation.SchoolLocationId | Integer |
| schoollocation.Name | "Lake Washington" |
| schoollocation.MarketId | Integer |
| schoolschedule.IsSchoolDay | 0, 1 |

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for providing information relating to traffic conditions on roads, the method comprising:

providing a map for display that corresponds to at least a portion of a geographic area, the map including displayed representations of multiple road segments of one or more roads in the geographic area, the providing of the map being performed by one or more configured computing systems;

identifying a route of interest between at least two locations in the geographic area, the route including at least some road segments of the multiple road segments;

automatically determining, by the one or more configured computing systems, comparative traffic conditions for the at least some road segments that indicate differences between actual and expected traffic conditions, the determining of the comparative traffic conditions including, for each of the at least some road segments:

determining expected traffic conditions for the road segment for a selected time, the expected traffic conditions reflecting traffic conditions that are normal for the road segment at the selected time;

determining target traffic conditions for the road segment for the selected time that correspond to actual traffic conditions at the selected time for the road segment; and determining whether a difference exists between the target traffic conditions for the road segment for the selected time and the expected traffic conditions for the road segment for the selected time, and providing, by at least one of the one or more configured computing systems, information for display on the map about the determined comparative traffic conditions for the at least some road segments, wherein the provided information includes an indication for each of the at least some road segments of whether the difference is determined to exist for the road segment for the selected time and includes an indication of a determined numeric difference between actual average traffic speeds at the selected time for the road segment and expected average traffic speeds at the selected time for the road segment, such that the displayed representation of the road segment on the displayed map includes an associated visual indication of the determined numeric difference for the road segment.

2. The method of claim 1 wherein the at least some road segments are a subset of the multiple road segments, and wherein the representations of the at least some road segments are displayed on a map in a manner distinct from the displayed representations of other of the multiple road segments, so as to visually emphasize the route through a network of multiple roads displayed on the map.

3. The method of claim 1 wherein the provided information for each of the at least some road segments includes an indication of one of multiple predefined determined levels of difference that reflects the differences between the actual traffic conditions at the selected time for the road segment and the expected traffic conditions at the selected time for the road segment, such that the displayed representation of the road segment on the displayed map includes a visual representation of the determined difference level for the road segment, each of the multiple predefined difference levels having a distinct visual representation.

4. The method of claim 1 further comprising providing information for display on the map about comparative travel times for vehicles traveling the route at the selected time, the comparative travel time information indicating differences between actual vehicle travel times at the selected time for the route and expected vehicle travel times at the selected time for the route.

5. The method of claim 1 wherein the selected times for the at least some road segments are a past time, and wherein the comparative traffic conditions information is based on information about actual traffic conditions at the selected past time.

6. The method of claim 1 wherein the selected times for the at least some road segments are a single time, such that the provided comparative traffic conditions information for the at least some road segments reflects traffic conditions at the single time.

7. The method of claim 1 wherein the selected times for the at least some road segments include multiple successive times for successive road segments in a series of road segments along the route, such that a first of the road segments in the series is associated with a first selected time and such that each other road segment in the series is associated with a distinct selected time later than the associated selected time for a prior road segment in the series, the distinct selected later time associated with an other road segment differing from the associated selected time for the prior road segment by an amount that corresponds to an expected amount of time to traverse the prior road segment at the associated selected time for the prior road segment.

8. The method of claim 1 wherein the providing of the map for display includes providing a user interface for displaying the map, the provided user interface including one or more user-selectable controls to allow one or more users to modify traffic conditions information that is provided for display on the map.

9. The method of claim 1 wherein the providing of the information about the comparative traffic conditions at the selected time for each of the at least some road segments includes displaying to one or more users the provided comparative traffic conditions information on the map.

10. A computer-implemented method for providing information relating to traffic conditions on roads, the method comprising:

providing a map for display that corresponds to at least a portion of a geographic area, the map including displayed representations of multiple road segments of one or more roads in the geographic area, the providing of the map being performed by one or more configured computing systems;

identifying a route of interest between at least two locations in the geographic area, the route including at least some road segments of the multiple road segments;

providing, by at least one of the one or more configured computing systems, information for display on the map about comparative traffic conditions for each of the at least some road segments at a selected time, wherein the comparative traffic conditions information indicate differences between expected traffic conditions for the road segment at the selected time and at least one of actual and predicted traffic conditions for the road segment at the selected time, and wherein the selected times for the at least some road segments include multiple successive times for successive road segments in a series of road segments along the route; and providing one or more user-selectable time sequence manipulation controls for the map such that a single selection by a user of one of the time sequence manipulation controls indicates to automatically perform without further user interaction a successive providing of information about comparative traffic conditions for the at least some road segments at each of the multiple successive times.

11. A non-transitory computer-readable medium having stored contents that configure a computing system to provide information relating to traffic conditions on roads, by performing a method comprising:

providing a map for display that corresponds to at least a portion of a geographic area, the map including displayed representations of multiple road segments of one or more roads in the geographic area, the providing of the map being performed by the configured computing system;

identifying a route of interest between at least two locations in the geographic area, the route including at least some road segments of the multiple road segments;

automatically determining, by the configured computing system, comparative traffic conditions for one or more of the multiple road segments that indicate differences between expected traffic conditions and at least one of actual and predicted traffic conditions, the determining of the comparative traffic conditions including, for each of the one or more road segments:

determining expected traffic conditions for the road segment for a selected time, the expected traffic conditions reflecting traffic conditions that are normal for the road segment at the selected time;

determining target traffic conditions for the road segment for the selected time that correspond to the at least one actual and predicted traffic conditions at the selected time for the road segment; and determining whether a difference exists between the target traffic conditions for the road segment for the selected time and the expected traffic conditions for the road segment for the selected time, and initiating a display on the map of information about the determined comparative traffic conditions for the one or more road segments by providing the information about the comparative traffic conditions, wherein the providing of the information about the comparative traffic conditions is performed by the configured computing system, and wherein the provided information includes an indication for each of the one or more road segments of whether the difference is determined to exist for the road segment for the selected time.

12. The non-transitory computer-readable medium of claim 11 wherein the at least some road segments are a subset of the multiple road segments whose displayed representations are included on the map, and wherein the displayed representations of the at least some road segments have a visual representation that is distinct from the displayed representations of other of the multiple road segments that are not part of the at least some road segments.

13. The non-transitory computer-readable medium of claim 11 wherein the provided information about the comparative traffic conditions includes an indication for each of the one or more road segments of one of multiple predefined determined levels of difference that reflects the differences between the at least one actual and predicted traffic conditions at the selected time for the road segment and the expected traffic conditions at the selected time for the road segment, and wherein the displayed representation of each of the one or more road segments includes a visual representation of the determined difference level for the road segment.

14. The non-transitory computer-readable medium of claim 11 wherein the at least one actual and predicted traffic conditions for each of the one or more road segments includes at least one of an actual and predicted average traffic speed for the road segment, wherein the expected traffic conditions for each of the one or more road segments includes an expected average traffic speed for the road segment, wherein the provided information about the comparative traffic conditions includes an indication for each of the one or more road segments of a determined numeric difference between the at least one actual and predicted average traffic speeds for the road segment and the expected average traffic speeds for the road segment, and wherein the displayed representation of each of the one or more road segments includes an associated visual indication of the determined numeric difference for the road segment.

15. The non-transitory computer-readable medium of claim 11 wherein the selected times for the at least some road segments are one of a past time and a future time, wherein the determined comparative traffic conditions information is based on information about actual prior traffic conditions at the past time if the selected times are the past time, and wherein the determined comparative traffic conditions information is based on information about predicted traffic conditions at the future time if the selected times are the future time.

16. The computer-readable medium of claim 11 wherein the configured computing system is a client device that is used by a user and that displays comparative traffic conditions information to the user as part of the providing of the information about the comparative traffic conditions, or a server device that transmits comparative traffic conditions information to one or more remote client devices as part of the providing of the information about the comparative traffic conditions.

17. The computer-readable medium of claim 11 wherein the computer-readable medium is a memory of the configured computing system, and wherein the contents are instructions that when executed program the configured computing system to perform the method.

18. A non-transitory computer-readable medium having stored contents that configure a computing system to provide information relating to traffic conditions on roads, by performing a method comprising:

providing a map for display that corresponds to at least a portion of a geographic area, the map including displayed representations of multiple road segments of one or more roads in the geographic area, the providing of the map being performed by the configured computing system;

identifying a route of interest between at least two locations in the geographic area, the route including at least some road segments of the multiple road segments;

initiating a display on the map of information about comparative traffic conditions for each of one or more road segments of the at least some road segments at a selected time by providing the information about the comparative traffic conditions, wherein the comparative traffic conditions information indicate differences between at least one of actual and predicted traffic conditions at the selected time for the road segment and expected traffic conditions at the selected time for the road segment, wherein the selected times for the one or more road segments include multiple successive times for successive road segments in a series of multiple road segments along the route, such that a first of the multiple road segments in the series is associated with a first selected time and such that each other of the multiple road segments in the series is associated with a distinct selected time later than the associated selected time for a prior road segment in the series, and wherein the providing of the information about the comparative traffic conditions is performed by the configured computing system; and providing one or more user-selectable time sequence manipulation controls for the map to enable a single selection by a user of one of the time sequence manipulation controls to automatically initiate a successive providing of information about comparative traffic conditions for road segments at each of multiple successive selected times.

19. A computing device configured to provide information relating to traffic conditions on roads, comprising:

one or more processors;

a first component configured to, when executed by at least one of the one or more processors:

provide a map for display that corresponds to at least a portion of a geographic area, the map including displayed representations of multiple road segments of one or more roads in the geographic area;

identify a route of interest between at least two locations in the geographic area, the route including at least some road segments of the multiple road segments; and for each of one or more road segments of the at least some road segments, initiate a display on the map of information about comparative traffic conditions at a selected time for the road segment, the comparative traffic conditions information indicating differences between at least one of actual and predicted traffic conditions at the selected time for the road segment and expected traffic conditions at the selected time for the road segment; and one or more components configured to, when executed by at least one of the one or more processors, determine the comparative traffic conditions for the one or more road segments at the selected time by, for each of the one or more road segments:

determining the expected traffic conditions for the road segment for the selected time, the expected traffic conditions reflecting traffic conditions that are normal for the road segment at the selected time;

determining target traffic conditions for the road segment for the selected time that correspond to the at least one actual and predicted traffic conditions at the selected time for the road segment; and determining whether a difference exists between the target traffic conditions for the road segment for the selected time and the expected traffic conditions for the road segment for the selected time, and wherein the information about the comparative traffic conditions for each of the one or more road segments that is displayed on the map includes an indication of whether the difference is determined to exist for the road segment.

20. The computing device of claim 19 wherein the at least some road segments are a subset of the multiple road segments, and wherein the displayed representations of the at least some road segments have a visual representation that is distinct from the displayed representations of other of the multiple road segments that are not part of the at least some road segments.

21. The computing device of claim 19 wherein the information about the comparative traffic conditions for each of the one or more road segments includes an indication of one of multiple predefined determined levels of difference that reflects the differences between the at least one actual and predicted traffic conditions at the selected time for the road segment and the expected traffic conditions at the selected time for the road segment, and wherein the displayed representation of each of the one or more road segments on the displayed map includes a visual representation of the determined difference level for the road segment.

22. The computing device of claim 19 wherein the at least one actual and predicted traffic conditions at the selected time for each of the one or more road segments includes at least one of an actual and predicted average traffic speed at the selected time for the road segment, wherein the expected traffic conditions at the selected time for each of the one or more road segments includes an expected average traffic speed at the selected time for the road segment, wherein the information about the comparative traffic conditions at the selected time for each of the one or more road segments includes an indication of a determined numeric difference between the at least one actual and predicted average traffic speeds at the selected time for the road segment and the expected average traffic speeds at the selected time for the road segment, and wherein the displayed representation of each of the one or more road segments on the displayed map includes an associated visual indication of the determined numeric difference for the road segment.

23. The computing device of claim 19 wherein the selected time is one of a past time and a future time, wherein the comparative traffic conditions information for the selected time is based on information about actual prior traffic conditions at the past time if the selected time is the past time, and wherein the comparative traffic conditions information for the selected time is based on information about predicted traffic conditions at the future time if the selected time is the future time.

24. The computing device of claim 19 wherein the configured computing device is in communication with a second computing device of a user, and wherein the providing of the map for display includes initiating the display of the map as part of a user interface on the second computing device of the user.

25. The computing device of claim 19 wherein the configured computing device further comprises a display device, and wherein the providing of the map for display includes displaying the map as part of a user interface on the display device of the configured computing device.

26. The computing device of claim 19 wherein the first component is a user interface manager system that includes software instructions for execution by the one or more processors of the computing device.

27. The computing device of claim 19 wherein the one or more components consist of one or more means for performing the determining of the comparative traffic conditions for the one or more road segments.

28. A computer-implemented method for providing information relating to traffic conditions on roads, the method comprising:

providing a map for display that corresponds to at least a portion of a geographic area, the map including displayed representations of multiple road segments of one or more roads in the geographic area, the providing of the map being performed by one or more configured computing systems;

identifying a route of interest between at least two locations in the geographic area, the route including at least some road segments of the multiple road segments;

automatically determining, by the one or more configured computing systems, comparative traffic conditions for the at least some road segments that indicate differences between predicted and expected traffic conditions, the determining of the comparative traffic conditions including, for each of the at least some road segments:

determining expected traffic conditions for the road segment for a selected time, the expected traffic conditions reflecting traffic conditions that are normal for the road segment at the selected time;

determining target traffic conditions for the road segment for the selected time that correspond to predicted traffic conditions at the selected time for the road segment; and determining whether a difference exists between the target traffic conditions for the road segment for the selected time and the expected traffic conditions for the road segment for the selected time, and providing, by at least one of the one or more configured computing systems, information for display on the map about the determined comparative traffic conditions for the at least some road segments, wherein the provided information includes an indication for each of the at least some road segments of whether the difference is determined to exist for the road segment for the selected time.

29. The method of claim 28 wherein the provided information for each of the at least some road segments includes an indication of one of multiple predefined determined levels of difference that reflects the differences between the predicted traffic conditions at the selected time for the road segment and the expected traffic conditions at the selected time for the road segment, such that the displayed representation of the road segment on the displayed map includes a visual representation of the determined difference level for the road segment, each of the multiple predefined difference levels having a distinct visual representation.

30. The method of claim 28 wherein the provided information for each of the at least some road segments includes an indication of a determined numeric difference between predicted average traffic speeds at the selected time for the road segment and expected average traffic speeds at the selected time for the road segment, such that the displayed representation of the road segment on the displayed map includes an associated visual indication of the determined numeric difference for the road segment.

31. The method of claim 28 further comprising providing information for display on the map about comparative travel times for vehicles traveling the route at an indicated time, the comparative travel time information indicating differences between predicted vehicle travel times for the route at the indicated time and expected vehicle travel times for the route at the indicated time.

32. The method of claim 28 wherein the selected times for the at least some road segments are one or more future times.

* * * * *

UNITED STATES PATENT AND TRADEMARK OFFICE

CERTIFICATE OF CORRECTION

PATENT NO. : 8,615,354 B2
APPLICATION NO. : 12/856423
DATED : December 24, 2013
INVENTOR(S) : Alec Barker et al.

It is certified that error appears in the above-identified patent and that said Letters Patent is hereby corrected as shown below:

On the Title Page

Item (56) should read:
"“Global Positioning Systems > Tracking Systems in the Yahoo! Directory,” Yahoo!®, Small Business Directory, retrieved February 8, 2006, from http://dir.yahoo.com/Business_and_ Economy/Busi-ness_to_Business/Navigation/Global_Positioning_Systems/Tracking_Systems, 8 pages.” should read, --“Global Positioning Systems > Tracking Systems in the Yahoo! Directory,” Yahoo!® Small Business Directory, retrieved February 8, 2006, from http://dir.yahoo.com/Business_and_Economy/Business_to_Business/Navigation/ Global_Positioning_Systems/Tracking_Systems, 8 pages.--.

Signed and Sealed this
Twenty-second Day of July, 2014

Michelle K. Lee
*Deputy Director of the United States Patent and Trademark Office*